United States Patent
Riegel et al.

(10) Patent No.: US 12,045,319 B2
(45) Date of Patent: Jul. 23, 2024

(54) FIRST-ORDER LOGICAL NEURAL NETWORKS WITH BIDIRECTIONAL INFERENCE

(71) Applicant: International Business Machines Corporation, Armonk, NY (US)

(72) Inventors: Ryan Nelson Riegel, Carrollton, GA (US); Francois Pierre Luus, Wierdapark (ZA); Ismail Yunus Akhalwaya, Emmarentia (ZA); Naweed Aghmad Khan, Johannesburg (ZA); Ndivhuwo Makondo, Pretoria (ZA); Francisco Barahona, White Plains, NY (US); Alexander Gray, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 17/063,899

(22) Filed: Oct. 6, 2020

(65) Prior Publication Data
US 2021/0365817 A1    Nov. 25, 2021

Related U.S. Application Data

(60) Provisional application No. 63/024,243, filed on May 13, 2020.

(51) Int. Cl.
*G06F 18/20* (2023.01)
*G06F 18/214* (2023.01)
(Continued)

(52) U.S. Cl.
CPC ............ *G06F 18/29* (2023.01); *G06F 18/214* (2023.01); *G06N 3/04* (2013.01); *G06N 3/063* (2013.01);
(Continued)

(58) Field of Classification Search
None
See application file for complete search history.

(56) References Cited

U.S. PATENT DOCUMENTS

| 5,226,092 A | 7/1993 | Chen |
| 2014/0379624 A1 | 12/2014 | Piekniewski et al. |

(Continued)

FOREIGN PATENT DOCUMENTS

| CN | 1182246 A | 5/1998 |
| CN | 104463330 A | 3/2015 |

(Continued)

OTHER PUBLICATIONS

Chortaras et al., A Connectionist Model for Weighted Fuzzy Programs, 2006 International Joint Conference on Neural Networks Sheraton Vancouver Wall Centre Hotel, Vancouver, BC, Canada, Jul. 16-21, 2006, pp. 3055-3062 (Year: 2016).*

(Continued)

*Primary Examiner* — Alan Chen
(74) *Attorney, Agent, or Firm* — Scully, Scott, Murphy & Presser, P.C.; Shimon Benjamin

(57) ABSTRACT

A system for configuring and using a logical neural network including a graph syntax tree of formulae in a represented knowledgebase connected to each other via nodes representing each proposition. One neuron exists for each logical connective occurring in each formula and, additionally, one neuron for each unique proposition occurring in any formula. All neurons return pairs of values representing upper and lower bounds on truth values of their corresponding subformulae and propositions. Neurons corresponding to logical connectives accept as input the output of neurons corresponding to their operands and have activation functions configured to match the connectives' truth functions. Neurons corresponding to propositions accept as input the output of neurons established as proofs of bounds on the (Continued)

propositions' truth values and have activation functions configured to aggregate the tightest such bounds. Bidirectional inference permits every occurrence of each proposition in each formula to be used as a potential proof.

11 Claims, 12 Drawing Sheets

(51) Int. Cl.
    *G06N 3/04*     (2023.01)
    *G06N 3/063*     (2023.01)
    *G06N 3/08*     (2023.01)
    *G06N 5/025*     (2023.01)
    *G06N 5/04*     (2023.01)
    *G06N 5/046*     (2023.01)

(52) U.S. Cl.
    CPC ............... *G06N 3/08* (2013.01); *G06N 5/025* (2013.01); *G06N 5/042* (2013.01); *G06N 5/046* (2013.01)

(56) References Cited

U.S. PATENT DOCUMENTS

| | | | |
|---|---|---|---|
| 2015/0106315 A1 | 4/2015 | Birdwell et al. |
| 2018/0121796 A1 | 5/2018 | Deisher et al. |
| 2019/0130246 A1 | 5/2019 | Katayama |

FOREIGN PATENT DOCUMENTS

| | | |
|---|---|---|
| CN | 109871940 A | 6/2019 |
| CN | 110610235 A | 12/2019 |

OTHER PUBLICATIONS

Hamilton et al., Embedding Logical Queries on Knowledge Graphs, 32nd Conference on Neural Information Processing Systems (NeurIPS 2018), Montréal, Canada, pp. 1-12 (Year: 2018).*

Healy et al., Acquiring Rule Sets as a Product of Learning in a Logical Neural Architecture, IEEE Transactions On Neural Networks, vol. 8, No. 3, May 1997; pp. 461-474 (Year: 1997).*

Garcez et al., Neural-Symbolic Computing: An Effective Methodology for Principled Integration of Machine Learning and Reasoning , arXiv:1905.06088v1 [cs.AI] May 15, 2019, pp. 1-21 (Year: 2019).*

Dong et al., "Neural logic machines." Published conference paper at ICLR 2019, arXiv preprint arXiv:1904.11694 (2019) Apr. 26, 2019, p. 1-.22.

Evans et al., "Learning explanatory rules from noisy data." Journal of Artificial Intelligence Research 61 (2018): Jan. 25, 2018, pp. 1-64.

Garcez et al., "The connectionist inductive learning and logic programming system." Applied Intelligence 11.1 (Jan. 13, 1999): pp. 59-77.

Pinkas, "Reasoning, nonmonotonicity and learning in connectionist networks that capture propositional knowledge." Artificial Intelligence 77.2 (1995) Sep. 1995: pp. 203-247.

Richardson et al., "Markov logic networks." Machine learning 62.1-2 (2006): published online Jan. 27, 2006, pp. 107-136.

Rocktäschel et al., "Learning knowledge base inference with neural theorem provers." Proceedings of the 5th Workshop on Automated Knowledge Base Construction. 2016, Jun. 12-17, 2016, pp. 45-50.

Serafini et al., "Logic tensor networks: Deep learning and logical reasoning from data and knowledge." arXiv preprint arXiv:1606.04422 (2016), Jul. 7, 2016, 12 pages.

Towell et al., "Knowledge-based artificial neural networks." Artificial intelligence 70.1-2 (Aug. 1994): pp. 119-165.

Tran, "Propositional knowledge representation and reasoning in restricted boltzmann machines." arXiv preprint arXiv:1705.10899 (2017), May 29, 2018, 10 pages.

Yang et al., "Differentiable learning of logical rules for knowledge base reasoning." 31st Conference on Nueral Information Processing Systems (NIPS 2017), Long Beach, CA, USA, Advances in Neural Information Processing Systems. 2017, Dec. 4-9, 2017, 10 pages.

International Search Report dated Jun. 18, 2021 issued in PCT/IB2021/052265, 7 pages.

International Search Report dated Jul. 15, 2021 issued in PCT/IB2021/053030, 7 pages.

* cited by examiner

600

```
procedure UPWARDPASS (node j)
    if node j is atom then  ⎫
        return bounds        ⎬ 605
    else                     ⎭
        for operand i in node do          ⎫
            (L_{i,j}, U_{i,j}) = UPWARDPASS(operand i)  ⎪
        end for                                         ⎬ 608
        return f_j( β_j, w_j, L_j, U_j )                ⎪
    end if                                              ⎭
end procedure
```

```
procedure DOWNWARDPASS (node j, L, U)
    if node j is atom then  ⎫
        record (L, U)        ⎬ 615
    else                     ⎭
        for operand i in node do                              ⎫
            (L_{i,j}, U_{i,j}) = f_{i,j}^{-1}( β_j, w_j, L_{-i,j}, U_{-i,j}, L, U ) ⎪
            DOWNWARDPASS(operand i, L_{i,j}, U_{i,j})         ⎬ 618
        end for                                               ⎪
    end if                                                    ⎭
end procedure
```

```
procedure AGGREGATE(atom j)
    for proof i in atom do                    ⎫
        ( L_{i,j}, U_{i,j} ) = proof bounds    ⎬ 625
    end for                                   ⎭
    L_j = max L_j   ⎫
    U_j = min U_j   ⎬ 628
end procedure     ⎭
```

FIG. 6C

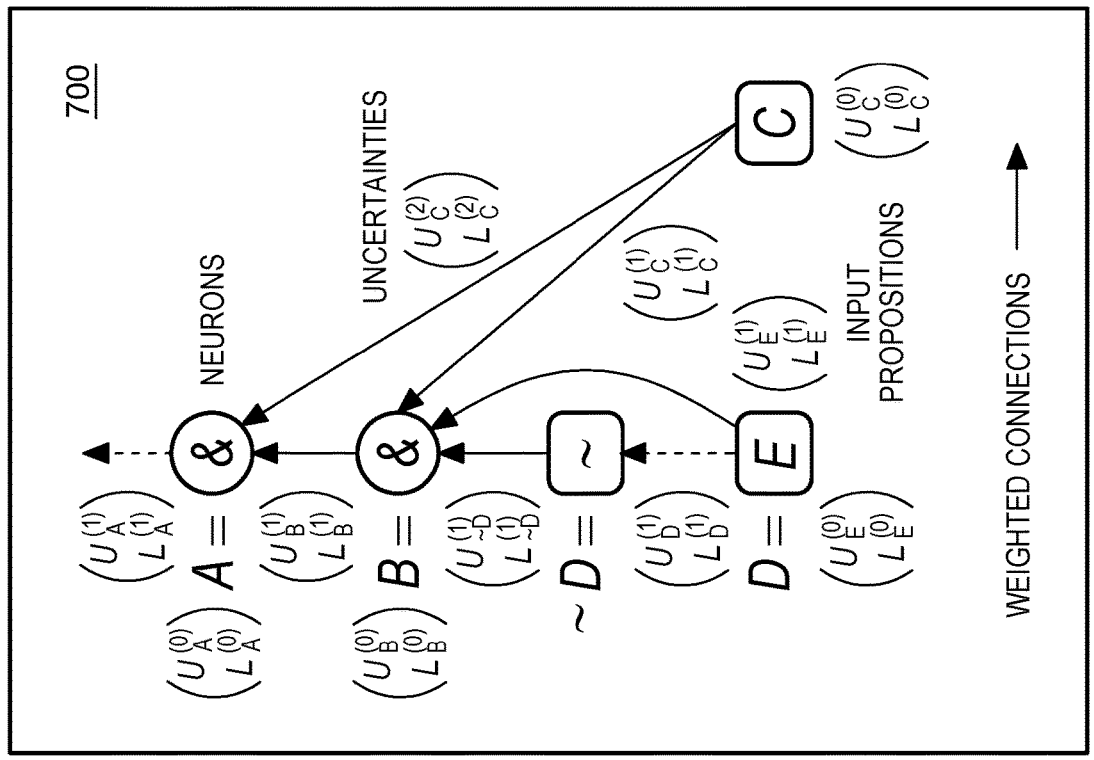
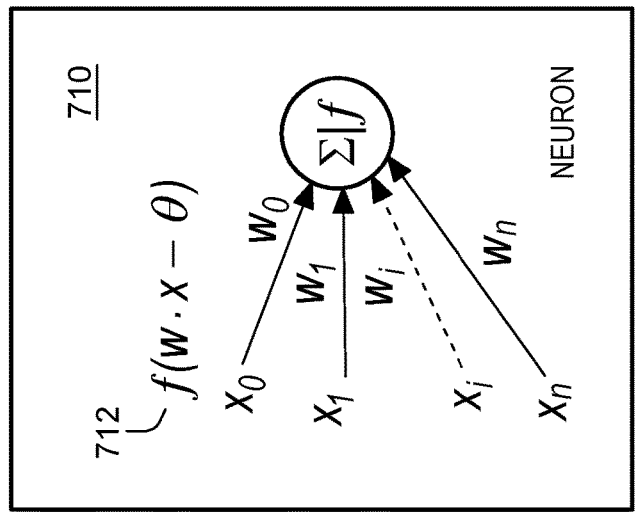
FIG. 7A
FIG. 7B

FIRST-ORDER LOGICAL NEURAL NETWORKS WITH BIDIRECTIONAL INFERENCE

FIELD

The present disclosure relates generally to machine learning and neural networks, and an apparatus and a system and method for logical neural networks that model logic and is capable of inference in any direction.

BACKGROUND

Neuro-symbolic reasoning systems aim to bridge the gulf that presently exists between two of Artificial Intelligence's most studied disciplines: principled, deductive inference via any of various systems of formal logic, and data-driven, gradient optimized neural network architectures. Both paradigms bear a number of important strengths and weaknesses. Notably, formal logic is interpretable, verifiable, and broadly generalizable, though it is computationally intensive if not undecidable, requires extensive domain expert input, and can be derailed by even minor inconsistencies. Neural networks, on the other hand, perform well even for unprocessed and/or noisy data, require little human configuration, and can run efficiently in parallel. Their downsides, however, are their requirement for large training data sets, their vulnerability to adversarial attacks, and their uninterpretable black-box nature.

SUMMARY

An aspect of the present disclosure is a logical neural network that merges the two disciplines: 1) the principled, deductive inference via any of various systems of formal logic, and 2) data-driven, gradient optimized neural network architectures and methods of operation that exploits either's strengths while mitigating their weaknesses.

One aspect of the present invention is a neural network architecture and in particular a logical neural network (LNN) implementing systems, methods and computer program products in which neurons model a rigorously defined notion of weighted fuzzy or classical logic.

In a further aspect, the LNN architecture is arranged in a one-to-one correspondence with the operations in a knowledge base (KB) of logical formulae, such a neural network is capable of inference in any direction, i.e. via normal evaluation, modus ponens, conjunction elimination, and all related inference rules.

In a further aspect, the LNN system, methods and computer program products operate to behave equivalently to inference on a system of classical logical formulae (using an established set of inference rules), and at the same time, is continuously differentiable for its represented formulae to be able to vary continuously between different forms.

In a further aspect, in order to satisfy both requirements of behaving equivalently to conduct inference on a system of classical logical formulae, and be continuously differentiable for its represented formulae to be able to vary continuously between different forms, the LNN implements a weighted fuzzy logic offering of sound inference rules and intuitive mathematical behavior, such that it behaves similarly as the rectified linear unit (ReLU) type of activation function defined mathematically as $y=\max(0, x)$.

Further, the LNN system, methods and computer program products operate through the enforcement of constraints, and define a form of continuous classical logic, suitable for automated learning guaranteed to behave exactly classically given classical inputs.

Further, there is provided a system, method and computer program product providing an ability to provide for neuro-symbolic fusion: interpretable, verifiable neural networks, informed by any available domain knowledge but resilient to inconsistency, and that is able to exploit Big Data but competent even in its absence.

According to one embodiment, there is provided a computer-implemented method comprising: receiving, at one or more hardware processors, an input query and input propositions used to infer a logical truth based on the input query; configuring, using the one or more hardware processors, a logical neural network (LNN) structure comprising one or more prepositional neurons representing the input propositions and one or more neurons representing a logical connective according to a system of logical formulae corresponding to inference rules; evaluating, using the LNN structure, a logical inference based on the input query; and responsive to the evaluating, outputting an output truth value either proving or not the logical inference within an aggregated bounds.

In a further embodiment, there is provided a computer-implemented system comprising: one or more hardware processing units configured as a logical neural network (LNN) structure having a plurality of neurons and connective edges, the plurality of neurons and connective edges of the LNN structure in a 1-to-1 correspondence with a system of logical formulae and running a method to perform a logical inference, wherein: one neuron of the plurality of neurons exists for a corresponding logical connective in each formula or subformula of the system of logical formulae, the one neuron having one or more linking connective edges providing input information comprising operands of the logical connective and information further comprising parameters configured to implement a truth function of the logical connective, and each the one neuron for a corresponding logical connective having a corresponding activation function for providing computations, an activation function computation returning a pair of values indicating an upper and lower bound on the formula or subformula of the system formulae, or return a truth value of a proposition; and one neuron of the plurality of neurons exists for a corresponding proposition of the formula or subformula of the system formulae, and the one neuron having one or more linking connective edges corresponding to formulae providing information that prove bounds on a truth value of the corresponding proposition and information further comprising parameters configured to aggregate a tightest bounds; and the one or more hardware processors are configured to: receive an input query or a logical inference; evaluate, using the LNN structure, a logical inference based on the input query or logical inference; and responsive to the evaluating, outputting an output truth value either proving or not the logical inference within an aggregated tightest bounds.

In a further aspect, there is provided a computer program product for performing operations. The computer program products include a storage medium readable by a processing circuit and storing instructions run by the processing circuit for running a method. The method is the same as listed above.

BRIEF DESCRIPTION OF THE DRAWINGS

Objects, features, and advantages of the present disclosure will become more cl apparent when the following description is taken in conjunction with the accompanying drawings, in which:

FIG. 6A depicts an example method of a forward or upward pass evaluation of the bi-directional inference method of FIG. 5;

FIG. 6B depicts an example method of a backward or downward pass evaluation of the bi-directional inference method of FIG. 5;

FIG. 6C depicts an example method of aggregation in the bi-directional inference method of FIG. 5;

FIG. 7A illustrates an example LNN structure configured as a syntax tree graph structure depicting an example logical program;

FIG. 7B illustratively depicts an example LNN weighted logical neuron including a logical activation function, e.g., a disjunction neuron;

DETAILED DESCRIPTION

Figure 1:
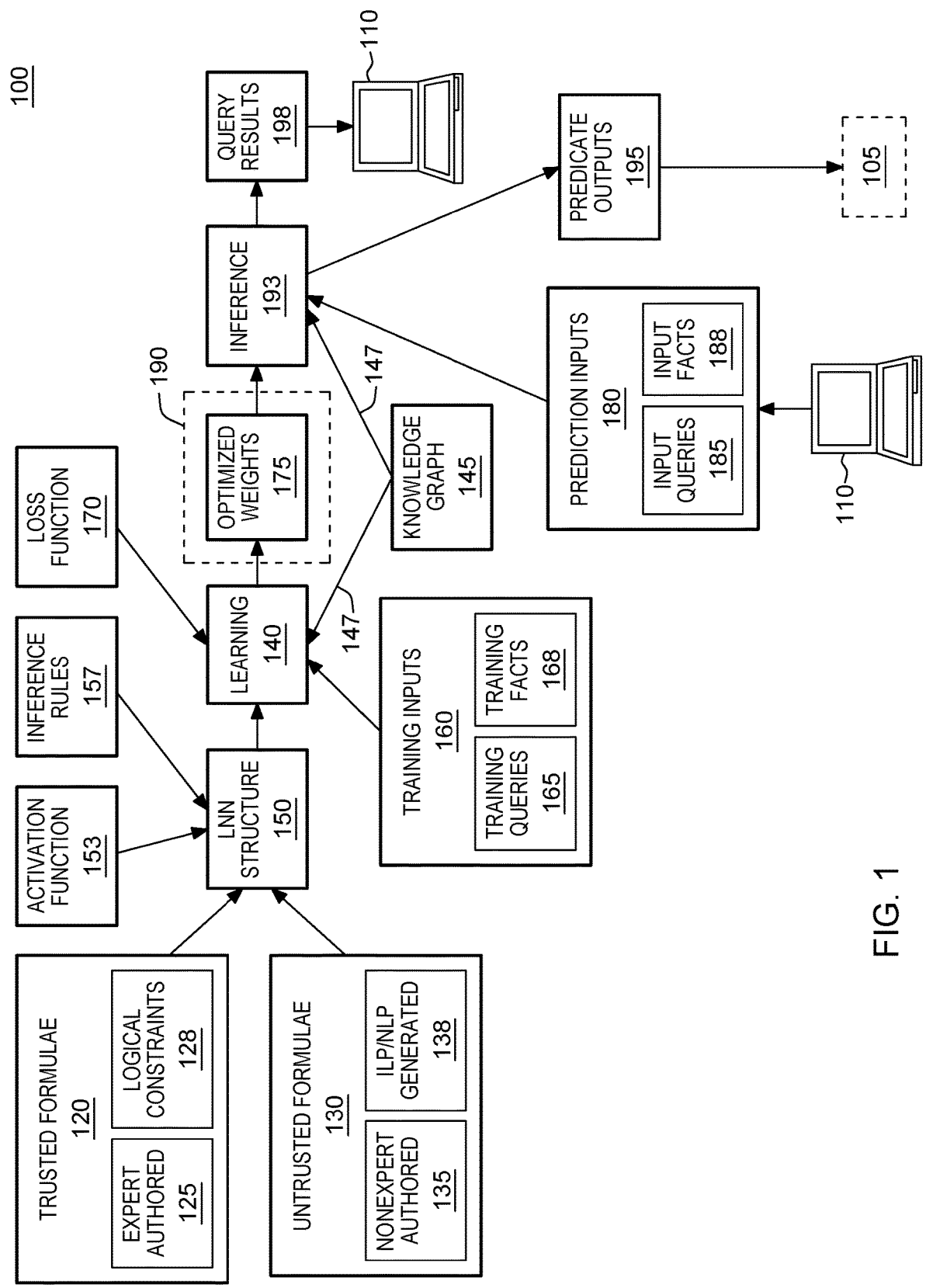
FIG. 1 a system and method of configuring and using a logical neueral network (LNN) according to an embodiment of the invention.

Symbolic logic is a way of encoding knowledge using symbols and logical operators. A central component of a symbolic system is a knowledge base (KB), which is a set of logical expressions. These expressions are expressed using one of the many logical knowledge representation languages, with propositional logic the simplest and least expressive, and first-order logic one of the most widely-used language. The logical expressions in the knowledge base are also referred to as axioms, when taken as given without being derived from other expressions. Axioms represent facts about some domain of interest and rules that govern that domain. Once knowledge has been ingested into a knowledge base, it can be used to answer questions/queries through logical inference, deriving new expressions from those contained in the knowledge base. Using a knowledge base KB to answer a query q is cast as proving the entailment KB⊨q. That is, does the set of facts and rules in the knowledge base prove the conjecture made by the query? There are several ways of proving entailment using logical inference. One of the simplest approaches is called model checking. A model in symbolic logic is an assignment of truth values to symbols contained in a logical expression or formulae, also referred to as an interpretation. Model checking enumerates all possible assignment of truth values to all symbols in the knowledge base and the conjecture, and the conjecture is considered proved if for all combinations in which the knowledge base is true the conjecture is also true. The complexity of model checking grows exponentially with the number of symbols in a KB, making it inefficient for large knowledge bases. Efficiency of logical inference can be improved by using theorem proving. Here, rules of inference are applied directly to axioms of a knowledge base to construct a proof of a desired query, without enumerating all the possible truth assignment of all symbols. A proof refers to a chain of conclusions (derived expressions) that leads to the desire query.

This disclosure provides a system, methods and computer program products for configuring and using a Logic Neural Network ("LNN"). The Logical Neural Network (LNN) is a neural net work ("net") that has a 1-to-1 correspondence with a system of logical formulae, in which evaluation is equivalent to logical inference. This is significant because the LNN simultaneously consolidates numerous key properties from both neural nets (learning) and symbolic logic (reasoning) for the first time: providing a system that is fully differentiable, symbolically interpretable, incorporates domain knowledge, supports compound first-order-logic (FOL) formulae and adheres to the open-world assumption. The LNN expands on traditional neural net inputs by nucorporating both rules and facts into its graph structure.

The neural network architecture, rigorously defines the notion of weighted fuzzy or classical logic to model individual neurons. Arranged in a one-to-one correspondence with the operations in a knowledge base (KB) of logical formulae, such a neural network is capable of inference in any direction, i.e. via normal evaluation, modus ponens, conjunction elimination, and all related inference rules.

A primary design objective of the LNN is for its evaluation to be able to behave equivalently to inference on a system of classical logical formulae (using an established set of inference rules). At the same time, it is of critical interest for the LNN to be continuously differentiable and, indeed, for its represented formulae to be able to vary continuously between different forms. To satisfy both of these seemingly incompatible requirements, there is introduced a rigorously defined notion of weighted fuzzy logic offering demonstrably sound inference rules and intuitive mathematical behavior, which happens to behave similarly to the rectified linear unit (ReLU) in modern neural network literature. Further, through the enforcement of constraints, a form of continuous classical logic is defined that is suitable for automated learning and yet guaranteed to behave exactly classically given classical inputs.

In an embodiment, the LNN is a feed-forward recurrent neural net with: a) Neurons arranged to match a system of formulae; b) Constrained neural weights to ensure classical logic behavior; and c) Families of neurons sharing related weights to perform inference. Unlike other neural networks, LNNs are different because: Neurons yield (tensors of) bounds pairs; and alternately, pairs of neurons with matching weights that exist for either bound.

The LNN system makes predictions as do all neural nets, e.g., takes input data, and generates a predicted output. The strategy used to compute predictions is different as it is structurally enforced to match a system of logical formulae, and its computation is constrained so that it is equivalent to performing inference with that system of logical formulae. The computations are highly interpretable and structured to make use of input, e.g., expert authored knowledge, pre-existing knowledge bases, and can perform complicated inferences.

While the LNN is represented as a structured graph, having nodes and interconnecting edges between nodes that establish positive and negative correlations between truth values and where any node can be an input or output, the LNN truth values are not required to have a probability interpretation and do not require a costly normalization. Special cases of LNNs can be developed that present results that do have probability interpretations.

FIG. 1 shows an example methodology 100 for configuring, training and using a logic neural network ("LNN" or "net") structure 150 to perform inferences. As referred to herein, the term "inference" refers to the computation of (bounds on) truth values for propositions, predicates, and formulae based on the knowledge of (bounds on) the truth values of other propositions, predicates, and formulae. Via multidirectional inference/reasoning, the inference performed by the LNN is iterative in nature, in the sense that tightening the bounds on a given truth value may enable the subsequent inference of tighter bounds on other truth values. The LNN is configured to implement weighted, real-valued logic in a neural network form that can be constrained to behave equivalently to classical logic (or fuzzy logic). In an embodiment, bounds on a formula and proposition truth values can be initialized according to available observations (thereby tolerating missing data), such that inference (i.e., evaluation of the neural network) yields results in the form of computed truth value bounds at specific neurons.

The LNN 150 computes two types of inferences: Forward inferences and backward inferences: For neuron operands or propositions A and B, forward and backward inferences include, but are not limited to, the following types:

Negation which the involution: A=1−~A

Conjunction including: 1) Conjunctive syllogism: (B&~(A&B))→~A; 2) Transposition: A→~(B & (A & B)); and 3) Tautology: A→(B→(A & B)) where "&" is a logic AND operator.

Disjunction including Disjunctive syllogism: (~B & (A⊕B))→A where "⊕" is a logic OR operator.

Implication (B) including: Modus ponens: (A & (A→B))→B

Implication (A) including:
1) Modus tollens: (~B & (A→B))→~A;
2) Transposition: A→~(~B & (A→B)); and
3) Tautology: A→((A→B)→B)

Generally, a logic neural network 150 combines properties of both neural networks (i.e., learning) with properties of symbolic logic (i.e., knowledge and reasoning), and in particular, is a neural net having a 1-to-1 correspondence with a system of logical formulae, in which evaluation is equivalent to a logical inference. The LNN structure is a neural network structure of nodes (or neurons) and connective edges with nodes configured for receiving inputs according to the type of inference problem being solved. Structurally, an LNN is a graph comprising the syntax trees of formulae in a represented knowledgebase (KB) connected to each other via nodes added for each proposition. Specifically, there exists one neuron for each logical connective occurring in each formula and, in addition, one neuron for each unique proposition occurring in any formula. All neurons return pairs of values in the range [0,1] representing upper and lower bounds on the truth values of their corresponding subformulae and propositions. The neural connections are managed with an explicit graph structure for navigation, traversal, shortest path discovery and use of general graph theoretical formulations.

FIG. 7A illustrates an example LNN structure configured as a syntax tree (knowledge graph) structure 700 depicting an example logical program comprising the following logical statements or formulae:

$A = B \& C;$ $B = C \& (\sim D) \& E;$ and $D = E.$

In FIG. 7A, nodes labeled D and E are proposition neurons providing inputs (e.g., facts about the world). Nodes labeled A and B are logical connective neurons implementing a logic function. In an embodiment, one neuron exists for each logical connective in a formula with inputs linking to neurons corresponding to the connective's operands and with parameters configured to implement the connective's truth function. As shown in FIG. 7A, associated with each node and connective is a respective pair of truth values having an upper bound value and lower bound value (e.g., $U_A$, $L_A$, $U_B$, $L_B$) ranging between [0,1], i.e., uncertainty bounds $\in [0,1]$, that are computed recursively in forward and backward inference passes to obtain/update a degree of truth or uncertainty of a particular logical inference being evaluated. In an embodiment, a neuron exists for each proposition with inputs linking to neurons corresponding to formulae that prove bounds on the proposition's truth value and with parameters configured to aggregate the tightest such bounds, FIG. 7B depicts an example LNN weighted logical neuron 710 implementing an activation function 712 shown, for example, as $f(x \cdot w - \theta)$ representing a logical function, e.g., a disjunction neuron, ⊕(x), or conjunction neuron, &(x), the logical function receiving one or more input operands $x_0, x_1, \ldots, x_i, \ldots, x_n$ with each operand having a respective assigned or computed weight $w_0, w_1, \ldots, w_i, \ldots, w_n$ representing an importance, where $\theta$ is a constraint. In embodiments, the parameters of each neuron's activation function is adjusted to effect (nonnegative) importance weighting over the neuron's inputs (and, optionally, output), in particular establishing the set of participating inputs as those that have nonzero importance weight. In an embodiment, a generalisation of logical properties such as compositionality, associativity and commutivity can be used to determine a neuron's initialisation and operational parameters, purposefully administering the operational functionality of neurons as logic gates. Generally, neurons corresponding to logical connectives accept as input the output of neurons corresponding to their operands and have activation functions configured to match the connectives' truth functions. Neurons corresponding to propositions accept as input the output of neurons established as proofs of bounds on the propositions' truth values and have activation functions configured to aggregate the tightest such bounds. Proofs for propositions may be established explicitly, e.g. as the heads of Horn clauses, though bidirectional inference permits every occurrence of each proposition in each formula to be used as a potential proof. Negation is modeled as pass-through node with no parameters, canonically performing NOT(x)=1−x, or ¬p=1−p.

Returning to FIG. 1, the LNN structure 150 is configured to include nodes (neurons) each configured with a corresponding activation function 153 attached for determining how the corresponding node is to compute, e.g., whether and how the particular node is to be activated (or not), based on whether that neuron's input is relevant for the type of prediction problem the model is to solve. An activation function can be linear or non-linear and an output of each neuron can be a value ranging between 1 and 0.

Further as shown in FIG. 1, the LNN is configured to include inference rules 157 which are functions representing and enforcing a logical form that take a premise(s), analyzes the syntax of the premise(s), and infers and returns a conclusion (or conclusions) from the premise(s). The LNN is configured as a logical theorem prover that: a) uses the full family of inference rules associated with each connective; and b) focuses on proving truth values at subformulae occurring in the network rather than at new formulae. Unlike other theorem provers, LNNs are different because: a) Truth values are continuous; and b) Connectives have weights. A comprehensive set of inference rules enforced within the LNN structure include, but are not limited to: Rules for Negation (e.g., negation introduction, negation elimination, double negation introduction, double negation elimination); Rules for Conditionals (e.g., conditional introduction, Modus ponens (conditional elimination), Modus tollens); Rules for Conjunctions (e.g., conjunction introduction, conjunction simplification); Rules for Disjunctions (e.g., disjunction introduction, disjunction simplification, disjunctive syllogism); and Rules for Biconditionals (e.g., biconditional introduction, biconditional elimination).

As further shown in FIG. 1, the LNN structure 150 of network nodes are configured to receive both "trusted" formulae 120 used for computation and inference, having neural weights and parameters that do not need to be learned and can be used as they are; and "untrusted" formulae 130 that come from non-expert sources or machine-generated sources and can include information that can potentially cause contradictions. Such formulae can be a system of formulae obtained from an ontology before training (e.g. collection of rules taken as true that describe how something works, such as from Cyc® Ontology and knowledge base (trademark of Cycorp, Inc.)). In an embodiment, components of the logical neural network are initialized based on formulae taken from an existing logical knowledge base, specifically with neural inputs and parameters chosen to match the syntax and behavior of the various connectives making up the formulae borrowed from the knowledge base and initial bounds on formula and proposition truth values chosen to match the borrowed facts.

In the embodiment shown in FIG. 1, trusted formulae 120 includes one or more expert authored formulae or inferences 125 and logical constraints 128 that are constraints specified or declared according to a particular domain knowledge and that are to be enforced during training. These constraints are further input as a component of queries performed upon the model to determine inputs that satisfy constraints. Further, untrusted formulae 130 includes one or more non-expert formulae or inferences 135 and inductive logic programming (ILP)/natural language processing (NLP) machine sourced inputs 138. Once these sources are configured in the LNN network structure 150 the LNN is capable of computing and from inferences/formulae already provided, and thus the LNN is used as a computational device.

Using standard neural network tools, the LNN passes through a learning phase 140 that receives LNN training inputs 160, and is further informed by knowledge graph 145 including knowledge graph data 145, sourced by a knowledgebase ("KB"), e.g., DBpedia, WordNet or like knowledge base or lexical resource that provides unstructured and structured cross-domain knowledge data. The DBpedia knowledge base responds to queries by accessing a Resource Description Framework (RDF) representation of extracted information (e.g., on the order of billions of structured RDF triples). Example, training inputs 160 include ground-truth bounds for proposition (nodes) including data that is presented in the form of observed training facts 168 with some annotated ground truth statement, and training queries 165 that include a formula/formulae, such that, given the training facts, knowledge and inference rules, a logical truth can be inferred by the LNN. During training phase, evaluation steps are performed including recursive forwards and backwards inference passes of the initial syntax tree(s) programmed with initial conditions, e.g., arrangement of logic formulae, importance weight values assigned to propositions and/or predicates, given truths, etc. The inference evaluations are continuously performed to obtain result(s) and based on the result(s), there is an associated loss and a gradient measure associated with the loss function (i.e., a collection of partial derivatives of the loss function with respect to each of the model's parameters). Based on the gradient results after each convergence (after evaluations are complete), each individual LNN model parameter(s) values can be updated or tweaked to improve the score. In an embodiment, an importance weight of each occurrence of each proposition in each formula is reused as the basis of the importance weight of the corresponding proof when aggregating tightest bounds for the proposition.

Guiding the learning process is a loss function 170, input to the LNN for establishing an appropriate loss (e.g., minimum square error). However, for the LNN 150 a logical consistency can also be used as loss. That is, based upon the knowledge graph data input, training facts data input, and formulae, if logical contradictions exist, i.e., crossed-upper bounds and lower bounds, they are penalized, and there is an error associated with any inconsistency.

During training, to improve measure of performance of the LNN model, the parameters of the model are tweaked/re-tweaked to minimize the loss function measure of error the model is committing. During training, an optimization is performed to minimize loss. In an embodiment, initially there is indicated at each path of inference, the truth values that are presented as known, i.e., measured, that serve as input as facts (TRUE). Unknown (UNK) values remain that need to be updated during forward and backwards tree traversals.

Once the learning/training process 140 is performed, a new LNN model 180 is obtained having optimized weights 175 that avoids contradictions and is used to process queries and make inferences. As shown in FIG. 1, the optimized LNN model 190 is thus used during an inference phase 193, wherein the LNN model 190 receives one or more prediction inputs 180 in the form of input prediction queries 185 and input facts 188, e.g., queries and facts received from a remote computer device 110 associated with a user in the outside world, and the knowledge graph data 147 used with the model. The optimized LNN model 190 responds to the input query 185, input facts 188 and knowledge graph data 147 to generate infer predicate outputs 195, e.g., everything the LNN predicts during the inference phase, and which outputs can be fedback input any system 105 using the optimized LNN model. The LNN model further can generate query results 198, i.e., answers to a posed query. For example, for a posed query "Does this picture include a cat?" the LNN model will output the answer for receipt by and/or for presentation to a user via the computer or mobile device display 110.

Some key innovations that set the LNN aside from other neural networks are: Tailored neural activation functions constrained to match the truth functions of the connectives they represent. Results expressed in terms of bounds on truth values so as to distinguish known, unknown, and contradictory states; and bidirectional inference permitting, e.g., $x \rightarrow y$ to be evaluated in its own right in addition to being able to prove y given x or, just as well, $\neg x$ given $\neg y$.

As mentioned, structurally, an LNN is a graph comprising the syntax trees of all formulae in the represented KB connected to each other via nodes added for each proposition. Specifically, there exists one neuron for each logical connective occurring in each formula and, in addition, one neuron for each unique proposition occurring in any formula. All neurons return pairs of values in the range [0,1] representing upper and lower bounds on the truth values of their corresponding subformulae and propositions. Neurons corresponding to logical connectives accept as input the output of neurons corresponding to their operands and have activation functions configured to match the connectives' truth functions.

Activation Functions

There are many candidate activation functions that can accommodate neurons' corresponding connectives' classical truth functions, each varying in how it handles inputs strictly between 0 and 1. For instance, $\min\{x, y\}$ is a suitable activation function for real-valued conjunction $x \otimes y$, but then so is $x \cdot y$ as well as $\max\{0, x+y-1\}$. The choice of activation function is significant because it interacts with the LNN's differentiability as well as whether various tautologies in classical logic, e.g. $(x \rightarrow y) \equiv (\neg x \vee y)$, bear out across the entire [0, 1] range. LNNs are defined generally, aiming to support as many such activation functions as possible, though a handful of requirements stand:

Domain and range. Activation functions must return values within the range [0, 1] for inputs within the range [0, 1].

Monotonicity. The activation functions for conjunction and disjunction must increase monotonically with respect to each operand, and the activation function for implication must decrease monotonically with respect to the antecedent and increase monotonically with respect to the consequent.

Neurons in LNNs return upper and lower bounds on truth values rather than scalar results. This is achieved by applying the selected activation function twice, as appropriate: both conjunctions and disjunctions compute lower bounds from lower bounds on inputs and upper bounds from upper bounds on inputs, while implications compute lower bounds from upper bounds on antecedents and lower bounds on consequents and vice versa. Ellis simplistic approach to bounding is what mandates the use of monotonic functions.

Useful though not required properties of activation functions are as follows:

1. The De Morgan laws. Conjunction and disjunction should be related via the De Morgan laws, i.e. real-valued disjunction $x \oplus y$ should yield both $(x \oplus y) = \neg x \otimes \neg y)$ and $(x \otimes y) = \neg (\neg x \oplus \neg y)$.

2. Implication via the residuum. Implication should be the residuum of conjunction, or specifically $(x \rightarrow y) = \max\{z: y \geq (x \otimes z)\}$. The motivation for defining real-valued implication $x \rightarrow y$ this way is to make modus ponens equivalent to conjunction via $y \geq (x \otimes (x \rightarrow y))$.

3. Commutativity and associativity. Conjunction and disjunction should be commutative and associative (though permitting the reconfiguration of parameters, if any) and the antecedents of implication should be commutative, i.e. such that $(x_1 \rightarrow (x_2 \rightarrow y)) = (x_2 \rightarrow (x_1 \rightarrow y))$.

Each of the above aims to preserve intuitive inference behavior for human viewers and authors of formulae used by LNNs. Observe that these properties do not guarantee that $(x \rightarrow y) = (\neg x \oplus y)$, that $((x \rightarrow 0) \rightarrow 0) = x$, or that $(x \otimes x) = (x \oplus x) = x$, though these identities are independently true for certain choices of activation function.

Triangular norms, or t-norms, and their related t-conorms and residua are natural choices for LNN activation functions as they already behave correctly for classical inputs and have well known inference properties. Logics defined in terms of such function are denoted t-norm logics. Common examples of these include:

|  | Gödel | Product | Lukasiewicz |
|---|---|---|---|
| T-norm | $\min\{x, y\}$ | $x \cdot y$ | $\max\{0, x + y - 1\}$ |
| T-conorm | $\max\{x, y\}$ | $x + y - x \cdot y$ | $\min\{1, x + y\}$ |
| Residuum | y if x > y, else 1 | $\frac{y}{x}$ if $x > y$, else 1 | $\min\{1, 1 - x + y\}$ |

Of these, only Lukasiewicz logic offers the familiar $(x \rightarrow y) = (\neg x \oplus y)$ identity, while only Godellogic offers the $(x \otimes x) = (x \oplus x) = x$ identities.

Weighted Activation Functions

While the t-norms and related functions listed above satisfy the requirements for LNN activation functions, they do not offer tunable parameters for the purpose of model optimization and learning. It is thus of interest to introduce the concept of importance weighting, whereby neural inputs with larger (nonnegative) weight have more influence on neural output and, intuitively, neural inputs with zero weight have no influence. In general, this can take many forms.

While importance weighting is a key feature of LNNs, it is not required in order for LNNs to be useful in a given setting. LNNs using strictly unweighted activation functions can still reason with partial confidence in their constituent formulae and can infer real-valued truth values provided input truth values anywhere in the [0, 1] range. Also, importantly, LNNs' differentiability permits them to pass gradient computations from whatever system consumes their output (e.g., a loss function) to whatever system produces their input (e.g., another neural network responsible for extracting predicate data from differently structured data, such as images or text).

Propositional LNN Example Use Case

Referring to FIG. 1, an example logical neural net 150 is formed based on a first observations and theorizing phase in which observations are recorded and facts and rules regarding those observations are theorized. In an example use-case of FIG. 2A, during these phases, it may observed that: an entity that is a dog having a tail and whiskers further chases. It may be observed that there is no other devices such as a laser pointer that the entity is chasing. A further observation may be an observation of an entity that is a cat with a tail and whiskers, and that it chases and that there is no laser. From these observations, it could be theorized that 1) cat.nand.dog, e.g., An entity can either be a cat or a dog, but not both; 2) implies.cat, e.g., an entity with a tail, whiskers and that chases, and chases a laser implies a cat, or an entity with a tail, whiskers and that only chases a laser implies a cat. Alternatively, a cat rule can be theorized, e.g., cat.rule: Every cat has a tail, whiskers, and chases only lasers.

The LNN build progresses to a logic programming stage in which corresponding predicate and/or propositional elements, e.g., dog, tail, whiskers, chases, laser (or ~laser), etc. are defined, and logical formula using these elements corresponding to the theory or rule are proposed, e.g., 1)~(cat & dog); 2) tail & whiskers & (laser→chases)→cat; 3) tail & whiskers & (laser→chases) & (chases→laser)→cat.

In an example theorized cat rule, a logic formula may be devised such as:

cat→tail & whiskers & (laser→chases) & (chases→laser).

In an embodiment, the logic neural network is built as a neural net program. During a programming stage that further includes the converting of the corresponding propositional elements and proposed logic formulae into a programmed LNN structure using a programming language for graphic user interface applications. For the example proposed something implies.cat theory, Python programming language statements include the following:

g['cat.nand.dog']=Not(And('cat', 'dog'))
g['laser→chases']=Implies('laser', 'chases')
g['chases→laser']=Implies('chases', 'laser')
g['cat.feats']And('tail', 'whiskers', 'laser→chases', 'chases→laser')
g['implies.cat']=Implies('cat.feats', 'cat')

Then, a further LNN build phase includes the mapping of the programmed statements of the LNN into a graphic structure, e.g., a knowledge graph or syntax tree.

Figure 2A:
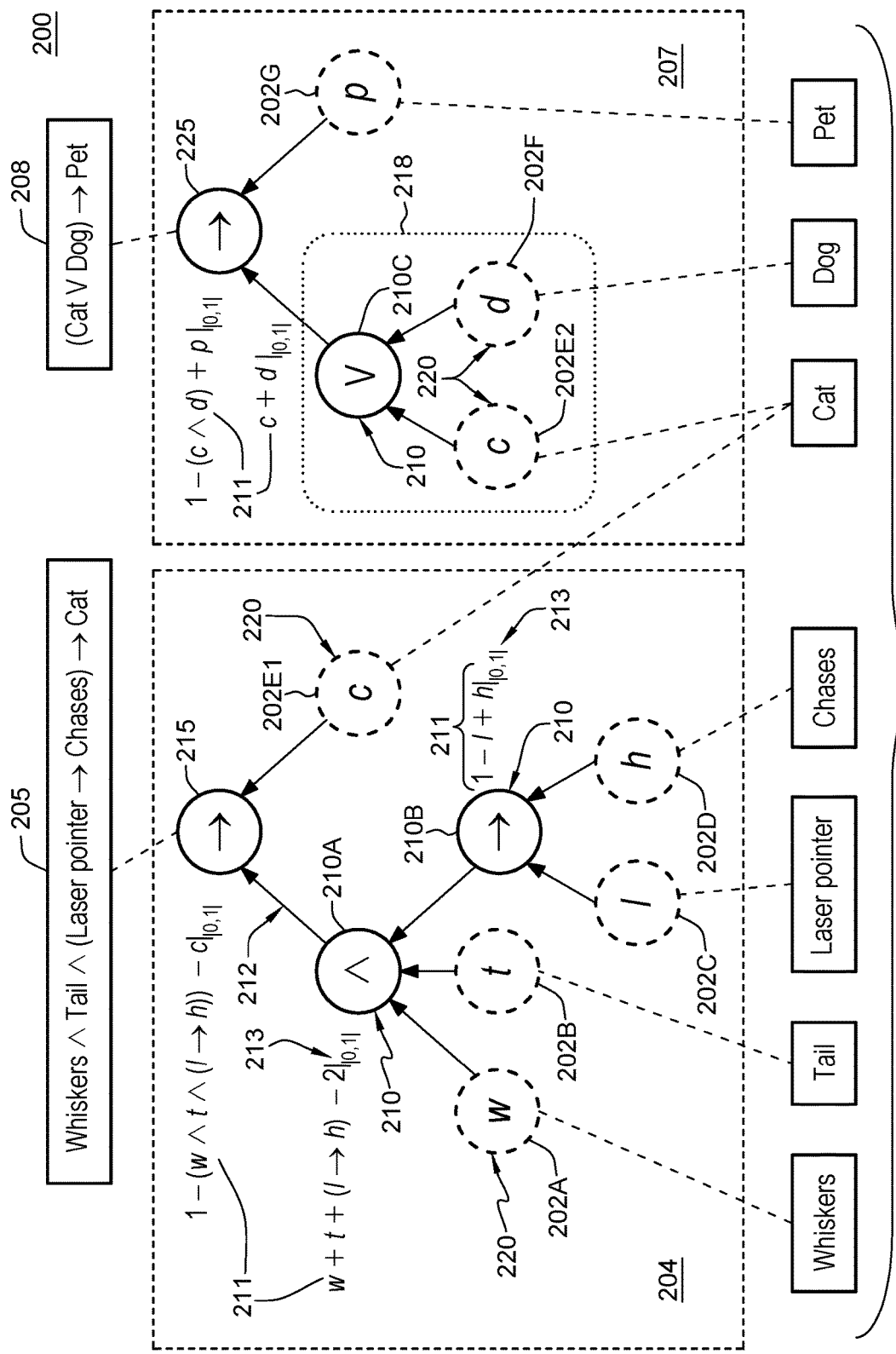
FIG. 2A depicts a knowledge graph tree structure depicting a use-case example of an LNN.

FIG. 2A shows depicts an example use-case of a logic neural network ("net") 200 formed in accordance with the methods herein. While in general the LNN is described in terms of first-order logic, the following use-case example first describes the LNN restricted to the scope of propositional logic. As shown in FIG. 2A, there is one neuron 210 per logical connective or edge 212 plus one neuron 220 per proposition/predicate 202. Each generated neuron 210 has a 1-to-1 correspondence with a system of logical formulae 205, 208 in which evaluation is equivalent to a logical inference. For generating logical neural networks, a computing system receives inputs, e.g., knowledge graph/prediction input data/facts for use in outputting a truth value (represented by upper and lower bounds) at any neuron, e.g., usually one pertaining to a query formula. The neurons 210 are arranged to match formula syntax trees and proposition/predicate neurons 220 both provide and recurrently aggregate proved truth values. In general, negation (and first-order quantifiers) are pass-through nodes with no parameters. As shown certain neurons 210 give uncertainty bounds 213 of a value between 0 and 1. Each neuron 210 has a tailored activation function 211 whose computation results in the bounds on truth values. Further methods of bidirectional inference are employed.

As shown in FIG. 2A, the example use-case knowledge graph (net) 200 includes a syntax tree graph structure 204 constructed to correspond to the logic formula 205 at the time of LNN model creation and shown in symbolic logic reasoning. A second syntax tree structure 207 is shown in FIG. 2A that is constructed to correspond to the input logic formula 208 also at model creation time. Input logic formulae 205, 208 are rules about the world and can be authored by experts, or generated in a haphazard way, e.g., extracted by an ILP or NLP device. Formulae 205, 208 can be known formulae or portions thereof, i.e., sub-formulae, and can be subject to modification or be tweaked at model creation time and/or during prediction or inference time. That is, certain inputs to formulae or inputs (e.g., operands) to sub-formula can be weighted based on their importance, and consequently can be assigned with importance weights that become part of the structure of the LNN. Thus, each operand of each connective in the formula is or can be assigned importance weights, and allows for modifications of each formulae or weights unless they are optimized.

For the use-case example, for sub-graph 218 "cat" node can be weighted twice as important as "dog" and thus is a modified version of the disjunction "OR" connective that skews results in the sense that "cat" now has more influence than "dog" does in the formula.

Each of the syntax tree graphs 204, 207 for respective formula are constructed based on an initial list of input propositions 202 having a defined truth value (e.g., true or false) including: "whiskers" 202A, "tail" 202B, "laser pointer" 202C, "chases" 202D, "cat" 202E1, 202E2, "dog" 202F, and "pet" 202D existing in the formulae. Alternately, these inputs could be predicates, e.g., statements whose truth value depends upon more than one variable(s). The logical formulae 205, 208 are applied that result in an evaluation of a respective inference or implication (e.g., "Whiskers∧Tail∧(Laser pointer→Chases)), →Cat") and evaluation of an inference or implication (e.g., "Cat∨Dog)→Pet"). In FIG. 2A, a sub-formula is shown as corresponding sub-graph 218 (e.g., "Cat∨Dog"). Though inference rules are not depicted, there is depicted the activation functions 211 that exist at particular nodes 210 based on a particular chosen logic, e.g., Lukasiewicz logic. The activation functions 211 are shown corresponding to particular logical connectives, e.g., nodes 210A, 210B, 210C that exist in the formulae 205, 208. Example classical propositional logical connectives employ Boolean operations, e.g., include AND, OR, implication, an negation and logical equivalence and employ truth values as ones or zeros.

During a learning process, as depicted at step 140, FIG. 1, a forward inference pass is performed in which expressions are evaluated first to come up with truth values at each node. In the use-case example of FIG. 2A, implications are evaluated first. For laser implies chases, even though laser is unknown, chases is true (using fuzzy values, it may have a high lower bound), and that is enough to evaluate "laser implies chases" node as true (so its lower bound may be a high lower bound, e.g., 0.95). With information that "Tails" and "Whiskers" are true, will cause the cat.features node to have a high lower bound, and that is pushed to implies.cat node. As "cat" truth value is unknown, essentially the inference is computed as, the "true implies an unknown", so its truth value can not be evaluated at this point and a computed upper and lower bounds remain loose (e.g., it cannot yet be evaluated as true or false). However, in this example, as "implies.cat" has been initially given as true, the bounds are not changed as the tightest bounds are kept. Similarly, in an upwards (forward) pass of the other part of the graph, given "cat" is unknown and "dog" is true, the tightness of bounds at the conjunction operations would remain unknown (either lower and upper bound) and not enough to give tight bounds and the bounds remain loose at the negation operation. Thus, at "cat.nand.dog", the computation of bounds would be loose (low lower bound, high upper bound), however given its truth value, the bounds do not have to be tightened. Thus, in a forward pass, the model has learned as true the cat.features implication and laser.implies chases.

During a backwards (downward) inference pass, a recursive depth-first traversal of tree is performed from each root to each of its leaves, performing inverse inference rules along the way all the while tightening its upper and lower bounds. In an example backward (downwards inference pass) from implies.cat node (=true) and given that the system has now learned in the forward pass that cats.features is true, then using modus pollens, then the "cat" expression becomes true.

In one aspect, fuzzy logic is employed that provides degrees of truth values that range between zero and one, i.e., values in between 0 and 1 are ambiguous mixtures between true and false. In an embodiment, alpha α is defined as a threshold of truth ranging between, e.g., 0.5<α≤1. Thus, any evaluated truth value is constrained such that values above α are considered "True" and any truth value less than a quantity 1-α is considered "false".

An activation function 211 is the particular function at each neuron 210 to compute an output of that neuron, and is chosen to represent a particular logical operation or a family of activation functions are chosen that represent logical operations that are consistent with a particular logic scheme, e.g., Łukasiewicz logic. For example, as shown in sub-formula 218 the activation function is a disjunction function that is evaluated as the addition (sum) of the inputs. In the "unweighted" case example depicted in FIG. 2A, the disjunction activation function at node 210C provides an output that is clamped to be a value 0 or 1.

In an embodiment, for real-valued logical connectives, example activation functions compute truth value according to constraints as follows:
For a Conjunction (AND):

$$p \otimes q = \max(0, p+q-1)$$

where p and q are operands, the constraint is the sum of the two operand value inputs minus 1 clamped below by 0.
For Disjunction (OR):

$$p \oplus q = 1-((1-p) \otimes (1-q)) = \min(1, p+q)$$

i.e., the sum of the two operand input values clamped above by 1.
For Implication (→):

$$p \rightarrow q = (1-p) \otimes q = \min(1, 1-p+q)$$

i.e., is similar to disjunction however, one of the inputs is negated (1-p). As an example, as shown at node 210A, the activation function is a conjunction function. In the "unweighted" case example depicted in FIG. 2A, the conjunction function activation function according to Łukasiewicz logic is evaluated as the addition (sum) of the inputs minus the number of elements plus one (1).

Other activation functions according to other logic schemes can be employed in embodiments. Moreover, different logistic functions can be used as activation functions in different parts of the LNN. For example, a "weighted" Łukasiewicz logic scheme for logical connectives is employed, where activation functions compute truth values as follows:
Weighted Łukasiewicz Logic
The binary and n-ary weighted Łukasiewicz, t-norms, used for logical AND, are given $$\beta(x_1^{\otimes w_1} \otimes x_2^{\otimes w_2}) = \max(0, \min(1, \beta - w_1(1-x_1) + w_2(1-x_2)))$$

$$\otimes_{i \in I}^{\beta} x_i^{\otimes w_i} = \max(0, \min(1, \beta - \Sigma_{i \in I} w_i(1-x_i)))$$

for input set I, nonnegative bias term β, nonnegative weights $w_i$, and inputs $x_i$ in the [0, 1] range. By the De Morgan laws, the binary and n-ary weighted Łukasiewicz t-conorms, used for logical OR, are then:

$$(x_1^{\oplus w_1} \oplus x_2^{\oplus w_2}) = \max(0, \min(1, 1-\beta + w_1 x_1 + w_2 x_2))$$

$$\oplus_{i \in I}^{\beta} x_i^{\oplus w_i} = \max(0, \min(1, 1-\beta + \Sigma_{i \in I} w_i x_i))$$

In either case, the unweighted Łukasiewicz norms are obtained when all $w_i = \beta = 1$; if any of these parameters are omitted, their presumed value is 1. The exponent notation is chosen because, for integer weights k, this form of weighting is equivalent to repeating the associated term k times using the respective unweighted norm, e.g., $x^{\oplus 3} = (x \oplus x \oplus x)$. Bias term β is written as a leading exponent to permit inline ternary and higher arity-norms, for example $\beta(x_1^{\oplus w_1} \oplus x_2^{\oplus w_2} \oplus x_3^{\oplus w_3})$, which require only a single bias term to be fully parameterized. It is observed that β and the various $w_i$ establish a hyperplane with respect to the inputs $x_i$, though results are clamped to the [0, 1] range; the resulting activation functions are thus similar to the rectified linear unit (ReLU) from neural network literature.

Bias term β is motivated in that it permits classically equivalent formulae x→y, ¬y→¬x, and ¬x⊗y to be made equivalent in weighted Łukasiewicz logic by adjusting β. The weighted Łukasiewicz residuum, used for logical implication, solves $$= \max(z : y \geq^{\beta/w_y} (x^{\otimes \beta w_x/w_y} \otimes z^{\otimes 1/w_y}))$$

and is given $$\beta(x^{\otimes w_x} \rightarrow y^{\otimes w_y}) = \max(0, \min(1, 1 = \beta - w_x(1=x) + w_y y)) = \beta ((1=x)^{\oplus w_x} \oplus y^{\oplus w_x})$$

In each of the above constraints, β is a bias term establishing an operation, weights w express importance, with $w_x$ a weight for input operand x and $w_y$ a weight of input operand y. Bias term β can be a value of 1, although it could be another value. Inside the clamps is an expression or formula of a hyperplane, i.e., a dot product between the weights (inputs) vector plus an offset.

Note the use of ⊗ in the antecedent weight but ⊕ in the consequent weight, meant to indicate the antecedent has AND-like weighting (scaling its distance from 1) while the consequent has OR-like weighting (scaling its distance from 0). This residuum is most disjunction-like when β=1, most (x→y)-like when $β=w_y$, and most (¬y→¬x)-like when $β=w_x$; that is to say, $β=w_y$ yields exactly the residuum of $$x^{\otimes w_x/w_y} \otimes z^{\otimes 1/w_y}$$

(with no specified bias term of its own), while $β=w_x$ yields exactly the residuum of $$(\neg y)^{\otimes w_x/w_y} \otimes z^{\otimes 1/w_x}.$$

The Łukasiewicz norms are commutative if one permutes weights $w_i$ along with inputs $x_i$, and are associative if bias term $\beta \leq \min\{1, w_i : i \in I\}$. Further, they return classical results, i.e. results in the set {0, 1}, for classical inputs under the condition that $1 \leq \ominus \leq \min\{w_i : i \in I\}$. This clearly requires β=1 to obtain both associative and classical behavior, though neither is a requirement for LNN. Indeed, constraining $\beta \leq w_i$ is problematic if $w_i$ goes to 0, effectively removing i from input set I, whereupon the constraint should no longer apply.
Parameter Semantics Weights $w_i$ need not sum to 1; accordingly, they are best interpreted as absolute importance as opposed to relative importance. As mentioned above, for conjunctions, increased weight amplifies the respective input's distance from 1, while for disjunctions, increased weight amplifies the respective input's distance from 0. Decreased weight has the opposite effect, to the point that inputs with zero weight have no affect on the result at all.

Bias term $\beta$ is best interpreted as continuously varying the "difficulty" of satisfying the operation. In weighted Lukasiewicz logic, this can so much as translate from one logical connective to another, e.g., from logical AND to logical OR. Constraints imposed on $\beta$ and $w_i$ can guarantee that the operation performed at each neuron matches the corresponding connective in the represented formula, e.g., when inputs are assumed to be within a given distance of 1 or 0.

Activation Functions for Aggregation

In contrast to neurons pertaining to connectives in the represented set of formulae, neurons pertaining to atoms require a slightly modified family of activation functions in order to function. In particular, these must aggregate truth values bounds found for various computations identified as proofs of the atom. For example, $x_1 \otimes x_2 \otimes x_3$ may be considered a proof of y if $(x_1 \otimes x_2 \otimes x_3) \rightarrow y$ exists in the network. In addition, separate formulae $(x_1 \otimes x_4) \rightarrow y$ and $(x_2 \otimes x_4) \rightarrow \neg y$ may constitute further proofs (and disproofs) of y.

The most straightforward means of aggregating proven truth values is to return the maximum input lower bound truth value and minimum input upper bound truth value. On the other hand, it may be desirable to employ importance weighting in aggregation as well. To this effect, one may use either the weighted Lukasiewicz or weighted Godel norms to aggregate proven truth value bounds (observing, however, that the Lukasiewicz norms are very prone to amplify numerous sources of weak evidence into strong evidence of truth or falsity). This is done by computing the real-valued OR of the input lower bounds and the real-valued AND of the input upper bounds. To be clear, this is where activation functions for aggregation differ for activation functions for connectives: whereas connectives use the same norm for both upper and lower bounds, aggregations use opposite norms for either bound.

Weights for different proofs involved in an aggregation may be learned the same as weights for connectives' operands. Alternately, weights used in formulae serving as proofs of atoms may be reused as weights on the proofs themselves. In an embodiment, weights for different proofs involved in an aggregation may be learned the same as weights for connectives' operands. Alternately, weights used in formulae serving as proofs of atoms may be reused as weights on the proofs themselves. For example, if $z_1 = (x_1^{\otimes 3} \rightarrow y^{\oplus 2})$ and $z_2 = (x_2^{\otimes 1} \rightarrow y^{\oplus .5})$ are proofs of y, then y's lower and upper bounds may be aggregated $y \geq (L_{y,1}^{\oplus 2} \vee L_{y,2}^{\oplus .5})$ and $y \leq (U_{y,1}^{\otimes 2} \wedge U_{y,2}^{\otimes .5})$, respectively, for bounds $L_{y,i}$ and $U_{y,i}$ computed for either proof via modus ponens from like bounds on $x_i$ and $z_i$.

In principle, there are many candidate activation functions that can accommodate a neuron's corresponding connective's classical truth function, each varying in how it handles inputs strictly between 0 and 1. The choice of activation function is significant because it interacts with the LNN's differentiability as well as whether various tautologies in classical logic, e.g., $p \rightarrow q \equiv \neg p \vee q$, bear out across the entire [0, 1] range.

Triangular norms, or t-norms, and their t-conorms and residua, as thoroughly explored in the fuzzylogic literature, are natural choices for such activation functions. These already behave correctly for classical inputs and have well known inference properties. Ordinarily, however, t-norms do not bear useful parameterizations that may serve as targets for neural net optimization. Accordingly, for the activation function of AND, the binary and n-ary weighted Lukasiewicz t-norms are defined as:

$$x_1^{\otimes w_1} \otimes^\beta x_2^{\otimes w_2} = \max(0, \min(1, \beta - w_1(1-x_1) - w_2(1-x_2)))$$

$$\otimes_{i \in I}^\beta x_i^{\otimes w_i} = \max(0, \min(1, \beta - \Sigma_{i \in I} w_i(1-x_i)))$$

for input set I, bias term $\beta$, weights $w_i$, and inputs $x_i$. The standard Lukasiewicz t-norm is obtained when $\beta$ and all $w_i = 1$. The exponent notation is chosen because, for integer weights k, this form of weighting is equivalent to repeating the associated term k times using the standard Lukasiewicz t-norm, e.g. $p^{(2)} \otimes^1 q^{(1)} = p \otimes p \otimes q$.

For the activation function of OR, the associated weighted t-conorms are:

$$x_1^{(w1)} \oplus^\beta x_2^{(w2)} = 1 - ((1-x_1)^{(w1)} \otimes^\beta (1-x_2)^{(w2)})$$

$$\otimes_{i \in I}^\beta x_i^{\oplus w_i} = 1 - \otimes_{i \in I}^\beta (1-x_i)^{(w_i)}$$

These are shown to be associative under reasonable constraints on the weights and to have weighted residuum (i.e. IMPLIES)

$$p^{(w_p/w_q)} \otimes^{(\beta/w_q)} (p \rightarrow q)^{(1/w_q)}$$

$$p^{(w_p)} \rightarrow^\beta q^{(w_q)} = (1-p)^{(w_p)} \oplus^\beta q^{(w_q)}$$

i.e., exactly the classical tautology over the entire [0,1] range. For the LNN, for use cases taking an existing knowledge base defined with the presumption of being evaluated according to classical logic scheme is able to be evaluated using these weighted fuzzy logic schemes.

Numerous other tautologies also transfer directly from both unweighted fuzzy logic and classical logic hold including: associativity (under reasonable constraints), negation ($\neg p = 1 - p$), double negation/elimination ($\neg \neg p = p$), implication tautology ($p \rightarrow q = \neg p \oplus q$) holds, De Morgans laws, etc. These operations are mathematically equivalent to doubly-clamped ReLUs, though a smooth sigmoid function may be used in place of the clamps to preserve gradient information in the clamped regions.

Inference

Inference refers to the entire process by which truth value bounds for (sub)formulae and atoms are computed based on initial knowledge, ultimately resulting in predictions made at neurons pertaining to queried formulae or other results of interest. LNN characterizes this process with multiple passes over the represented formulae, propagating tightened truth value bounds from neuron to neuron until computation necessarily converges. Thus, in addition to the important upward pass of inference, whereby formulae compute their truth value bounds based on bounds available for their subformulae, there is a downward pass, which permits prior belief in the truth or falsity of formulae to inform truth value bound for propositions or predicates used. In an embodiment, an evaluation shortcut procedure is implemented in which computations are managed with a priority queue or similar data structure, such that the method iteratively (re)computes truth value bounds for each neuron popped from the queue and then, only if the bounds are observed to tighten, pushes onto the queue all neurons accepting the popped neuron as input.

Bidirectional Inference

In addition to computing truth value bounds for the output of each connective based on its inputs, the LNN infers truth value bounds for each of the connective's inputs according to the inverse of the connective's activation function with respect to that input and known truth value bounds for the connective's output and other inputs. The downward pass of inference performs all such inverse computations in a depth-first traversal over the neurons representing each formula's syntax tree.

Depending on the type of connective and which input is involved, such computations correspond to the familiar inference rules of classical logic. That is, in an embodiment, the bi-directional inference rules for Lukasiewicz activation functions are propagated that are equivalent to inference rules in classical logic form, e.g., modus ponens and related:

x, x→y⊢y (moth's pollens)
¬y, x→y⊢¬x (modus tollens)
¬(x→y), ⊢x, ¬y
x∧y⊢x, y (conjunction removal)
x, ¬(x∧y)⊢¬y (conjunction syllogism)
y, ¬(x∧y)⊢¬x
¬x, x∨y⊢y
¬y, x∨y⊢x
¬(p∨q)∈¬p, ¬q; and
p→q=¬p⊕q, p⊕q=¬(¬p⊗¬q)
where "⊢" means provable.

The precise nature of these computations depends on the selected family of activation functions, e.g., weighted Lukasiewicz or weighted Godel logic. For example, if implication is defined as the residuum, then modus ponens is performed via the logic's t-norm, i.e. AND. The remaining inference rules follow a similar pattern as prescribed by the functional inverses of the upward computations.

In the following, U and L denote upper and lower bounds, respectively, found for neurons corresponding to the formulae indicated in their subscripts, e.g. $L_{x \to y}$ is the lower-bound truth value for the formula x→y as a whole while $U_x$ is the upper-bound truth value for just x. The bounds computations for: ¬ are trivial:

$$L_{\neg x} \geq \neg U_x = 1 - U_x, \quad L_x \geq \neg U_{\neg x} = 1 - U_{\neg x},$$

$$U_{\neg x} \geq \neg L_x = 1 - L_x, \quad U_x \geq \neg L_{\neg x} = 1 - L_{\neg x}.$$

The use of inequalities in the above acknowledges that tighter bounds for each value may be available from other sources. For instance, both y and x→¬y can yield $L_{\neg y}$; the tighter of the two would apply.

Generally, using bi-directional inference, uncertainty is handled at both facts and formulae (rules) the truth values lower and upper bounds apply to both the facts and rules and that affects how facts are updated or how a rule can be learned to be false. Thus, in bi-directional inference, either rules can be trusted and "new" facts learned, or, facts can be trusted, and the truth value of the rules can be inferred or learned. For example, for facts that are believed in or trusted, rules may be learned and can be wrong and they can be eliminated. Besides learning truth values of both facts and rules (by upper and lower bounds) by feed-forward path inference and backward-pass inferences, the LNN system can learn how much to weight the facts in those rules. That is, facts can have gradations of truthfulness or degrees of certainty or uncertainty, and weights associated with back-propagations paths arrows can be adjusted. Thus in embodiments, the truth values (upper and lower bounds) can be adjusted, and the weights associated with the back-propagation arrows can be adjusted. In an embodiment, refined rules and new rules induced from observations are extracted from the trained LNN for the completion of the knowledge base used to initialize the neural network, or for the discovery of new knowledge. In a further embodiment of reverse inference, a weighted reverse inference method is implemented such that a lower bound regresses to zero and an upper bound regresses to one, proportionally to one minus the ratio of the input importance weight to the average of all the input importance weights for the neuron, if the importance weight is less than the average.

Inference Rules in Weighted Lukasiewicz Logic

In weighted Lukasiewicz logic, the upward bounds computations for $^\beta(x^{\otimes w_x} \to y^{\otimes w_y})$ are:

$$L_{x \to y} \geq \beta(U_x^{\otimes w_x} \to L_y^{\otimes w_y}),$$

$$U_{x \to y} \leq \beta(L_x^{\otimes w_x} \to U_y^{\otimes w_y}),$$

while the downward bounds computations for y, i.e. modus ponens, are $$L_y \geq \begin{cases} \beta/w_y \left( L_x^{\otimes w_x/w_y} \otimes L_{x \to y}^{\otimes 1/w_y} \right) & \text{if } L_{x \to y} \geq 0, \\ 0 & \text{otherwise,} \end{cases}$$

$$U_y \leq \begin{cases} \beta/w_y \left( U_x^{\otimes w_x/w_y} \otimes U_{x \to y}^{\otimes 1/w_y} \right) & \text{if } U_{x \to y} \leq 1, \\ 1 & \text{otherwise,} \end{cases}$$

and for x, i.e., modulus tollens, are $$U_x \leq \begin{cases} \beta/w_x \left( L_{x \to y}^{\otimes 1/w_x} \to U_y^{\oplus w_y/w_x} \right) & \text{if } L_{x \to y} \geq 0, \\ 1 & \text{otherwise,} \end{cases}$$

$$L_x \geq \begin{cases} \beta/w_x \left( U_{x \to y}^{\otimes 1/w_x} \to L_y^{\oplus w_y/w_x} \right) & \text{if } U_{x \to y} \leq 1, \\ 0 & \text{otherwise.} \end{cases}$$

The introduced conditions address potential discontinuities occurring at $U_{x \to y}=1$ and $L_{x \to y}=0$ due to the clamps used in the doubly-bounded ReLU. To understand why these occur, it is observed that x→y can return 1 for many different values of x and y; for example, whenever x≤y in the unweighted case. Accordingly, if $U_{x \to y}=1$, an upper bound for y or lower bound for x cannot be inferred. The condition in the other direction is only reachable if β>1, but functions similarly.

Upward bounds computations for $\otimes_{i \in I}^\beta x_i^{\otimes w_i}$ and $\oplus_{i \in I}^\beta x_i^{\otimes w_i}$ are, respectively, $$L_{\otimes_i x_i} \geq \bigotimes_{i \in I}^\beta L_i^{\otimes w_i}, \quad L_{\oplus_i x_i} \geq \bigoplus_{i \in I}^\beta L_i^{\oplus w_i},$$

$$U_{\otimes_i x_i} \leq \bigotimes_{i \in I}^\beta U_i^{\otimes w_i}, \quad U_{\oplus_i x_i} \leq \bigoplus_{i \in I}^\beta U_i^{\oplus w_i},$$

While downward bounds for conjunctive syllogism and conjunction removal are $$U_{x_j} \leq \begin{cases} \beta/w_j \left( \left( \bigotimes_{i \neq j} L_i^{\otimes w_i/w_j} \right) \to U_{\otimes_i x_i}^{\oplus 1/w_j} \right) & \text{if } U_{\otimes_i x_i} < 1, \\ 1 & \text{otherwise,} \end{cases}$$

$$L_{x_j} \geq \begin{cases} \beta/w_j \left( \left( \bigotimes_{i \neq j} U_i^{\otimes w_i/w_j} \right) \to L_{\otimes_i x_i}^{\oplus 1/w_j} \right) & \text{if } L_{\otimes_i x_i} > 0, \\ 0 & \text{otherwise,} \end{cases}$$

and downward bounds for disjunctive syllogism and disjunction removal are $$L_{x_j} \geq \begin{cases} \beta/w_j \left( \left( \bigotimes_{i \neq j} (\neg U_i)^{\otimes w_i/w_j} \right) \otimes L_{\oplus_i x_i}^{\otimes 1/w_j} \right) & \text{if } L_{\oplus_i x_i} > 0, \\ 0 & \text{otherwise} \end{cases}$$

$$U_{x_j} \leq \begin{cases} \beta/w_j \left( \left( \bigotimes_{i \neq j} (\neg L_i)^{\otimes w_i/w_j} \right) \otimes U_{\oplus_i x_i}^{\otimes 1/w_j} \right) & \text{if } U_{\oplus_i x_i} < 1, \\ 1 & \text{otherwise} \end{cases}$$

It is noted that the above downward computations are not necessarily implemented as multiple operations in series, but can be computed with a form of n-ary implication or, equivalently, n-ary disjunction and conjunction with negation.

Recurrent Algorithm and Evaluation

In an embodiment, to perform an inference task using the LNN, the syntax tree is traversed to obtain the truth value at a specific output node given known truth values at the input nodes.

Figure 5:
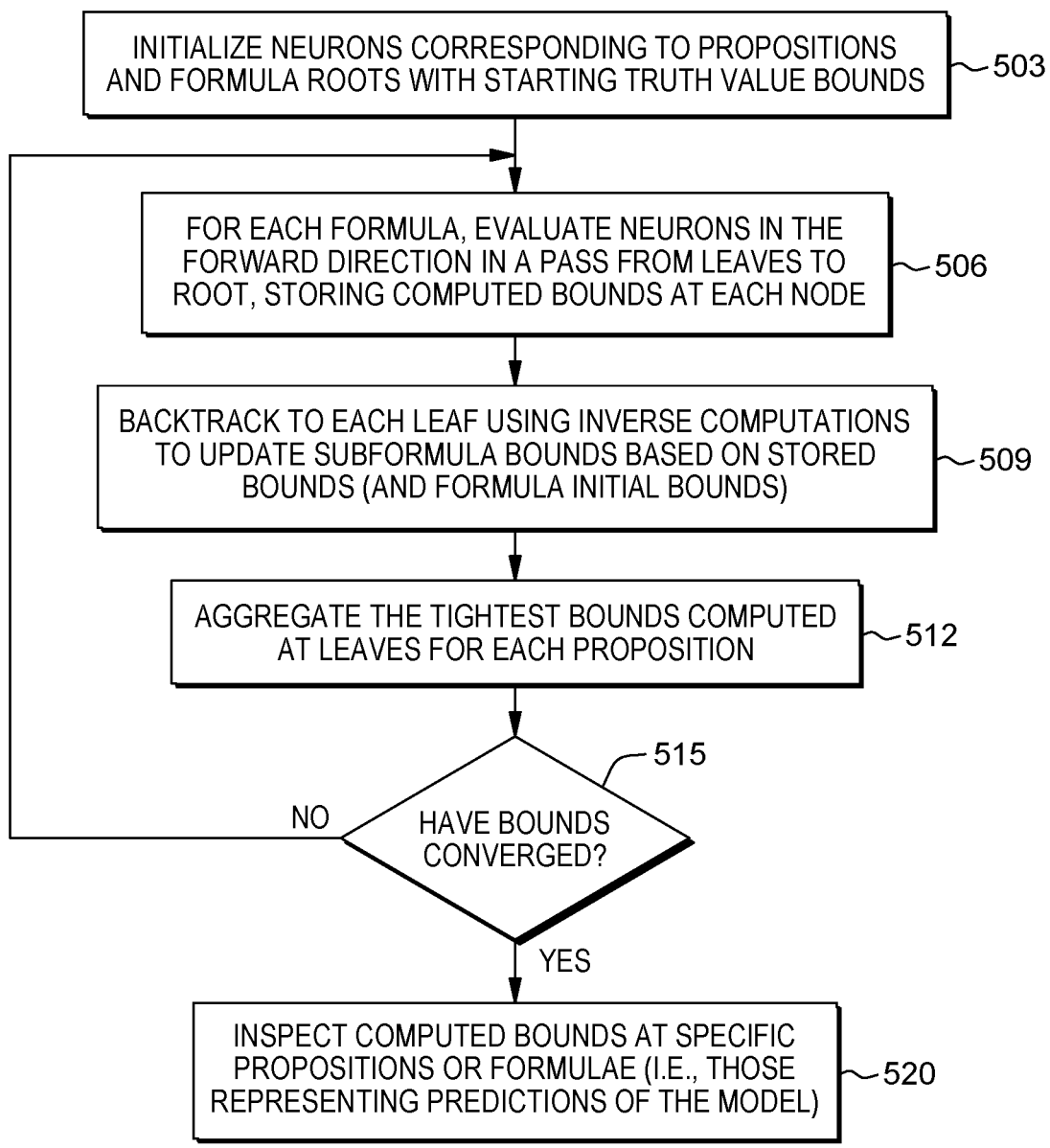
FIG. 5 depicts a method of prediction and bi-directional inference used to evaluate a propositional LNN and first-order logic LNN according to an embodiment where a recurrent neural net has neurons in one-to-one correspondence with formulae describing a system that is being modeled.

FIG. 5 depicts a method 500 for evaluating a propositional LNN and first-order logic LNN according to an embodiment where a recurrent neural net has neurons in one-to-one correspondence with formulae describing a system that is being modeled, the neurons arranged as formula syntax trees. Method 500 governs the overall method of prediction or bi-directional inference where 503 depicts a first step of initializing neurons corresponding to propositions and formula roots with starting truth value bounds. This corresponds to actions including obtaining the data value inputs from the outside world to initialize neurons with observed truth values. All neurons interior to a formulae are initialized with unknown truth values, while other neurons pertaining to entire formulae that are trusted within the network can have truth values that have been learned and/or presumed to be "1". For the propositions 202 of the FIG. 2A example, these initial truth values can be observed values, e.g., "whiskers" is known to be above 0.7, "tail" is known to be above 0.8, while "laser pointer" is observed, for example, to be below 0.2. Propositions with starting bounds represent input data.

As the LNN knowledge graph traversal is iterative, i.e., repeats in both directions, and while the system has not converged, there is conducted a forward pass, a backward pass and an evaluation of aggregate truth values at propositions/predicates.

Step 506 of FIG. 5 depicts the processing for each formula, where neurons are evaluated in the forward direction in a pass from leaves of the syntax trees up to the root of each formula, while annotating each neuron in the upward pass with resulting truth value bounds after performing a logical operation.

FIG. 6A is an example method 600 to evaluate neurons in the forward direction in a forward knowledge graph pass from leaves to root. As shown in FIG. 6A, in an upward pass, each node j (neuron) is evaluated. A first determination 605 is whether the node is an atom node in which case the upper and lower bounds are evaluated and returned. Otherwise, at 608, a loop is performed where the values $L_{i,j}$ and $U_{i,j}$ are computed for each operand i. Then the activation function $f_j(\ )$ is evaluated given the arguments $\beta_j$, $w_j$, $L_j$, $U_j$. A value corresponding to the $f_j(\beta_j, w_j, L_j, U_j)$ evaluation is returned and stored for later use by the logical neural net calling program. The truth values $L_j$, $U_j$ are propagated upwards through the graph while the computed bounds are stored at each neuron. If, from an earlier step of computation there is already a tightest available bounds available, the tightest available bounds are retained. That is, for a proposition that can be proved in many ways, the tightest such bound is the minimum upper bound that any computation can return and the maximum lower bound that any computation can return.

In a non-weighted symbolic logic scheme using operands A and B, at each node, where each operand/operator A has an upper bound $U_A$ and a lower bound $L_A$ in the form $$\begin{pmatrix} U_A \\ L_A \end{pmatrix},$$

types of forward inference upper and lower bounds calculations include:

Negation:

$$L_{\neg A} = \neg U_A$$

$$U_{\neg A} = \neg L_A$$

Conjunction (forward inference)

$$L_{A \& B} = L_A \& L_B$$

$$U_{A \& B} = U_A \& U_B$$

Disjunction (forward inference)

$$L_{A \oplus B} = L_A \oplus L_B$$

$$U_{A \oplus B} = U_A \oplus U_B$$

Implication (forward inference)

$$L_{A \to B} = U_A \to L_B$$

$$U_{A \to B} = L_A \to U_B$$

An inverse function evaluates false when $L_A = U_A = 0$ and evaluates true when $L_A = U_A = 1$. The truth value is unknown when a lower bound $L_A$ evaluates to 0 and $U_A$ evaluates to 1. A contradiction exists when an $L_A$ evaluates greater than $U_A$, i.e., when $L_A > U_A$.

Further examples of forward inverse pass through a knowledge graph is depicted in Appendix A.

Returning to FIG. 5, once reaching the root of a formula, at 509, the system backtracks to each leaf using inverse computations to update subformula bounds based on stored bounds (and formula initial bounds). That is, the backwards pass propagates inferences based on known truth values downwards through the graph back to the predicates or propositions.

FIG. 6B is an example method 610 to evaluate neurons in the backward direction in a backward knowledge graph pass from leaves to root. As shown in FIG. 6B, in the downward pass, each node j and its current upper U and lower bounds L is evaluated. A first determination 615 is whether the node is an atom node in which case the upper and lower bounds are recorded. Otherwise, at 618, a loop is performed where the values $L_{i,j}$ and $U_{i,j}$ are computed for each operand i. Computing the upper and lower bound values is an evaluation of the inverse activation function $f_{i,j}^{-1}(\ )$ given the arguments $\beta_j$, $w_j$, $L_{-i,j}$, $U_{-i,j}$, L, U. An evaluation value corresponding to $f_{i,j}^{-1}(\beta_j, w_j, L_{-i,j}, U_{-i,j}, L, U)$ is returned and stored for later use by the logical neural net calling program.

In the non-weighted symbolic logic scheme using operands A and B, at each node, where each operand/operator A has an upper bound $U_A$ and a lower bound $L_A$ in the form $$\binom{U_A}{L_A},$$

types of backwards inference upper and lower bounds calculations include:

Negation $$L_A = \sim U_{\sim A}$$

$$U_A = \sim L_{\sim A}$$

Conjunction: A→(B→(A & B))

$$L_A = U_B \rightarrow L_{A\&B} \text{ if } L_{A\&B} > 0, \text{ otherwise } 0$$

$$U_A = L_B \rightarrow U_{A\&B}$$

Disjunction: (~B & (A⊕B))→A $$L_A = L_{\sim B} \& L_{A \oplus B}$$

$$U_A = U_{\sim B} \& U_{A \oplus B} \text{ if } U_{A \oplus B} < 1, \text{ otherwise } 1$$

Implication(B): A & (A→B))→B $$L_B = L_A \& L_{A \rightarrow B}$$

$$U_B = U_A \& U_{A \rightarrow B} \text{ if } U_{A \rightarrow B} < 1, \text{ otherwise } 1$$

Implication (A): A→((A→B)→B)

$$L_A = U_{A \rightarrow B} \rightarrow L_B \text{ if } U_{A \rightarrow B} < 1, \text{ otherwise } 0$$

$$U_A = L_{A \rightarrow B} \rightarrow U_B$$

Generally, in the backwards pass, the computation is the functional inverse of activation function computation as performed in the forward pass and results are expressed in terms of bounds.

Figure 2B:
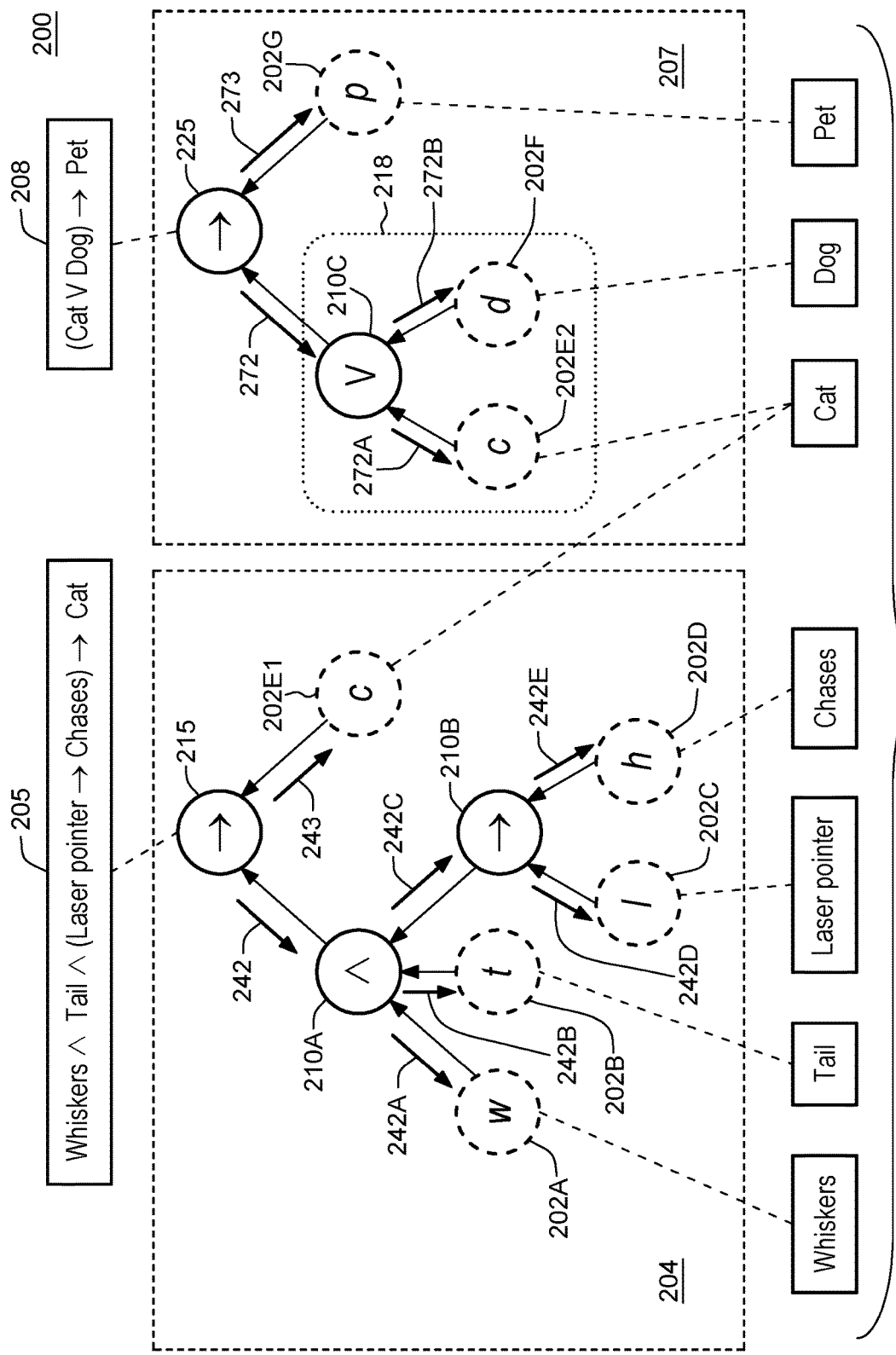
FIG. 2B shows backwards progpagation inference computations in the knowledge graph tree structure of the use-case example of an LNN of FIG. 2A.

An example recurrent (bi-directional) backwards propagation (backwards passes) is shown in FIG. 2B corresponding to the example LNN 200 shown in FIG. 2A. While the system has not converged, a backwards traversal of the knowledge graph occurs to update the truth values of the various propositions. In the LNN, every path from root node 215 to every leaf is traversed to evaluate inverse inference rules at each node in the downward direction. In an embodiment without any guidance, a depth-first traversal is performed with a sweep of root to leaf paths in syntax trees for each formula. For example, a first path evaluated being a modus tollens edge 242 that attempts to refute the conjunction based on knowledge of "cat" and then a conjunctive syllogism edge 242A attempting to disprove "whiskers" if the conjunction was false. Then a next conjunction syllogism evaluation can be performed at edge 242B, and then at edge 242C for the sub-expression "laser point implies chases" at node 210B, etc.

In embodiments, information is back-propagated along the following backwards paths to update inverse function computations in tree 204: i.e., the path as shown by arrows 242, 242A where the truth value (i.e., upper bounds and lower bounds) of the whiskers predicate 202A is updated by the inverse activation function computation at the conjunction neuron 210A; the path as shown by arrows 242, 242B where the truth value (upper bounds and lower bounds) of the tail predicate 202B is updated by the inverse activation function computation at the conjunction neuron 210A; the path as shown by arrows 242, 242C, 242D where the truth value (upper bounds and lower bounds) of the laser pointer predicate 202C is updated by the inverse activation function computations at the conjunction neuron 210A and implication neuron 210B; the path as shown by arrows 242, 242C, 242E where the truth value (upper bounds and lower bounds) of the chases predicate 202D is updated by inverse activation function computation at the conjunction neuron 210A and at the implication neuron 210B; and the path as shown by arrow 243 where the truth value (upper bounds and lower bounds) for the cat predicate 202E1 is updated by inverse activation function computation at the implication neuron 215. Similarly, the following backwards paths are traversed to perform inverse function computations in syntax tree 207: i.e., the path as shown by arrows 272, 272A where the truth value (upper bounds and lower bounds) for the cat predicate 202E2 is updated by the inverse activation function computation at the disjunction neuron 210C; the path as shown by arrows 272, 272B where the truth value (upper bounds and lower bounds) of the dog predicate 202F is updated by the inverse activation function computation at the disjunction neuron 210C; and the path as shown by arrow 273 where the truth value (upper bounds and lower bounds) for the pet predicate 202G is updated by inverse activation function computation at the implication neuron 225.

Further examples of backward inverse pass through a knowledge graph is depicted in Appendix A.

Figure 2C:
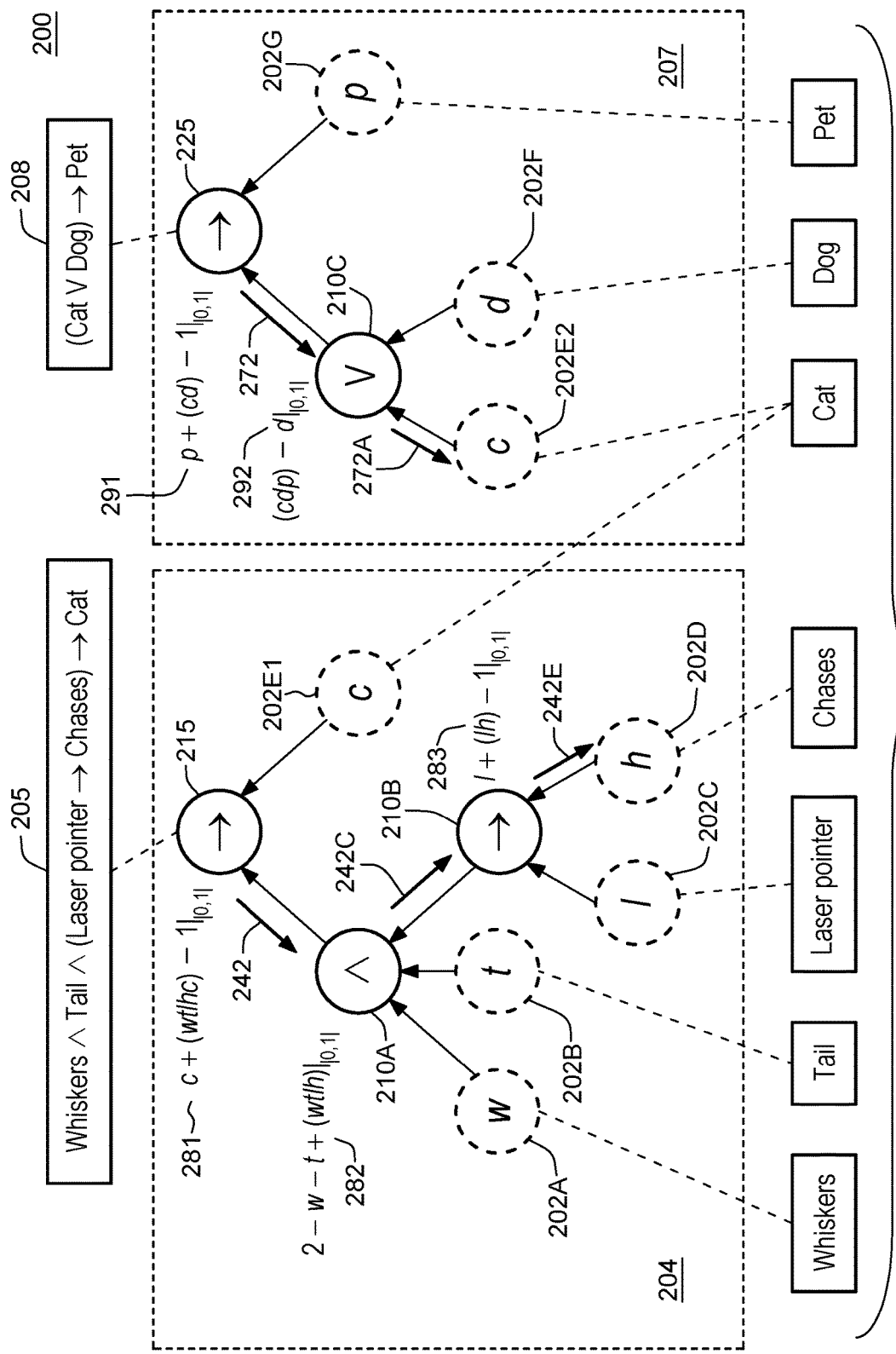
FIG. 2C depicts the example inverse activation functions used to compute for the example use-case syntax tree reverse inferences for downward traversal paths shown in FIG. 2B.

FIG. 2C depicts the example inverse activation functions used to compute for the example use-case syntax tree reverse inferences for downward traversal paths shown in FIG. 2B. For example, the backwards syntax tree traversal along path 242, 242C, 242E updates the truth value (upper bounds and lower bounds) of the chases predicate 202D by performing a computation of the inverse activation function 281 (with equal weightings) at the root implication neuron 215, and using the tightest bounds available at each node, performing a computation of the inverse activation function 282 (with equal weightings) at the conjunction neuron 210A and performing a computation of the inverse activation function 283 at the implication neuron 210B. Similarly, the backwards syntax tree traversal along path 272, 272A updates the truth value (upper bounds and lower bounds) of the cat predicate 202E2 by performing a computation of the inverse activation function 291 (with equal weightings) at implication neuron 225, and performing a computation of the inverse activation function 292 at the disjunction neuron 210C.

Referring back to FIG. 5, continuing to 512, the system aggregates the tightest bounds computed at leaves for each proposition/predicate. For the aggregation at 512, a min and max can be used to aggregate upper and lower bounds proved for each proposition, though smoothed versions of these may be preferred to spread gradient information over multiple proofs. Alternately, when targeting classical logic, conjunction and disjunction (themselves possibly smoothed) can be used to aggregate proposition bounds. When doing so, there is an opportunity to reuse propositions' weights from their respective proofs, so as to limit the effect of proofs in which the proposition only plays a minor role.

FIG. 6C shows an aggregate method 620 for an atom node j. As shown at 625, a FOR loop is implemented to compute for a proof i in the atom, its current upper $U_j$ and lower bounds $L_j$ tuple ($L_{i,j}$, $U_{i,j}$).

Then, at 628, for node j, an aggregation of the tightest bounds $U_j$, $L_j$ is computed at leaves for each proposition according to: $L_j = \max L_j$, $U_j = \max U_j$.

In the example use-case LNN 200 of FIG. 2A, the values are aggregated at every predicate, and in the example use-case, other than the "cat" predicate, there is only one proof that exists in the network so aggregation is a "No Operation". In this example, upon convergence, as two different means of inferring whether something is a "cat" were provided in the network, the cat predicates 202E1, 202E2 are the intended result (predicate of interest). The updated "cat" predicate that provides the tightest bounds is the aggregated truth value output. Generally, in the LNN, anywhere a predicate or proposition occurs in any formulae, that predicate or proposition serves as a candidate proof of bounds.

For bounds computed at propositions, the method aggregates the tightest bounds, i.e., take maximum lower bound and the minimum upper bound values. In the example LNN model 200 depicted in FIG. 2A, whether a something is a "cat" can be proved by two ways: e.g., either based on tail, whiskers, laser pointer, or based on pet and dog. An example aggregation step may evaluate one of these proofs that something is a "cat" as a lower bound of 0.6, for example, and the other proof aggregates as a lower bound of 0.7, for example. Using a tightest bounds, e.g., a max, the proof of proposition "cat" associated with aggregated value 0.7 would be determinative.

Thus, given an example task of predicting whether something is a "cat", then the final outcome is both bounds for that proposition, e.g., if lower bounds is high, then it is suspected that the something is a cat; if the upper bounds is low, then it is suspected that the something is not a cat; if both lower and upper bounds are loose, a response is returned that it is known that it is not determinable whether the something is a cat or not. If it is detected that the upper and lower bounds cross, then a state of contradiction exists in the system of formula.

In use, after all evaluations, i.e., forwards and backwards inference passes, there are a set of one or more neurons in the LNN that serve as an output which can be looked at and used as they need to be used. A neuron that answers the task of predicting whether something is a "cat" would be the final output in this use-case example of FIG. 2A.

Referring back to FIG. 5, continuing to 515, a determination is made as to whether the bounds have converged, when the aggregated values have not changed much, e.g., everything has been proved that can be proved based on the given information, e.g., a measure of the change of the truth bounds of last pass vs. the current pass is less than 0.01. In an embodiment, as truth values are expressed in terms of upper and lower bounds, by the nature of the LNN computations, upper bounds can decrease or lower bounds increase (max lower bound is 1, and min upper bound is 0). As a result, an aggregated truth value will converge to a fixed value or within an amount epsilon ($\varepsilon$) of a fixed value depending upon a neuron's activation function.

If the bounds have not converged, the method returns to step 506 to repeat the forward pass and backward pass steps 506 through 512. In embodiments, an oscillation cannot occur because bounds tightening is monotonic.

Once, at 512, a convergence of the bounds has been detected, the process proceeds to 520, where the method performs inspecting computed bounds at specific propositions or formulae, i.e. those representing the predictions/queries of the model.

As suggested at this step 520, prediction results are obtained by inspecting the outputs of one or more neurons, similar to what would be done for a conventional neural network. Different, however, is the fact that different neurons may serve as inputs and results for different queries, indeed with a result for one query possibly used as an input for another. In addition, one may arbitrarily extend an existing LNN model with neurons representing new formulae to serve as a novel query.

More complete working examples corresponding to the propositional LNN of FIGS. 2A-2C are shown in labeled Examples #1, #2 and #3 provided in Appendix A.

Bidirectional Inference

While the logical formulae can be directly evaluated, they can be used to infer truth values for other, related formulae and propositions. LNN performs such inferences as they pertain to subformulae and propositions existing in the represented syntax trees. In addition to computing truth value bounds for the output of each connective based on its various inputs, the LNN infers truth value bounds for each of the connective neuron's inputs according to the inverse of the connective neuron's activation function with respect to that input and known truth value bounds for the connective's output and other inputs. Depending on the type of connective and the input involved, such computations correspond to familiar inference rules of classical logic including modus ponens, modus tollens, disjunctive syllogism, and numerous others:

p, p→q⊢q

¬q, p→q⊢¬p

¬(p→q), ⊢p, ¬q p∧q⊢p, q p, ¬(p∧q)⊢¬q

¬p, p∨q⊢q

¬(p∨q)⊢¬p, ¬q;

and, observing that $p^{(w_p)} \to \beta_q^{(w_q)} = (\neg p)^{(w_p)} \oplus^{\beta}(q)^{(w_q)}$ and, further, that $p^{(w_p)} \oplus q^{(w_q)} = \neg((\neg p)^{(w_p)} \otimes^{\beta}(\neg q)^{(w_q)})$, it is only necessary to derive weighted forward and inverse bounds computations for a single connective and negation. Throughout the below, upper and lower bounds are indicated with the variables U and L, respectively, with the formula associated with the bounded truth value in their subscript. The bounds computations for ¬ are:

$$L_{\neg p} \geq \neg U_p = 1 - U_p, \quad L_p \geq \neg U_{\neg p} = 1 - U_{\neg p},$$

$$U_{\neg p} \geq \neg L_p = 1 - L_p, \quad U_p \geq \neg L_{\neg p} = 1 - L_{\neg p},$$

The forward bounds computations for ⊗ are:

$$L_{p \otimes q} = L_p^{(w_p)} \otimes^{\beta} L_q^{(w_q)},$$

$$U_{p \otimes q} = U_p^{(w_p)} \otimes^{\beta} U_q^{(w_q)},$$

The inverse upper bounds for are similar to implication, but conditioned on $U_p \otimes_q < 1$:

$$U_p = \begin{cases} L^{(w_q/w_p)} \to^{\beta/w_p} U_{p \otimes q}^{(1/w_p)}, & \text{if } U_{p \otimes q} < 1, \\ 1 & \text{otherwise} \end{cases}$$

$$U_q = \begin{cases} L^{(w_p/w_q)} \to^{\beta/w_q} U_{p \otimes q}^{(1/w_q)}, & \text{if } U_{p \otimes q} < 1, \\ 1 & \text{otherwise} \end{cases}$$

The inverse lower bounds are similar, now conditioned on $L_{p \otimes q} > 0$:

$$L_p = \begin{cases} U^{(w_q/w_p)} \to^{\beta/w_p} L_{p \otimes q}^{(1/w_p)}, & \text{if } L_{p \otimes q} < 1, \\ 0 & \text{otherwise} \end{cases}$$

$$L_q = \begin{cases} U^{(w_p/w_q)} \to^{\beta/w_q} L_{p \otimes q}^{(1/w_q)}, & \text{if } L_{p \otimes q} < 1, \\ 0 & \text{otherwise} \end{cases}$$

The introduced conditions address potential discontinuities occurring at $U_{p \otimes q} = 1$ and $L_{p \otimes q} = 0$ due to the clamps used in the doubly-bounded ReLU. To understand why, it is observed that $p^{(w_p)} \oplus^\beta q^{(w_q)}$ can return 0 for many different values of p and q; accordingly, if $L_{p \otimes q}=0$, lower bounds for either p or q, regardless of the truth value of the other, cannot be inferred.

In an embodiment, the LNN thus infers upper and lower bounds for each input of a neuron (or, equivalently, each operand of a logical connective) based on the inverse of the neuron's activation function with respect to the input and known bounds for the neuron's output and for the neuron's other inputs.

For these example reverse upper and lower bounds computations, the subscripts p and q represent what part of formulae the truth values pertain to. Thus, if it is known that $p \otimes q$ is false that means it has a low truth value its upper bound value is low, i.e., $U_{p \otimes q}$ is low. While p is true, its lower bound $L_p$ is a high value. However, in case of implication, a low value is returned in this computation, i.e., q has a known low upper bound. In the case of conjunction removal, e.g., if $p \otimes q$ is true then classically, all components p and q are true. For fuzzy truth values, a high lower bound is obtained and for implication in these formula, i.e Lq will also be shown to have a high value. If the p/\q conjunction has an intermediate lower bound value (e.g., in the middle), the knowledge of $U_p$ is useful to obtain a value for $L_q$, e.g., if Up is low (e.g., not close enough to 1), then Lq would have to be higher to make up for it.

With more particularity, for the example Reverse Upper Bounds the expression $U_{p \otimes q}<1$ (strictly less than one) is a condition of being able to prove anything about $U_q$.

In general, the LNN method infers upper and lower bounds for each input of a neuron (or, equivalently, each operand of a logical connective) based on the inverse of the neuron's activation function with respect to the input and known bounds for the neuron's output and for the neuron's other inputs. The LNN method further includes using each occurrence of each proposition in each formula as a proof of bounds for the proposition, computed recursively and/or dynamically, as appropriate, by first computing bounds for the containing (sub)formula's output and each of its other inputs.

Further, instead of having a true inverse relationship, each neuron's activation function and the bounds computations for its inputs are smoothed, clamped, and/or otherwise transformed versions of some other function and its inverse, respectively.

Further, instead of conventional min and max, neurons corresponding to propositions aggregate bounds using smoothed, clamped, and/or otherwise transformed versions of these functions, including but not limited to the same activation functions for logical connectives AND and OR to aggregate upper and lower bounds, respectively.

For any system of logic (e.g., not a Lukasiewicz logic system), generally, if conjunction is "min" and disjunction is "max", and implication has several choices (not A or B) as a candidate, the min, max and value of not A or B each have a functional inverse (a reverse inference for that system of logic).

Referring to FIG. 2A, using the example net 200 for purposes of computation, a user, via a computer system, can submit different queries to the LNN model and ask the same model 200 different questions. For the example net, a user may want to predict whether something is or is not a "cat", i.e., given inputs, "cat" is what is wanted to be proved and the neuron pertaining to "cat" provides the corresponding output, e.g., the value at that neuron provides the output. Data can be indicated for each of the propositions 202 as part of the prediction process for predicting whether something is a "cat". However, in another embodiment using the example trained net 200, it may be desirable to provide a different output, e.g., "pet" and a different set of inputs can be provided.

Figure 3:
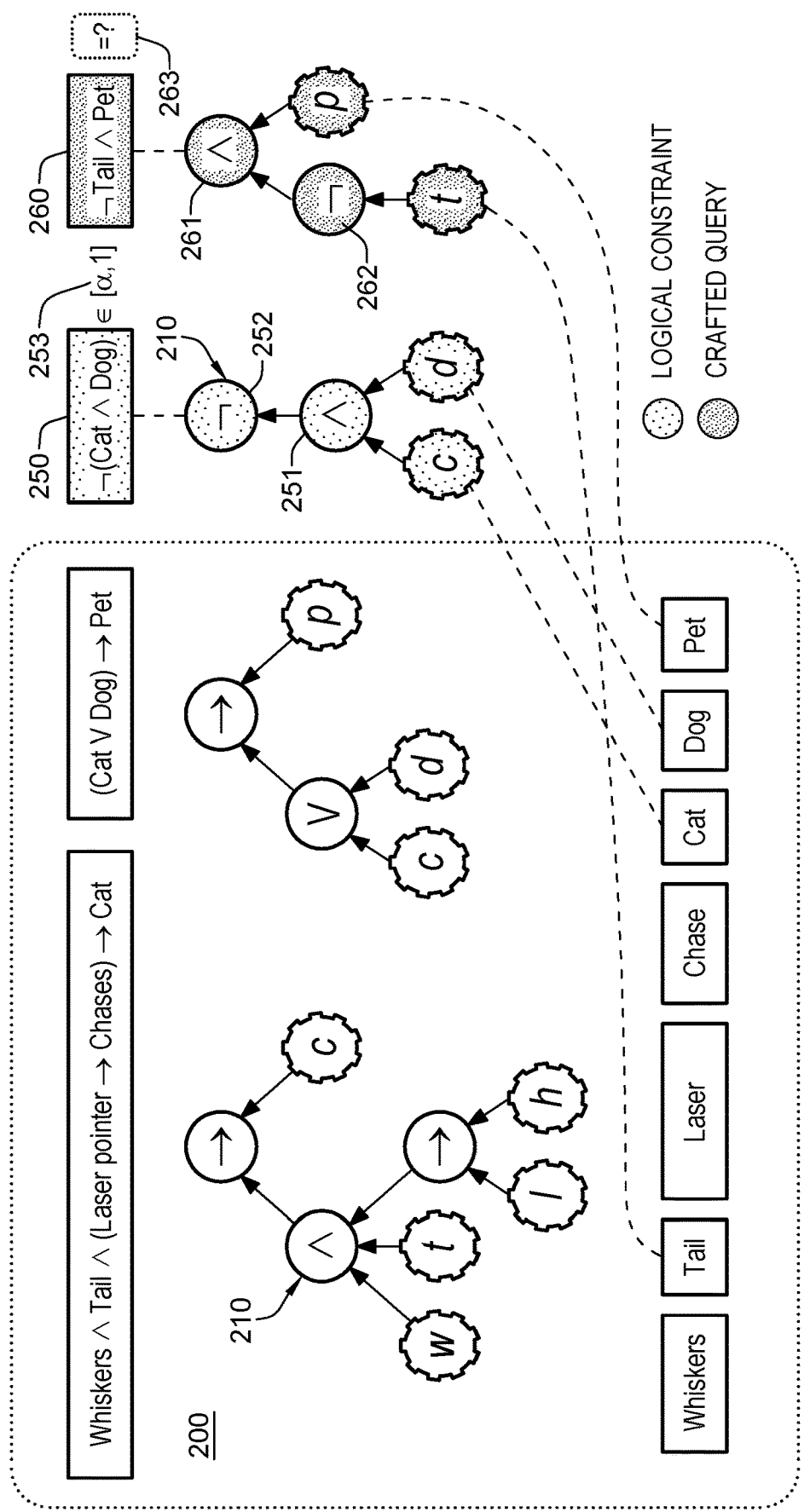
FIG. 3 depicts an injecting of formulae and an example crafted query in the knowledge graph tree for the use-case example LNN exploded depicted in FIG. 2A.

FIG. 3 shows an example implementation for injecting additional formula into an existing trained LNN such as the example net 200 of FIG. 2A. As shown in FIG. 3, new formulae/sub-formulae 250 of component neurons including a conjunction connective 251 and a negation connective 252 are shown to add the constraint that something cannot be both a cat and a dog. The added syntax logic in injected formula 250 includes an indicated truth value 253 when inserted into the network 200 and the degree of truth can be a learned parameter, e.g., learned during an optimization pass. In an embodiment, given a data set of different combinations of known proposition truth values, for each training pass over each combination, optimization randomly selects a subset of the known propositions to serve as observations and use the withheld propositions as queries.

A further example new formula 260 is shown crafted to include a conjunction connective 261 and a negation connective 262 to provide a further logical syntax for handling a query that the initial LNN 200 had not been configured to handle, i.e., is there something that does not have a tail but is a pet? After a few passes of moving truth values through the network, truth values can propagate into the query syntax tree representing sub-formula 260 which may provide a value output 263, e.g., a definitive true, false or an undetermined response.

In this use-case example of FIG. 3, this inserting of the new formula 260 into the existing LNN is a "crafted query" that the LNN is used to provide an output for. A query is a formula inserted into the LNN that can ask anything. This example crafted query does not have any given truth values and is added to evaluate whether, based on the inputs, has it been proven that there is a pet that does not have a tail. This crafted query is the inserting into an existing logical neural network neurons corresponding to specified query formulae, such that inference (i.e. evaluation of the neural network including the inserted formulae) yields results in the form of computed truth value bounds at neurons pertaining to the query formulae.

Further, each one of the nodes 210 in the LNN computes an upper bound and lower bound values for its truth values. These upper bound and lower bound truth values are continuous variables at each node and passed around the network. These bounded truth value variables are computed at node at prediction time or inference time, and not structurally part of the initially configured LNN as they are computed based on the inputs and computed with respective to importance weights which have been learned. For example, net 200 may be programmed with inputs of certainty, e.g., something has whiskers, something has a tail, something is a pet or something is not a dog, but it may be unknown if a laser pointer is present. Thus, while there may be enough input information to definitively prove that something is a "cat", the LNN 200 will return that it is unable to determine that it is a cat.

First-Order Logic

In accordance with a further embodiment, an LNN supports compound first-order-logic (FOL) formulae implementing first-order logic connectives that employ universal and existential quantifiers, e.g., "for all" and "exists". Thus, rather than characterizing propositions as a pair of values (e.g., upper bound and lower bound), in embodiments of LNN implementing first-order logic processing, predicates are characterized in terms of vectors, matrices or larger structures of pairs of values however sparse, and LNN inference operations account for the data sparsity. In embodiments, a keyed-table data structure representation of a sparse matrix is used. In the case of predicates, as LNN syntax tree involves matrix value neurons, LNN inference operations perform tensor products or table join operations and returns entire tables of values. For example, for an activation function at an interior neuron (e.g., conjunction/disjunction), the LNN performs joins along with the ordinary function, and at each row that is the result of the join, it also performs its computation based on the inputs for that row. In an embodiment, tables of truth value bounds pertaining to (sub)formulae and predicates have specified default bounds at absent key combinations, often but not necessarily with (sub)formulae default bounds chosen to match their result given the default bounds of their inputs.

First-Order Logical Neural Networks

To extend the LNN with first-order logic inference, scalar propositions become predicates, embodied as tables or, equivalently, tensors or replicated neurons for each grounding. That is, LNNs are extended to first-order logic by replacing proposition neurons with neurons representing predicates and to introduce nodes for universal and existential quantification. Instead of bound pairs, all neurons return tables of said uniquely keyed by groups of columns pertaining to the unbound variables occurring in the represented subformula or predicate. Neural activation functions are then modified to perform joins over columns pertaining to shared logical variables while computing truth value bounds at the associated rows as before. Inverse activation functions are modified similarly, but must also reduce results over any columns pertaining to variables absent from the target input's corresponding subformula so as to aggregate the tightest bounds. In the special case that tables are keyed by consecutive integers, these computations are equivalent to elementwise broadcast operations on sparse tensors, where each tensor dimension pertains to a different logical variable. In addition, grounded predicates over the same variables may be linked to the same Censored structure, to provide easy look-up.

The first-order logic LNN processing makes use of universal and existential quantifiers, including but not limited to: a reduction by min or max; a reverse inference that propagates an associated bound downward; and the possibility to employ other bounds via Skolemization where a group of new keys (columns) are introduced, with bounds, for every quantified variable in addition to the usual FOL variable column. In an embodiment, specialized neurons corresponding to universal and existential quantification are introduced, which eliminate a given key column (i.e. variable) by reducing with min and max, respectively, the truth value bounds for matching combinations of keys in the other columns. For example, in embodiments, given the tensor shaped neurons in LNN first-order logic processing, the neuronal activation functions have changed so they perform joins. The inverse of a join can require a reduction, i.e., an operation to removing a column from a table by taking a maximum of all of the lower bounds, or a minimum of all of the upper bounds, or vice versa, depending upon what operation is being performed. Each of these operations involve matching up values at columns, performing operations at the matched rows, and possibly removing a column by performing a reduction over that column (e.g., marginalize).

Like negation, quantifiers are pass-through nodes with no parameters that eliminate a given key column by reducing with min or max as appropriate. Inverse inference for quantifiers is more complicated, however, in that it requires Skolemiziation: each existential quantifier broadcasts its known upper bounds to all key values associated with its column (i.e. variable) and broadcasts its known lower bounds to a group of new key values identified by each combination of key values associated with any containing universal quantifiers' columns and vice versa for universal quantifiers.

In order for aggregate operations to be tractable, in an embodiment, it is necessary to limit the number of key values that participate in computation, leaving other key value combinations in a sparse state, i.e., with default bounds. This is achieved by filtering predicates whenever possible to include only content pertaining to specific key values referenced in queries or involved in joins with other tables, prioritizing computation towards smaller such content. Because many truth values remain uncomputed in this model, the results of quantifiers and other reductions may not be tight, but they are nonetheless sound. In cases where predicates have known truth values for all key values (i.e. because they make the closed world assumption), the method uses different bounds for their sparse value and for the sparse values of connectives involving them, such that a connective's sparse value is its result for its inputs sparse values.

Even minimizing the number of key values participating in computation, it is necessary to guide neural evaluation towards rules that are more likely to produce useful results. A first opportunity to this effect is to shortcut computation if it fails to yield tighter bounds than were previously stored at a given neuron. In addition, the method exploits the neural graph structure to prioritize evaluation in rules with shorter paths to the query and to visited rules with recently updated bounds.

In an effort not to pull in too much data in a FOL LNN, a graduated grounding determination is implemented to determine an effective quantity minimization of the set of groundings for a neuron based on its associated set operation using the groundings of the neurons in its input network. For a conjunction neuron, the number of groundings of its inputs are first counted individually, choosing the input with the least groundings, then checking if those groundings are contained in the other inputs in which case the grounding is retained. For a conjunction this performs an intersection operation on the input sets with data access graduated from performing a count, retrieving groundings for one operand and finally performing a contain check.

Variable Management

Logical predicates, neurons and quantifiers each have a defined set of variable(s) according to its arity, specifying the number of constants in a grounding tuple. Predicate arity is dependent on the knowledge base supplying truth-values to the LNN, and can typically include a variety of nullary (propositional), unary and binary predicates. Logical neurons collect variables from its set of input operands in order of appearance during initialization, where these operands can include predicates, neurons and quantifiers. Variables are collected only once from operands that define repeat occurrences of a specific variable in more than one variable position, unless otherwise specified. Logical formulae can also be defined with arbitrary variable placement across its constituent nodes. A variable mapping operation transforms groundings for enabling truth-value lookup in neighboring nodes.

Quantifiers can also have variables and groundings if partial quantification is required for only a subset of variables from the underlying operand, although quantification is typically performed on a single variable to produce a propositional truth-value associated with the quantifier output. For partial quantification the maximum lower bound of groundings from the quantified variable subset is chosen for existential quantification and assigned to a unique grounding consisting of the remainder of the variables, whereas the minimum upper bound is used for universal quantification. For existential partial quantification true groundings for the quantified variable subset form arguments stored under the grounding of the remaining variable subset, so that satisfying groundings can be recalled.

Variable Binding

Variable binding assigns specific constant(s) to variables of predicates, neurons or quantifiers, typically as part of an inference task. A variable could be bound in only a subset of occurrences within a logical formulae, although the procedure for producing groundings for inference would typically propagate the binding to all occurrences. It is thus necessary to retain the variable even if bound, in order to interact with other occurrences of the variable in the logical formula to perform join operations. There can be an implicit equality of constants referenced by the same identifier, although the same represented entity can also be denoted by a different constant.

Variable Typing

Variables in typed first-order logic can have a type assigned to specific usage instances, such that a given variable can have a different type assigned in another usage instance in a different part of the logical formula. Two predicates with a shared variable could each specify a different expected type for its usages of the variable. Types are typically identifiers of ontological classes that allow for taxonomic and hypernymy relations to be identified between two types, such as stating that a given type is a subtype of another.

Type consistency in a logical formula means that a given variable has a single type for all occurrences of the variable. Even if one type assignment is a direct subtype of another assignment, an entity correctly typed in one occurrence could be inadequately specialized in the other occurrence, so type equivalence for all variable appearances is needed. Unavailable groundings at a predicate, neuron or quantifier are typically presumed to be unknown under an open-world assumption, with maximally loose truth-value bounds assigned. However, if at least one of the grounding constants have an assigned type that is not transitively a subtype of the expected variable type, then a false value could be assigned.

Handling Equality in LNN

The overall characterization of handling equality in LNN is as follows:
1) Equality is a specialized predicate that interacts strongly with a family of second-order formulae; 2) Mathematically, truth values for the equality predicate can be dealt with the same way as any other truth value is dealt with, but there are computational incentives to handle these specially; 3) The proper handling of FOL functions and Skolemization follows from the proper handling of equality.

Equality Formulae:

Partial (knowledge of) equality is a fact of fuzzy logic, but we can at least assert $(X=X)\equiv 1$ and $(X=Y)\equiv(Y=X)$. Equality transfers to truth values with the (higher-order) meta-rules:

$$\forall P,X,Y.((X=Y)\rightarrow(P(X)\equiv P(Y)))$$

$$\forall Q,X,Y.((X=Y)\rightarrow\forall Z.(Q(X,Z)\equiv Q(Y,Z)))$$

$$\forall Q,X,Y.((X=Y)\rightarrow\forall W.(Q(W,X)\equiv Q(W,Y))) \ldots$$

All such rules have truth value exactly 1 and operations are presumed unweighted (though still fuzzy). Logical equivalence can be bidirectional implication; truth values on either side must be equal. It may make sense to include $\forall Q,X,Y.((X=Y)\rightarrow(Q(X,X)\equiv Q(Y,Y)))$ and possibly also $\forall Q,X,Y.((X=Y)\rightarrow(Q(X,Y)\equiv Q(Y,X)))$ as special cases; these shortcut preconditions of the form $(X=Y)\otimes(Y=X)$ into just $(X=Y)$, which has larger truth value for most logics, but become quite cumbersome as predicate arity increases. Taking equality as a predicate, the above gives transitive equality $$\forall X,Y.((X=Y)\rightarrow\forall Z.((X=Z)\equiv(Y=Z)))$$

Weakening the equivalence to either implication yields: $\forall X,Y,Z.(((X=Z)\otimes(Z=Y))\rightarrow(X=Y))$, which is in turn sufficient to prove the former. Taking functions as predicates $f(A;B)\equiv(f(A)=B)$, the definition of a functional relation is given:

$$\forall f,X,Y,Z.((f(Z;X)\otimes f(Z;Y))\rightarrow(X=Y))$$

$$\forall g,X,Y,Z,W.((g(Z,W;X)\otimes g(Z,W;Y))\rightarrow(X=Y)) \ldots$$

It is observed that $f(A;f(A))\equiv(f(A)=f(A))\equiv 1$. Likewise taking functions as predicates, the above yields:

$$\forall f,X,Y.((X=Y)\rightarrow\forall Z.(f(X;Z)=f(Y;Z)))$$

$$\vdash\forall f,X,Y.((X=Y)\rightarrow\forall Z.(f(X;Z)\leftarrow f(Y;Z)))$$

$$\vdash\forall f,X,Y.((X=Y)\rightarrow(f(X;f(Y))\leftarrow f(Y;f(Y))))$$

$$\vdash\forall f,X,Y.((X=Y)\rightarrow(f(X;f(Y))))$$

$$\vdash\forall f,X,Y.((X=Y)\rightarrow(f(X)=f(Y)))$$

and similarly for higher arities $$\forall g,X,Y.((X=Y)\rightarrow\forall Z.(g(X,Z)=g(Y,Z)))$$

$$\forall g,X,Y.((X=Y)\rightarrow\forall W.(g(W,X)=g(W,Y)))$$

As with ordinary predicates, it may be useful to include $$\forall g,X,Y.((X=Y)\rightarrow(g(X,X)=g(Y,Y))) \text{ and}$$

$$\forall g,X,Y.((X=Y)\rightarrow(g(X,Y)=g(Y,X))),$$

with the same motivation and caveat.

One can then find truth values for complex constructs like $Q(f(X),g(f(Y),Z))$ by chaining rules from the above, as in:

$$Q(f(X),g(f(Y),Z))$$
$$\leftarrow Q(U,V)$$
$$\leftarrow (U=f(X))$$
$$\leftarrow (V=g(W,Z))$$
$$\leftarrow (W=f(Y))$$

or equivalently:

$$Q(f(X),g(f(Y),Z))$$
$$\leftarrow (Q(U,V)$$
$$\otimes (U=f(X))$$
$$\otimes (V=g(W,Z))$$
$$\otimes (W=f(Y))$$

There can be multiple intermediate groundings, e.g. of U, V, and W in this case, for the same result grounding, e.g. X, Y, and Z; as usual, the tightest computed bounds apply.

All of the above can run in both directions, i.e. known equality proves predicate truth values must match, but known mismatched predicate truth values proves inequality.

Function Handling:

For a given grounding of (i.e. assignment of constants to) all of a function's arguments, the function application itself may serve as a new constant designating its return value, e.g. literally f(cat123) or even g(cat123,f(dog456)), where f(dog456) is again a new constant. Accordingly, when a function is called for the same constant arguments, the same "value" is returned. When a function is called for different arguments that may or not refer to the same things, its return value may be proved equal to some other return value in accordance with the above rules for equality. Functions are practically partial: some argument configurations simply never come up; we should avoid insisting a return value exists for all of them.

Skolemization:

Skolemization is necessary to handle both quantifiers, though for opposite bounds. Existential quantifiers pass upper bounds to all possible variable groundings, but only (necessarily) pass lower bounds to a single constant returned by a function of the groundings of all enclosing variables; the reverse is true for universal quantifiers. Enclosing quantifiers that are themselves Skolemized don't count as enclosing variables, permitting functions introduced by Skolemization to be simpler. Note that which quantifiers are Skolemized differs depending on which bound is being computed. Another upshot is that upper and lower bounds computations beneath quantifiers have different tensor dimension. These functions can then be handled similarly to any other, replacing the Skolemized variable wherever it occurs. The Skolem functions themselves should be labeled uniquely for each quantifier in each formula, e.g. exists789. Their return values are then identified as above by their application to their grounded arguments (i.e. enclosing variables), e.g. exists789 (cat123) if we had $\forall X.(cat(X) \rightarrow \exists Y. (\ldots))$. As a minor caveat, even though function results are always unique, constants satisfying quantifiers may not be (some logics, however, include a separate operator for "exists exactly one", $\exists !$). Skolemization is thus sound but not logically equivalent; regardless, this does not cause problems for either fuzzy or classical logic. Skolemization is only required for downward inference. Upward inference of existential quantifiers aggregates lower bounds with max, but can't tighten upper bounds, and vice versa for universal quantifiers, unless we introduce further extensions like closed-world predicates, for which we can definitively conclude no other groundings yield truth values other than 0 or 1, etc.

Implementation:

While mathematically correct, an extensive number of computations is required to handle any equivalence, function application, or quantifier (for one side of its bounds). There is still a concept of equality classes: constants connected by some path of nonzero lower-bound equality edges. Not all constants in the same equality class necessarily have nonzero equality with each other, e.g. $(x=y) \geq 0.5$ and $(y=z) \geq 0.5$ fails to tighten $(x=z)$ in Łukasiewicz logic. It is not immediately clear if there is a (useful) definition of inequality class, i.e. constants connected by some path of non-unit upper-bound equality edges.

For a given equality class, there is a fully normalized set of truth values assigned to each edge that can be found via repeated application of transitive equality. Each time an equality edge is updated by other means, it becomes necessary to (eventually) renormalize the equality class. Observe that equality classes can merge; proved inequality (i.e. upper bound less than one) doesn't split them. Normalized equality classes can then propagate tightened equality truth values to predicates, including function predicates. Function predicates can present cyclical updates if their results feed back into the equality classes that affect them, e.g. a function that can return its argument; propagating equality through such cycles can be considered part of normalization.

It is important to know when to normalize, and how much to normalize. It is possible to normalize on-demand, afterwards marking the equality class as no longer needing updates. Likewise, predicates on equality class members can be updated on-demand and marked as up-to-date for said class. As noted, upon any update to equality edges or to predicates on equality class members, the respective sets of values must be marked out-of-date.

First-Order Inference

Inference at a logical neuron involves forward or backward execution of the associated logical connective for a given set of groundings, whereas inference at a quantifier involves a reduction operation and creation of new groundings in the case of partial quantification. A provided grounding may not be available in all participating operands of an inference operation, where a retrieval attempt would then add the previously unavailable grounding to the operand with unknown truth-value under an open-world assumption. If a proof is offered to a node for an unavailable grounding, the proof aggregation would also assume maximally loose starting bounds.

The computational and memory considerations for large universes with many constants should be taken under consideration, where action may be taken to avoid storing of groundings with unknown bounds. However, inference is a principal means by which groundings are propagated through a logical formula to enable theorem proving, although there are cases where storage can be avoided. In particular, negation can be viewed as a pass-through operation where inference is performed instead on the underlying operand or descendent that is not also a negation. Otherwise, if naively approached, negation may have to populate a grounding list of all false or missing groundings from the underlying operand and store these as true under a closed-world assumption.

An inference context involves input operands and an output operation, where input operands are used in forward inference to calculate a proof for the output, or where all but one input operand and the output are used to calculate a proof for the remaining input. If any participant in the inference context has a grounding that is not unknown, then in real-valued logic it is possible in an inference context to derive a truth-value that is also not unknown. Each participant in the proof generation can thus add its groundings to the set of inference groundings. A given inference grounding is used as is for other participant operands with the same variable configuration as the originating operand. In case of disjoint variable(s) not present in the inference grounding, the overlapping variables are firstly searched for a match with all the disjoint variable values used in conjunction to create an expanded set of inference groundings. If no overlapping variables are present or no match is found, then the overlapping variables could be assigned according to the inference grounding, with the disjoint variable(s) covering its set of all observed combinations.

The set of relevant groundings from a real-valued inference context could become a significant expanded set, especially in the presence of disjoint variables. However, guided inference could be used to expand a minimal inference grounding set that only involves groundings relevant to a target proof. LNN can use a combination of goal-driven backward-chaining and data-driven forward-chaining to obtain a target proof. Backward-chaining is used here as a means of propagating groundings in search of known truth-values that can then be used in forward-chaining to infer the goal. Implication-based rules typically require backward inference in the form of modus tollens to propagate groundings to the antecedent through backward-chaining and modus ponens to perform forward-chaining to help calculate the target proof at the consequent. This bidirectional chaining process continues until the target grounding at the consequent is not unknown or until inference does not produce proofs that are any tighter.

Acceleration

As bounds tightening is monotonic, the order of evaluation does not change the final result. As a result, and in line with traditional theorem provers, computation may be subject to significant acceleration depending on the order that bounds are updated.

In order for such aggregate operations to be tractable, it is necessary to limit the number of key values that participate in computation, leaving other key value combinations in a sparse state, i.e., with default bounds. This is achieved by filtering predicates whenever possible to include only content pertaining to specific key values referenced in queries or involved in joins with other tables, prioritizing computation towards smaller such content. Because many truth values remain uncomputed in this model, the results of quantifiers and other reductions may not be tight, but they are nonetheless sound. In cases where predicates have known truth values for all key values (i.e., because they make the closed world assumption), different bounds are used for their sparse value and for the sparse values of connectives involving them, such that a connective's sparse value is its result for its inputs sparse values.

Even minimizing the number of key values participating in computation, it is necessary to guide neural evaluation towards rules that are more likely to produce useful results. A first opportunity to this effect is to shortcut computation if it fails to yield tighter bounds than were previously stored at a given neuron. In addition, the neural graph structure is exploited to prioritize evaluation in rules with shorter paths to the query and to visited rules with recently updated bounds.

Figure 4:
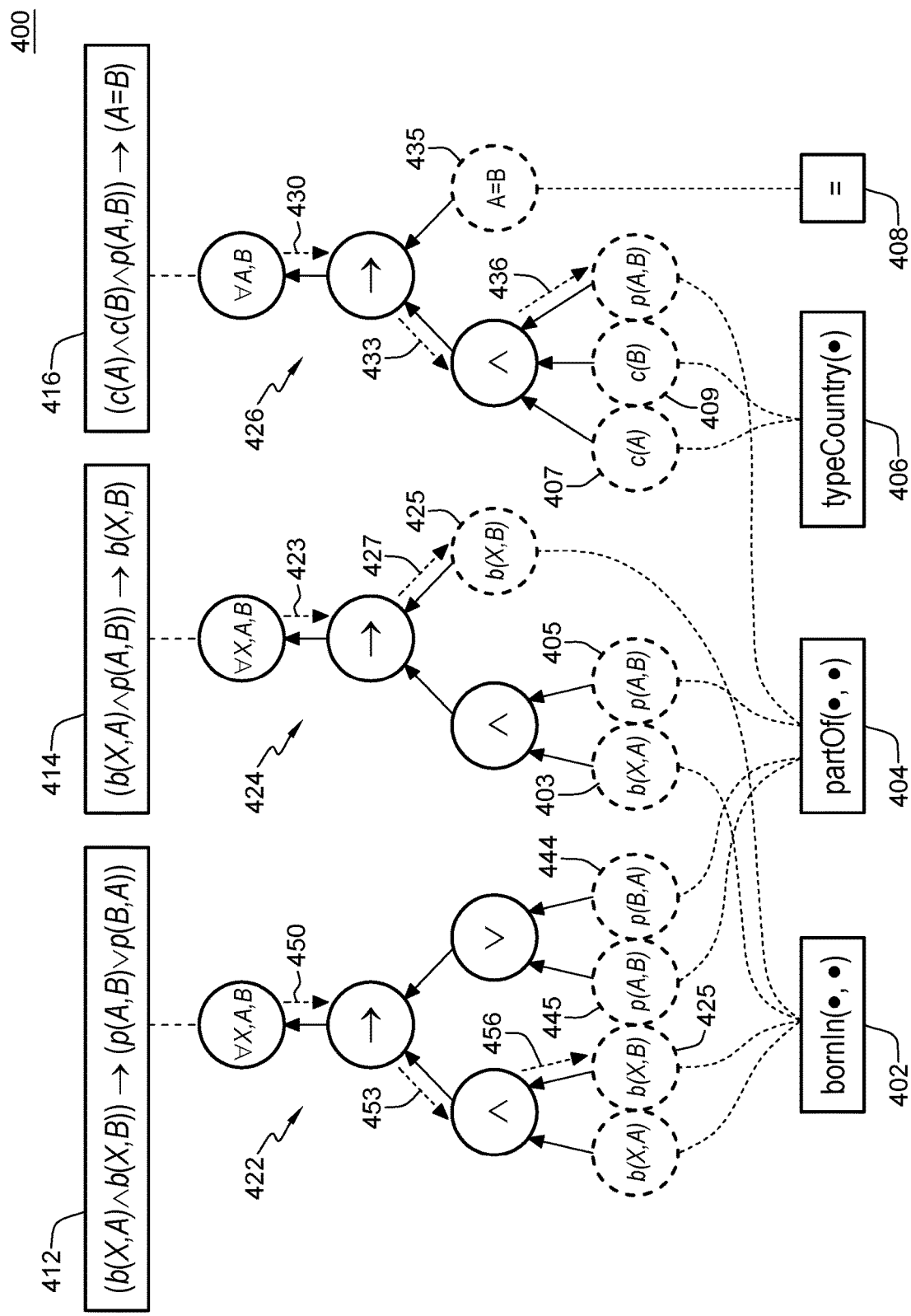
FIG. 4 depicts a syntax tree representing an example first-order logic logical neural network (net) in an embodiment.

While the formulae and neurons depicted in FIGS. 2A-3 act on propositions (e.g., list 202) and pass values as a pair of upper and lower bounds (i.e., a value is a pair of scalars), the functionality is extended as shown in FIG. 4, described below, to render the syntax network capable of implementing first-order logic inference. That is, instead of acting on propositions having values as a pair of upper and lower bounds, the LNN is configured to process predicates, e.g., statements whose truth value depends upon a variable(s).

To process predicates, the neurons receive and pass around larger data structures or objects in the form of a table of upper and lower bounds, e.g., a tensor(s). Further, variables are primary keys or tensor dimensions. Neural activation functions perform joins, or, equivalently, elementwise broadcasts. Reverse inference also involves reduction operations.

Activation function computations at neurons are adjusted to be tensor operations or joins. For example, for columns in a table representing a particular variable corresponding to a way a certain predicate is used, an operation between two sets of tables is a join at one of the columns and at matching rows (at joined columns), the same activation function is invoked. Thus, activations at neurons produce new tables which can be of a different dimension, i.e., as computations proceed upwards through the syntax tree graph, the table dimension can get larger, until a quantifier is reached (e.g., "for all" ("∀", or "there exists" "∃"), in which case a reduction occurs over one of the dimensions. In first-order logic processing, the "for all" quantifier works as an a conjunction (AND) applied to every possible valuation of the variable, while "there exists" works as a disjunction (OR) applied to every possible valuation of the variable.

Guided Inference

In an embodiment. As tensors can be sparse and of a higher order, in first-order processing, the inference pattern for the first-order logic algorithm is guided based on the query and implements a backward chain style algorithm that first inspects what predicates and what constants at those predicates are going to be involved in answering a given query. The process then expands outwards from that observation to only pull in data necessary to continue those computations. In this manner, a universe management or "guided inference" type processing is implemented such that during each computation pass a determination is made as to what data has to be pulled in to update the tensors (tables) to ensure first-order logic is feasible to implement in LNN, e.g., by providing a mechanism to filter out irrelevant work in order to save computing time and memory resources.

In particular, for universe management: the first-order logic neural networks are configured to provide computation that works to reduce the number of groundings it must load/compute to answer a query. This includes management of what constants are used in the tables and ensure not too much data is loaded into the tables in order to prove the query of interest. Using guided inference: meta-learning and heuristics are used to configure the first-order logic network to reduce the number of formulae visited per each recurrent evaluation, e.g., inform which formula to traverse first. For example, there is implemented an evaluation shortcutting, including the prioritizing of computations at neurons more likely to be on the critical path towards tightening bounds at specific neurons of interest, including but not limited to considering a neuron's shortest-path distance to the neurons of interest. Thus, if there is a node on the graph that would provide an answer for the query, a shortest distance path (edge length on the graph) is found in the LNN to evaluate first, or stitching in another algorithm that informs what path to evaluate next. The first-order logic network networks are configured with defined predicate defaults that permit the closed-world assumption for specific predicates without representing too many facts.

A further use of the LNN in a semantic query language (e.g., SPARQL) application for databases to retrieve and manipulate data stored in Resource Description Framework (RDF) format is shown in Appendix A.

FIG. 4 depicts an example syntax tree representing a first-order logic logical neural network (net) 400 including logic formulae in the form of inference rules 412, 414 and 416 that were human authored and implement first-order logic for answering an example use-case question: "Was Natalie Portman born in the US?". As an example objective: an inference is a definitive 'no' even making an open-world assumption. In the illustrative embodiment, facts are taken from DBpedia. As shown in the example syntax, the "bornIn (•. •)" predicate 402 is of arity-2, the "partOf(•.•)" predicate 404 is of arity-2, and the "typeCountry(•)" predicate 406 is of arity-1. The "bornIn" predicate 402 is establishes a relation between people and the cities they were born in and is obtained from DBPedia; the "partOf" predicate 404 is a more generic relation that is applied to establish a hierarchy, e.g., which state or country the city is located in or which state a country is located in; and the "typeCountry" predicate 406 is a general type predicate, e.g., is something a country. A further predicate "equals" 408 is simply used in this example to indicate whether a constant is the same as another.

In this example, the bornIn( ) predicate is illustrative of an open world assumption as it relates all people to all places. However, a predicate that is specific, e.g., "astronauts on Apollo 13 mission", is a closed-world predicate.

Initially, variables A, B, and X occurring in the formulae and nodes can assume any value at all, including US, Israel, Jerusalem, and the like, but could also include other possible values not mentioned. Each step of inference shown in FIG. 4 selects a specific formula and performs computations for different sets of candidate values of A, B, and X (if present). Given that the query provides a clue (Natalie Portman and US) and the "bornIn" relation, then it may be queried directly bornIn (Natalie Portman, US) which returns nothing as it is not in the database (thus not true). Other candidate solutions can be first to query bornIn (Natalie Portman, any place) or bornIn (any person, US). These sets can be singleton, but a more detailed description of their assignments is as follows:

In the first-order logic processing depicted in FIG. 4, the universe management algorithm is invoked providing inference guidance, e.g., a heuristic, indicating to run the query with the smallest possible fill-in first, e.g., which in this use-case example is bornIn (Natalie Portman, anyplace). That is, a first observation is made by pulling in data for Natalie Portman from the knowledgebase (e.g., DBpedia) to determine which city person Natalie Portman is born in. An example fact data 403 is found that person Natalie Portman is born in a city Jerusalem, and for the bornIn( ) predicate, everything else is left sparse. With this observation, a next operation is performed for the partOf( ) predicate for all of the hits that could have been chosen for Jerusalem. Thus in a second observation, a knowledgebase look up results in finding data 405 relating the country in which city Jerusalem is located). Thus, in the use-case example 400, the method first considers: X=Natalie Portman, A=Jerusalem, and B=country Israel.

An inference rule 414 is first provided to computationally evaluate logic $(b(X,A) \land p(A,B)) \to b(X,B)$ stating that if Natalie Portman is born in a first place (country A), and first place (country A) is part of a second place (country B), then Natalie Portman is born in the second place (country B). Given rule 414, corresponding LNN syntax tree 424 is traversed, i.e., processed in the reverse direction as indicated by the arrow 423, 427, to computationally prove that person Natalie Portman was born in Israel, i.e., by implementing logic evaluating predicate data 403 "bornIn(Natalie Portman,Jerusalem)" AND predicate data 405 "partOf(Jerusalem,israel)" to thereby yield resulting predicate 425 as "bornIn (Natalie Portman, Israel)".

However, additional steps are needed to prove that person Natalie Portman was not born in the US as requested in the original query. Thus, the method next considers, that both A ∈{Israel, US} and B∈{Israel, US}, computing results at each combination of these values. Considering multiple combinations enables the proof both that the US is not part of Israel and that Israel is not part of the US. That is, inference rule 416 is provided to computationally evaluate logic $(c(A) \land c(B) \land p(A,B)) \to (A=B)$ stating that if A is a country and B is a country and one of them is part of the other, then they both have to be the same (i.e., A=B). Given rule 416, the programmed corresponding LNN syntax tree 426 is traversed in the reverse direction as indicated by the arrows 430, 433, 436 that allows to definitively prove whether the country represented by predicate typecountry (US) is or is not equal to typecountry(Israel). That is, by implementing logic evaluating predicate data 407 "typecountry(US)" AND predicate data 409 "typecountry(Israel)" AND proposition 435 representing that Israel US will yield predicates 444 ¬partOf(Israel,US) and 445 ¬partOf(US, Israel).

Lastly, the method considers X=Natalie Portman and A, B∈{Israel, US}, computing results at each combination of values. When A=B, inference doesn't show anything useful, because countries are understood to be part of themselves, rendering the formula necessarily true, but both cases with A≠B (i.e. A=Israel and B=US, or A=US and B=Israel) are sufficient to prove ¬bornIn(Natalie Portman,US). In these computations, inference rule 412 is provided to computationally evaluate logic $(b(X,A) \land b(X,B)) \to (p(A,B) \lor p(B,A))$ stating that if Natalie Portman is born in a first place (country A), and Natalie Portman is born in a second place, (country B), then the first place is either included in the second place, or vice versa, the second place is included in the first place. Thus, given rule 412, the corresponding programmed syntax tree 422 is traversed in the reverse direction as indicated by the arrows 450, 453, 456 that allows to definitively prove that person Natalie Portman was not born in the US. That is, by implementing logic evaluating predicate data 444 "¬partOf(Israel,US)", data 445 "¬partOf(US,Israel)", and given the evaluated predicate 425 "bornIn(Natalie Portman,Israel)" will yield a definitive result ¬bornIn(Natalie Portman, US) which is the answer to the processed query "Was person Natalie Portman born in the US?".

The inference pattern as depicted in the example first order logic net use-case 400 of FIG. 4 does not assume that the knowledgebase data set is closed-world, i.e., just because it may not be definitively found in a knowledgebase set that Natalie Portman was born in the US, does not mean that Natalie Portman was not born in the US. Thus, the inference pathways configured as rules 412, 414 and 416 are programmed in the first-order LNN as corresponding syntax trees such that their traversal in response to the query will computationally prove the fact that Natalie Portman was born somewhere else than the US.

The computational pattern in LNN is similar to feed-forward neural networks in which an input layer passes inputs to one or more internal layer or hidden layers that compute based on the respective inputs and which output are passed to finally reach an output. However, the LNN structure is implemented as a recurrent neural net where in addition to traditional feed-forward neural network patterns, some of the outputs are looped back to become inputs for the next pass, thereby providing a bi-directional inference structure. For example, in the example first order logic net use-case 400 of FIG. 4, the predicate input information or knowledge graph data 402, 404, 406 (e.g., provided by DBpedia) goes through a feed-forward pass of evaluation (traverses upwards through the tree) until reaching the respective formula 412, 414, 416. At that point, the results of the feed-forward path of computation are new truth values for the formulae, and in the example, all results are assumed true (a tighter bound) prior to traversing in a backward direction of inference. In the backward pass, the result values or the learned parameters (e.g., new information values) of the feed-forward path passes backward from the root to each leaf. In bi-directional inference, every edge of the knowledge graph (syntax tree) has a forward computation and a reverse computation. The backwards pass of computation is equivalent to many of the various inference rules as employed in classical and fuzzy logic.

Generally, in the LNN, anywhere a predicate or proposition occurs in any formulae, that predicate or proposition serves as a candidate proof of bounds. The use-case example 400 of FIG. 4 is complicated in the sense that the predicates "bornIn(•,•)" 402 and "partOf(•,•)" 404 are each used in many different places at the same time (having many uses) and thus there are increased number of ways of providing values about those predicates.

For the use-case example of FIG. 4, a classical "modus ponens" inference rule is implemented in the backwards traversal of syntax tree 424 representing formula 414 as backward pass information flow steps 423, 427 where learned facts b(X,A) and p(A,B) and their conjunction provides an assumed truth value for the entire formula, i.e., the structure provides a truth b(X,B)—a modus ponens inference. Given the first-order logic processing, the LNN conjunction of the b(X,A) and p(A,B) nodes 403, 405, the method performs a join where the variables match (e.g, an inner product or inner join), and for the variables that do not match (an outer join) all combinations are obtained. Thus, for every X, A, B, a truth value is obtained indicating whether somebody was both born in a place and that place was part of another place which is a three-dimensional tensor that is very sparse and fairly big (when implemented without using any guidance). Thus, computational guidance is provided to indicate interest only in some of these combinations and the some values can be left in a state of undecided (e.g., a loose state as these may not affect the soundness of the system). Further, in a second step of inference, as a backwards traversal of example LNN syntax tree 426 of FIG. 4 at formula 416, information flow steps 430, 433, 436 implement a "modus tollens" inference rule followed by conjunctive syllogism inference rule: i.e., first the method proves the entire conjunction c(Israel)∧c(LTS)∧p(Israel,US) is false (as well as the conjunction with Israel and US swapped), and then, because c(Israel) and c(US) are both true, this proves that both p(Israel,US) and p(US,Israel) are false. Finally, in a third step of inference, as a backwards traversal of example LNN syntax tree 422 of FIG. 4 at at formula 412, information flow steps 450, 453, 456 implement an example modus tollens inference rule followed by conjunctive syllogism inference rule: i.e., first it is proved the conjunction b(Natalie Portman, Israel)∧b(Natalie Portman,US) is false, and then, because b(Natalie Portman,Israel) is true, that b(Natalie Portman,US) is false.

As described, the downward inference used to propagate bounds downwards is modified in LNN first-order logic processing. For example, for existential quantifiers an upper bound is propagated downwards while universal quantifiers a lower bound is propagated downwards. For existential quantifiers, to propagate lower bounds downwards, and for universal quantifiers, to propagate upper bound downwards, requires Skolemization. In the example use-case scenario of FIG. 4, new candidate constants are added to the universe, e.g., Portman, Jerusalem, US, and a particular Skolemization rule is employed: e.g., for all people there exists a place x such that that person was born in that place. In the example, for Natalie Portman there is place x for this rule, and this (the x for Natalie Portman for this rule) is introduced as a constant which can be proved equal to some other constant.

Universe Management

For bidirectional inference, the order of evaluation is decided by a "universe management" method and in an embodiment, is dependent upon what is known from the query. In the use-case example of FIG. 4, syntax tree 424 was traversed first given the initial query, e.g., Natalie Portman born in the US, and then syntax tree 426 and finally syntax tree 422 in that order were evaluated in the example 400 of FIG. 4.

Further, for bidirectional inference, the LNN can be further programmed to provide a backwards evaluation pattern that includes efficient update passes (e.g., traversing all of the neurons of the network, and coming back to all of the neurons). In an embodiment, universe management provides a mechanism for controlling inference depth, i.e., a number of backwards passes over the network. The "universe management" method further provides the ability to computationally decide whether a particular formula needs to be evaluated or not, e.g., based on whether there is something to be learned or not from evaluating the formula. This is because, the LNN structure knows what constants are being currently worked on and what predicates are needed to be known about the constants. Knowing the LNN structure, specific formula can be queued to be evaluated in order to increase the learning.

Learning

It is possible to translate an existing knowledge base of rules into a network of neurons as described above. Even without subsequent training, such a network would be able to perform inference as specified by the rules. On the other hand, presented with ground truth observations, constrained optimization can tune the network to become more tolerant of corner cases and noisy data. In an embodiment, constrained optimization is used to learn each LNN neuron's parameters so as to minimize a given loss function while preserving the classical nature of their corresponding logical connectives, specifically such that neurons corresponding to AND yield sufficiently true outputs if all of their participating inputs are sufficiently true and sufficiently false outputs if any of their participating inputs are sufficiently false, and vice versa for OR. In an embodiment, some of the LNN's neurons have fixed parameters, i.e., such that the formulae corresponding to these neurons serve as a component of ground truth, still participating in inference and loss but only engaging in learning insofar as they affect other neurons' optimal parameter configurations. In an embodiment, ground truth formulae neurons with fixed parameters) can be used that become contradictory in the event of undesirable inference behavior, thereby permitting a simple loss function to favor arbitrarily specific and yet interpretable logical requirements.

LNNs are trained using gradient based constrained optimization methods seeking to minimize a defined loss function. Because all constraints are linear in terms of the weights and bias terms, the Frank-Wolfe algorithm is suitable for this purpose, though other methods are also applicable. In the Frank-Wolfe constraint optimization, an objective subject to neuron constraints M is minimized by computing a network loss E according to:

$$\min_{w,s,t \in M} \left( w \cdot \frac{\partial E}{\partial w} \right) + s \left( \frac{\partial E}{\partial s} \right) + \theta \left( \frac{\partial E}{\partial \theta} \right).$$

If borrowing the structure of an existing KB, an LNN may be restricted to adjusting the parameters of inputs already participating in formulae. On the other hand, to perform rule induction, the method includes constructing speculative networks linking many propositions to several layers of connectives across a number of formulae can be constructed. One consequence of the constraints is that, for lower values of threshold of truth "a", operations can support a small number of operands with nonzero weight, thereby limiting rule complexity. Both borrowing KB structure and rule induction may be used simultaneously when training a model. In an embodiment, (nonnegative) slack variables are introduced for each constraint as well as slack penalties directly proportional to (increasing functions of) both the slack variable and the importance weight of the input defining the constraint, thereby permitting optimization to move inputs in and out of the participating set and further permitting control over how classically behaved learned neural parameters must be.

Depending on the specific problem being solved, different loss functions may be used. For example, an LNN configured to predict a binary outcome may use MSE (mean squared error) as usual, though it should also include a slack penalty scaling with $s_i w_i$ in order to enforce classical inference behavior as well as a contradiction penalty scaling with the degree to which bounds cross at each neuron. Alternately, it is possible to use the contradiction penalty to build arbitrarily complex logical loss functions by introducing new formulae into model that become contradictory in the event of undesirable inference behavior. The parameters of specifically these introduced formulae should not be tuned but instead left in a default state (e.g. all 1), so optimization cannot turn the logical loss function off. Other loss functions of interest are penalizing all bounds tightening so as to favor a parsimony of inference as well as any combination of the above.

In an embodiment, a loss function E includes terms scaling with the degree of contradiction observed at each neuron, e.g., a function of the neuron's upper and lower bounds that grows with respect to the amount by which the computed bounds cross. An example loss function E is:

$$E = \overbrace{\sum_{i,j}(\lambda_1 w_{ij} + \lambda_2 w_{ij}^2 + \lambda_s s_{ij} w_{ij})}^{\text{Regularization terms}} +$$

$$\overbrace{\sum_j \lambda_c \max(0, L_j - U_j)}^{\text{Contradiction loss}} + \overbrace{\sum_j \lambda_{t,j}\left((L_j - L'_j)^2 + (U_j - U'_j)^2\right)}^{\text{Task focus: MSE, etc.}}$$

Another learning paradigm the LNN supports is any-task learning, characterized by trying to predict any input given any subset of the other inputs. Given a data set of different combinations of known proposition truth values, this is done by, for each pass over each combination, randomly selecting a subset of the known propositions to serve as observations and then attempting to predict the withheld propositions.

Constraints

Constraints on neural parameters are derived from the truth tables of the operations they intend to model and from established ranges for "true" and "false" values. Given a threshold of truth $\frac{1}{2} < \alpha \le 1$, a continuous truth value is considered true if it is greater than $\alpha$ and false if it is less than $1-\alpha$. Accordingly, the truth table for, e.g., binary AND suggests a set of constraints given:

| $p$ | $q$ | $p \wedge q$ |
|---|---|---|
| ⊥ | ⊥ | ⊥ |
| ⊥ | ⊤ | ⊥ |
| ⊤ | ⊥ | ⊥ |
| ⊤ | ⊤ | ⊤ | and corresponds to:

| $p$ | $q$ | $p \wedge q$ |
|---|---|---|
| $1-\alpha$ | $1-\alpha$ | $1-\alpha$ |
| $1-\alpha$ | $1$ | $1-\alpha$ |
| $1$ | $1-\alpha$ | $1-\alpha$ |
| $\alpha$ | $\alpha$ | $\alpha$ |

$\beta - w_p \cdot (1-p) - w_q \cdot (1-q)$
$\beta - w_p \cdot \alpha \qquad\qquad -w_q \cdot \alpha \le 1 - \alpha$
$\beta - w_p \cdot \alpha \qquad\qquad\qquad\qquad \le 1 - \alpha$
$\beta \qquad\qquad\qquad -w_q \cdot \alpha \le 1 - \alpha$
$\beta - w_p \cdot (1-\alpha) - w_q \cdot (1-\alpha) \ge \alpha$ More generally, n-ary conjunctions have constraints of the form $$\forall i \in I, w_i \ge 0 \qquad (1)$$

$$\forall i \in I, \beta - w_i \cdot \alpha \le 1 - \alpha$$

$$\beta - \sum_{i \in I} w_i \cdot (1-\alpha) \ge \alpha \qquad (2)$$

while n-ary disjunctions have constraints of the form $$\forall i \in I, w_i \ge 0 \qquad (3)$$

$$\forall i \in I, 1 - \beta + w_i \cdot \alpha \ge \alpha$$

$$1 - \beta + \sum_{i \in I} w_i \cdot (1-\alpha) \le 1 - \alpha \qquad (4)$$

Intuitively, equation (1) requires conjunctions to return false if any of their inputs are false-even if their other inputs are 1, i.e. maximally true—while equation (2) requires them to return true if all of their inputs are true; the converse is true of disjunctions. The identity $p^{(w_p)} \to^\beta q^{(w_q)} = (\neg p)^{(w_p)} \otimes^\beta q^{(w_q)}$ permits implications to use the same constraints as disjunctions and, in fact, the above two sets of constraints are equivalent under the De Morgan laws.

A consequence of these constraints is that LNN evaluation is guaranteed to behave classically, i.e. to yield results at every neuron within the established ranges for true and false, if all of their inputs are themselves within these ranges. In an embodiment, constraints are enforced by tracking regions of acceptability and parameters are improved by moving in the direction of the gradient of the loss function while projected out components perpendicular to crossed boundaries.

Slack Variables

It is desirable for an input's weight to be able to drop to exactly 0, thereby effectively removing it from I. To permit this, it is necessary to introduce a slack variable for each weight, allowing its respective constraints in equation (1) or equation (3) to be violated as the weight drops to 0:

$$\forall i \in I,\ s_i \geq 0$$

$$\forall i \in I,\ \beta - w_i \cdot \alpha - s_i \leq 1 - \alpha \qquad (1^*)$$

$$\forall i \in I,\ 1 - \beta + w_i \cdot \alpha + s_i \geq \alpha \qquad (3^*)$$

These remain consistent with the original constraints if either $s_i=0$ or $w_i=0$. One can encourage optimization to choose such parameterizations by updating the training loss function to include a penalty term scaling with $s_i w_i$. The coefficient on this penalty term controls how classical learned operations must be, with exact classical behavior restored if optimization reduces the penalty term to 0.

Logical Consistency: Contradiction Loss

When bounds cross, this means no single truth value can be assigned to the neuron. Main driver of optimization: enforcement of logical consistency.

Optimization Problem

Contradiction loss is like hinge-loss; an alternative is square hinge-loss. In addition to or in place of square regularization weight decay, one can use linear regularization loss.

$$\operatorname*{argmin}_{\beta,W}\left(\sum_j \max(0, L_j(\beta, W)) - U_j(\beta, W)\right) + \lambda \sum_{i,j} w_{i,j}^2 + \gamma \sum_{i,j} s_{i,j} w_{i,j}\right) + F()$$

$\forall\ j \in$ Conjunction, $i \in I$, $w_{i,j} \geq 0$ $\forall\ j \in$ Conjunction, $i \in I$ $\quad \dfrac{\beta - w_{i,j} \cdot \alpha}{\beta - \sum_{i \in I} w_i \cdot (1-\alpha) \geq \alpha} \leq 1 - \alpha$ $\forall\ j \in$ Disjunction, $i \in I$, $w_{i,j} \geq 0$ $\forall\ j \in$ Disjuncion, $i \in I$, $1 - \beta_j + w_{i,j} \cdot \alpha \geq \alpha$
$1 - \beta + \sum_{i \in I} w_i \cdot (1 - \alpha) \leq 1 - \alpha$ Depending on the specific problem being solved, different loss functions may be used. For example, an LNN configured to predict a binary outcome may use mean squared error as usual, though it should also include the aforementioned slack penalty scaling with soy, in order to enforce classical inference behavior as well as a contradiction penalty scaling with the degree to which bounds cross at each neuron. Alternately, it is possible to use the contradiction penalty to build arbitrarily complex logical loss functions by introducing new formulae into model that become contradictory in the event of undesirable inference behavior. Understandably, the parameters of specifically these introduced formulae should not be tuned but instead left in a default state (e.g. all 1), so optimization cannot turn the logical loss function off. Other loss functions of interest are penalizing all bounds tightening so as to favor a parsimony of inference as well as any combination of the above.

Another learning paradigm the LNN supports is any-task learning, characterized by trying to predict any input given any subset of the other inputs. Given a data set of different combinations of known proposition truth values, this is done by, for each pass over each combination, randomly selecting a subset of the known propositions to serve as observations and then attempting to predict the withheld propositions.

A further example learning use case using the LNN for a semantic tagging application is shown in Appendix A.

Gradient-Transparent Clamping

Real-valued logic typically bounds truth-values to a defined range, which necessitates the use of clamping operations on the results. Automatic differentiation provides clamps that can perform the value clamping, but it also nullifies the associated gradient which can disable learning of involved parameters. Gradient-transparent clamping addresses this by fully recovering gradients outside of the allowable region by utilizing computations detached from the gradient-tracking computational graph to assert the clamping while keeping the original gradient information.

Clamping in Neural Networks

Smooth Bounded Activations

Neuron activation functions based on the logistic function, including sigmoid $(1+e^{-x})^{-1}$ and $\tanh(e^x-e^{-x})/(e^x+e^{-x})$ ensure outputs are in a bounded range, typically $[-1, 1]$ or $[0, 1]$, while ensuring differentiability across the entire domain. Bounded neuron activations ensure that values in the neural network don't grow too large and that there is a degree of interpretability at the output of neurons such as for binary classifiers or real-valued logic.

Smooth bounded activation functions $f()$ like sigmoid and tanh have two-sided saturation where gradients $$\lim_{x \to \infty} \frac{\partial f(x)}{\partial x} = 0$$

tend to zero in the extremes. The vanishing gradient problem affects learning with these bounded activation functions where neurons are saturated or where the chain rule in deep networks produce a negligible product of small gradients. The negative effect of vanishing gradients is that it can significantly attenuate signals that gradient descent depends upon for learning, effectively shutting down learning at some neurons. Residual connection is a solution in deep neural networks that skips over a stride of layers to shorten the number of interacting gradients and reduce the vanishing gradient problem. Another approach is to choose an activation function that that does not have small gradients, like the ReLU.

ReLU

A rectified linear unit (ReLU) max(0; x) has a one-sided saturation of zero where x<0 with an associated gradient of 0, and a linearity with gradient 1 otherwise. ReLU can address the vanishing and exploding gradient problems since its gradients can only be 0 or 1. However, this activation is affected by the "dying ReLU" problem where, if a preactivation distribution is limited to the negative domain, then the input gradients never propagate through the ReLU such that it cannot learn. Leaky ReLU and various forms of parameterized ReLU have been proposed to address the absence of negative domain gradients.

The lower bound on the ReLU output can be shown to be useful when neurons are viewed as concept detectors that give a degree of presence of a feature through the linearity, but only a uniform statement about the absence of a feature through the rectification. The ReLU lower bound can also possibly prevent correlated neurons by not propagating negative values corresponding to degrees of absence of a learnt feature. The ability to stop signal propagation could also reduce noise and extraneous information replication in the network.

The computational benefits of ReLU during learning is attributed to the gradient sparsity introduced by its zero gradients, which means that gradient calculation only needs to operate on a subset of the neurons. In addition, the two possible gradients of ReLU are constant scalars and no involved computation is required to determine its gradients.

Information and Gradient Dropout

Neural networks are universal function approximators that can embody functions of any complexity if provided with adequate capacity and a large enough set of neurons and interconnections between the neurons. Determination of the exact capacity required for arbitrary functions could be an intractable problem, so normally neural networks are given excess capacity or grow larger over a series of hyperparameter optimizations.

The problem of overfitting is where a trained neural network cannot reach its objective performance on previously unseen data, so it can fail to generalize. Redundancy or excess capacity in neural networks allow for overfitting where the input training data could be memorized to optimize the stated objective. Various regularization methods like data augmentation and dropout have been proposed to prevent overfitting, which introduce random variations in the input data in the case of data augmentation or randomly remove neurons during training epochs.

Bounded activation functions that can saturate to an output and gradient of 0, such as sigmoid and ReLU could be considered to be performing a combination of information and gradient dropout. This can act as a regularization method that effectively removes capacity or disconnects certain neurons under the conditions of 0 saturation. The empirical success of dropout and ReLU has been attributed to the regularizing effects of the sparsity these methods introduce.

Gradient-Transparent Clamping

Clamping in Automatic Differentiation

The lower bound on ReLU max(0, x) performed through the clamp, min or max functions of automatic differentiation systems typically disconnects x from this node in the computational graph and replaces it with a new node valued 0 with no prior computational history attached. This means that the loss gradient could be $$\frac{\partial f(x)}{\partial x} = 0$$

even though x has been involved in the determination of the clamping outcome. This gradient statement says that any change to x will leave the output unchanged, which is no longer the case if an update to x is sufficiently large to bring it back to the allowable domain.

Severing the argument when clamping so that it is no longer represented in the computation could introduce inaccuracies in the interpretation of calculated gradients. If the subdifferential for 0 is set to the right-hand discontinuity, so that 0 gives the 1 gradient of the linearity, then it can state that the ReLU will decrease to a negative value for gradient descent at a linear rate. So if x=0 the projected result of gradient descent with a step of s=−0.1 could be x=x+s=−0.1 given a linear gradient, although this update could not materialize since it is already clamped at its starting value. So non-zero gradients provided do not give guidance on when the clamp could be encountered, which shows that even the normal application of clamping could result in incorrect gradient interpretations especially if function linearity is assumed.

Gradients provided by automatic differentiation both inside and outside of the clamped region are then subject to interpretation, and there is reliance on the learning update mechanisms to manage step sizes and momentum to navigate the pathological loss landscape introduced by clamping. Otherwise clamping can inform learning with gradients that indicate the loss can be changed by updating a parameter, even though clamping is then turned on at a fraction of the parameter step size. Clamping could also indicate that no learning is possible when the output is currently clamped, even though clamping turns off for a small parameter step in the right direction such that it does learn.

Information Dropout and Gradient Transparency

Bounded activation functions that saturate at 0 can be said to perform regularization under certain preactivation conditions by stopping the propagation of dynamic information and gradients. Approaches to information and gradient dropout are especially relevant to neural networks with redundant capacity as a means of introducing sparsity to preventing overfitting and to address the vanishing gradient problem.

In the case of LNN as a one-to-one mapping of the syntax tree of a logical program, there is a significant difference to normal neural networks where hidden neurons do not necessarily relate to external concepts and where hidden layer widths can be arbitrarily sized. The problems of overfitting and dealing with redundancy are thus not of primary concern with LNN, although logical neurons and subnetworks could be copied to expand parameter capacity. The motivation for introducing gradient sparsity for normal neural networks through ReLU does not readily apply to LNN.

The vanishing gradient problem can be altogether avoided in LNN for certain loss terms that can be arrested neuron-wise so that a shorter gradient explanation can be calculated. However, it can be more complex for combined losses with supervised task-specific objectives calculated simultaneously over different batch dimensions representing alternate universes of truth-value assignments. Smooth activations should then still be avoided even for LNN to address the vanishing gradient problem.

Information dropout through clamping in real-valued logic serves to keep truth-values within the interpretable permissible range of the logic. Lukasiewicz logic applies clamping aggressively to ensure logical soundness, so the logic operation output values need to be bounded. However, the associated gradient outside of the clamped region need not necessarily be bounded as well. In fact, the severing of the gradient outside the clamp prevents learning for a significant part of the operating range of the logical neuron activation. Gradient-transparent clamping provides information dropout or value clamping while also leaving gradients unaffected so that any gradient calculation effectively ignores clamping. The benefit is that the primary purpose of clamping is still fulfilled, namely clamping output values, but that the full output domain retains gradients as if no clamp was applied. The "dying ReLU" problem can also be solved with gradient-transparent clamping, since learning can receive gradients across the full operating ranges such that gradient descent always has the optimization direction available for a parameter.

The perceived errors this would introduce would be of exactly the same nature as those made by also clamping the output value. In particular, a gradient inside the bounds could indicate that the output will change even when the clamp then immediately applies into the update step, yet this was not reflected in the gradient. Similarly, a gradient outside the bounds given by gradient-transparent clamping could indicate an output change, but then the clamp still applies after the update step. The learning optimizer should manage the step sizes and momentum to ensure robust learning under these scenarios, both with and without gradient-transparency.

Gradient-Transparent Clamping

Automatic differentiation normally severs a computed node when clamping the output and substitutes it with a new node representing the applied bound. Removing the computed node also removes trace of its involvement in the current output, which is undesirable as it was indeed part of the calculation. The idea is then to retain the input to the clamping operation as part of the resultant node in the computation graph. This necessitates the definition of a new clamping function that performs value clamping while keeping gradients as if no clamp was applied.

For a lower bound clamp at $x_{min}$ the value clamping is performed when $x < x_{min}$ to give an output of $x_{min}$. This can be calculated as $x - \min(0, x^* - x_{min})$ where $x^*$ denotes a copy of x that has been detached from the computational graph and thus carries no history. By obtaining the disconnected value $x^*$ the value clamp can still be applied without the destructive interference otherwise caused if a tracked copy of the same node was used. Automatic differentiation tools normally do allow for detached value replication, and there are various capabilities that allow for value copy and reuse. The superscript (1) denotes that gradients in the clamped regions are unscaled, as opposed to the linear scaling performed by gradient supplantation that will be explained later.

$$\min(x_{max}, x)^{(1)} = x - \max(0, x^* - x_{max}), \quad (5)$$

$$\max(x_{min}, x)^{(1)} = x - \min(0, x^* - x_{min}), \quad (6)$$

Clamping can then be replaced with gradient-transparent clamping to recover gradients across the entire output range while still providing the intended value clamping. The provision here is that the parameter update strategy should consider the possibility of no output change for an insufficient step size, despite the gradient in the value-clamped region stating that an output change was expected. Again, this downside is akin to the gradient interpretation difficulties faced when clamping values and being near the boundary on the inside of the allowable region and stepping outside, in which case an output change was also expected but did not realize when the clamping immediately applies.

Clamping in Fuzzy Logic

Real-Unit Interval

The continuous t-norms of fuzzy logic perform binary operations on the real-unit interval [0, 1] that represent infinite-valued logic where truth-values can be interpreted as ambiguous mixtures between true and false. Clamping the result of fuzzy logic operations like those of Lukasiewicz logic is necessary to ensure truth-values remain in the interpretable range of [0, 1]. The min( ) and max( ) functions clamp the computed values in all Lukasiewicz logic operators, otherwise the result can be outside of the permissible truth-value range of [0, 1]. For the Lukasiewicz conjunction forward inference the clamping then bounds the output and provides the associated clamped gradients as follows.

$$\bigotimes_{i \in I}^{\beta} x_i^{\otimes w_i} = \max\left(0, \min\left(1, \beta - \sum_{i \in I} w_i(1 - x_i)\right)\right),$$

$$\frac{\partial (\bigotimes_{i \in I}^{\beta} x_i^{\otimes w_i})}{\partial \beta} = \begin{cases} 1 & \text{if } 0 \le \bigotimes_{i \in I}^{\beta} x_i^{\otimes w_i} \le 1, \\ 0 & \text{otherwise,} \end{cases}$$

$$\frac{\partial (\bigotimes_{i \in I}^{\beta} x_i^{\otimes w_i})}{\partial w_i} = \begin{cases} (-x_i - 1) \partial x_i / \partial w_i & \text{if } 0 \otimes_{i \in I}^{\beta} x_i^{\otimes w_i} \le 1, \\ 0 & \text{otherwise.} \end{cases}$$

Note that for a true input $x_i = 1$ the corresponding gradient for the output in terms of $w_i$ is $$(x_i - 1)\frac{\partial x_i}{\partial w_i} = 0,$$

which means that it provides no gradients for updating $w_i$ even when no upper bound clamping is applied. The bias $\beta$ will have to be adjusted instead to obtain the desired output, such as a false output when all inputs are true.

Gradient-Transparent Clamping

Note that the gradients are non-zero only inside the real-unit interval, so any clamping that is applied normally nullifies the gradient information so that learning receives no useful gradient information. This is problematic given that a major part of the operating range of the logical conjunction undergoes clamping, depending on the parameters. The solution to this problem is to only perform value clamping but leave the gradients untouched, through gradient-transparent clamping. In this case the output gradient for $\beta$ is always 1 and $w_i$ it is always $$(x_i - 1)\frac{\partial x_i}{\partial w_i},$$

both inside and outside the clamped region.

The parameterization of the proposed logical neurons is especially well-behaved and bounded, with $0 \le w_i \le 1$ and $0 \le \beta \le 1 + \Sigma_i w_i$ normally applying without loss of functionality. This is because any parameter configuration from these constraints can allow the useful functional range of bounded ReLU to be accessed. Consequently, the learning optimizer can set robust update step sizes and limit parameter updates, which means that the presence of transparent gradients from parameters in clamped situations requiring larger update steps can be handled feasibly. The contradiction loss $\Sigma_j \max(0, L_j(\beta, W) - U_j(\beta, W))$ also involves clamping with the intent that a loss term should be activated only when the lower bound $L_j$ is higher than upper bound $U_j$. If there are no contradictions, we would not want to make any parameter updates based on this loss. So the clamping can be performed such that the gradients are also clamped and a zero gradient set when there are no contradictions. This means normal clamping can be performed, especially for loss terms in cases where no learning should be performed.

Backward Inference

Backward inference at a weighted Lukasiewicz conjunction can be determined by firstly unclamping its output, which involves changing a clamped lower bound at $L_\otimes = 0$ to the minimum unclamped value $L_\otimes = \beta - \Sigma_{i \in I} w_i$ and similarly changing a clamped upper bound at $U_\otimes = 1$ to the maximum unclamped value $U = \beta$. Unclamping and extending the bounds where necessary ensures that all backward inference explanations can be generated.

$$\bigotimes_{i \in I}^{\beta'} x_i^{\otimes w_i} = \max\left(0, \min\left(1, \beta - \sum_{i \in I} w_i(1-x_i)\right)\right)$$

$$= \max(0, \min(1, \bigotimes_{i \in I}^{\beta} x_i^{\otimes w_i})).$$

Unclamping $x' = \min(x_{max}, x)$ is simply $\max(x', x)$ and similarly for $x' = \max(x_{min}, x)$ we have $\min(x', x)$ as unclamping operation. Here the x values are recalculated with gradient-tracking, although during clamping they are detached in the subtraction. Note that disabling gradient-tracking is not required for unclamping as it was for clamping, since there is no subtraction or its destructive interference that can nullify gradients. The unclamping of the bounded output to its extremes can then continue as $$L_{\otimes} = \min(\otimes_{i \in I}^{\beta} x_1^{\otimes w_i}, \beta - \Sigma_{i \in I} w_i),$$

$$U_{\otimes} = \max(\otimes_{i \in I}^{\beta'} x_1^{\otimes w_i}, \beta).$$

The functional inverse can then be determined with known values for the conjunction output and all but one of the inputs i, where backward inference can then calculate a value for the remaining subject input j. The calculated proof for the target input is then also clamped to the real-unit interval before proof aggregation is performed.

$$\otimes_{i \in I}^{\beta} x_i^{\otimes w_i} = \beta - \Sigma_{i \in I} w_i(1-x_i)$$

$$w_j(1-x_j) = \beta - \Sigma_{i \in I \setminus j} w_i(1-x_i) - \otimes_{i \in I}^{\beta} x_i^{\otimes w_i}$$

$$(1-x_j) = \beta/w_j - \Sigma_{i \in I \setminus j} w_i(1-x_i)/w_j - (\otimes_{i \in I}^{\beta} x_i^{\otimes w_i})/w_j$$

$$x_j = \max(0, \min(1, 1 - \beta/w_j + \Sigma_{i \in I \setminus j} w_i(1-x_i)/w_j + (\otimes_{i \in I}^{\beta} x_i^{\otimes w_i})/w_j)).$$

The conjunctive syllogism $(p \otimes \neg (p \otimes q)) \to \neg q$ provides logical inference to determine a backward inference result equivalent to the functional inverse since $$x_j = 1 - \frac{\beta}{w_j} + \left(1 - \left(1 - \sum_{i \in I \setminus j} w_i(1-x_i)\right)\right)/w_j + (\bigotimes_{i \in I}^{\beta} x_i^{\otimes w_i})/w_j$$

$$= 1 - \frac{\beta}{w_j} + (1 - \bigotimes_{i \in I \setminus j}^{1} x_i^{\otimes w_i})/w_j + (\bigotimes_{i \in I}^{\beta} x_i^{\otimes w_i})/w_j$$

$$= \frac{\beta}{w_j}\left((\bigotimes_{i \in I \setminus j}^{1} x_i^{\otimes w_i})^{\otimes 1/w_j} \to (\bigotimes_{i \in I}^{\beta} x_i^{\otimes w_i})^{\otimes 1/w_j}\right).$$

where the weighted Lukasiewicz implication is generally defined as $$^\beta(x^{\oplus w_x} \to y^{\oplus w_y}) = \max(0, \min(1, 1 - \beta + w_x(1-x) + w_y y))$$

$$= ^\beta((1-x)^{\oplus w_x} \oplus y^{\oplus w_y}).$$

Note that there is a negation of the partial conjunction which also involves a swapping of its lower and upper bounds in the backward inference calculation. The unclamped gradients obtained over the entire operating range with gradient-transparent clamping calculates as follows $$\frac{\partial x_j}{\partial \beta} = -1/w_j,$$

$$\frac{\partial x_j}{\partial w_i} = \frac{1-x_i}{w_j} \frac{\partial x_i}{\partial w_i},$$

$$\frac{\partial x_j}{\partial w_j} = -\frac{\beta}{w_j^2} - \sum_{i \in I \setminus j} \frac{w_i(1-x_i)}{w_j^2} \frac{\partial x_i}{\partial w_j} - \frac{\bigotimes_{i \in I}^{\beta} x_i^{\otimes w_i}}{w_j^2} \frac{\partial (\bigotimes_{i \in I}^{\beta} x_i^{\otimes w_i})}{\partial w_j}.$$

For weights $0 \leq w_j \leq 1$ smaller than 1 all backward inference gradients $$\lim_{w_j \to 0} \frac{\partial x_j}{\partial \beta} = \infty,$$

$$\lim_{w_j \to 0} \frac{\partial x_j}{\partial w_i} = \infty,$$

$$\lim_{w_j \to 0} \frac{\partial x_j}{\partial w_j} = \infty$$

tend to become large as the weights become smaller. Gradient clipping can deal with these large gradients when performing learning updates, or reverting to clamping gradients as per usual can also be considered.

Gradient Supplantation

In an embodiment, a neuron's activation function is purposefully altered to ensure desirable properties including logical consistency, inference and learning properties such as compositionality, preservation of classical logical and non-zero gradients.

The introduction of a threshold-of-truth a allows for non-zero gradients in the regions where clamping will normally be performed. A tailored piecewise linear activation function provides a range of $[0, 1-\alpha]$ to express the clamped false domain of a logical conjunction, thus it has a positive non-zero gradient associated with the value-region of classical false. The gradient states that a positive change in the function input will result in a positive increase in the output truth-value, even though an insufficient step-size could still result in a classical false output. Adjusting the threshold-of-truth $\frac{2}{3} \leq \alpha \leq 1$ can change the gradient magnitude in the classical regions, so that a more conservative gradient can be obtained for these regions that could make learning updates more accurate.

In contrast, gradient-transparent clamping utilizes the existing gradients of the same magnitude as the unclamped region, so it offers more aggressive gradients in the classical regions compared to piecewise linear activations. An approach of gradient supplantation in gradient-transparent clamping could ensure equivalent gradient magnitudes to piecewise linear activations, but without the need to support the classical symmetry in range $[\alpha, 1]$ associated with true. Output values also do not have to be relaxed by a so that false is still only at an output of 0, but arbitrary gradients can be provided in the clamped regions with gradient-transparent clamping.

Basic gradient supplantation alters gradient-tracked values by scaling their gradients with a provided scalar a under specified conditions. In gradient-transparent clamping the addition of gradient supplantation can scale the effective gradient where value clamping has been applied. Bounded ReLU can then exhibit an arbitrarily scaled gradient in its rectified region to allow for more accurate learning updates, since smaller gradients can be chosen for clamped regions. The scaling-based gradient supplantation uses indicator or boolean condition functions readily available in automatic differentiation libraries, in addition to value detachment x* from the computational graph for gradient-tracked x, and the adapted gradient-transparent functions are thus applied as $$f_\alpha(x, x_{max}) = (x \le x_{max}) + \alpha(x_{max} < x),$$

$$g_\alpha(x, x_{min}) = \alpha(x < x_{min}) + (x_{min} \le x),$$

$$\min(x_{max}, x)^{(\alpha)} = \left(x - \max\left(0, x^* - \frac{x_{max}}{f_\alpha(x, x_{max})}\right)\right) f_\alpha(x, x_{max}),$$

$$\max(x_{min}, x)^{(\alpha)} = \left(x - \min\left(0, x^* - \frac{x_{min}}{g_\alpha(x, x_{min})}\right)\right) g_\alpha(x, x_{min}).$$

Normal clamping that involves setting gradients in the clamped regions to zero, would then correspond with zero-scaled gradient-transparent clamping $\min(x_{max}, x)^{(0)}$ and $\max(x_{min}, x)^{(0)}$ that uses gradient supplantation with a scaling factor of a=0.

Thus, in sum, features of the LNN include: 1. Its immediate interpretability as a system of logical formulae; 2. Its ability to incorporate domain knowledge by being seeded with an existing KB; 3. Its support for compound formulae in first-order logic, e.g., as opposed to just Horn clauses; 4. Its explicit adherence to the open world assumption by tracking both upper and lower bounds on truth values; 5. Its ability to assign weights to each operand of each connective in each formula, as opposed to only having weights on entire formulae; 6. Its logical soundness and ability to be constrained to behave exactly classically; 7. Its support for novel neural training paradigms, including contradiction-based logical loss and any-task learning; and 8. Its tractable training and evaluation run-time compared to restricted Boltzmann machines and Markov logic Networks.

In non-limiting implementations LNN is configurable as a neural-symbolic system applicable to fields, including data science, ontology learning, training and assessment in simulators, and models of cognitive learning and reasoning, vision and language processing or any model that combine logical reasoning and neural learning.

Further, as a versatile neural network architecture, the LNN is broadly applicable to many AI tasks, including both supervised and unsupervised learning. In particular, it is well suited for natural language processing tasks in that it mirrors language's superposition of hard syntactic rules and fuzzy word meanings. As such, it is a suitable target representation for semantic parsing, simultaneously affording the possibilities of immediate inference based on input sentences and later refinement given additional information. Lastly, the LNN architecture may be integrated seamlessly into existing neural solutions, augmenting already very capable machine vision and/or text processing systems with the ability to reason.

Figure 8:
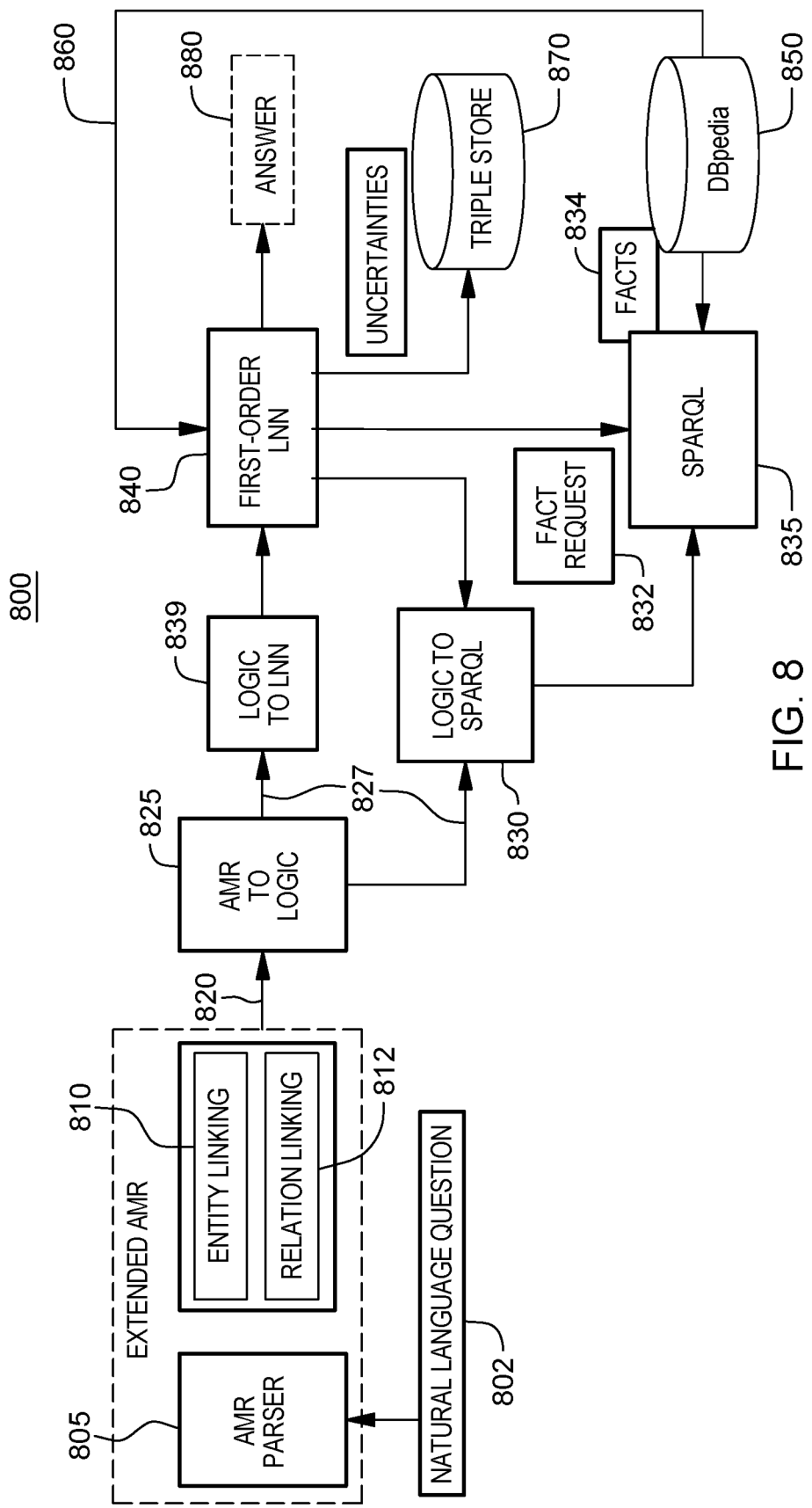
FIG. 8 shows an exemplary embodiment of a Deep Thinking Question Answering "DTQA" system pipeline implementation.

FIG. 8 shows an embodiment of a Deep Thinking Question Answering "DTQA" system pipeline 800. The input 802 to the pipeline is the question text, which is first parsed using an Abstract Meaning Representation (AMR) parser module 805. The AMR is a rooted, directed, acyclic graph (DAG) expressing, for example, "who is doing what to whom" in a sentence. Each node in the graph represents a concept whereas edges represent relations between concepts. Typical examples of edges are subject or object relations between concepts. As described herein with reference to FIG. 4, an example input question text is "Was Natalie Portman born in the USA?". The output 808 of the AMR parser, i.e., AMR DAGs for each question, contains entities and frames (relationships), though these may not be mapped/linked to corresponding structures in a Knowledge Base (KB) 850.

Therefore, in the pipeline are implemented an Entity Extraction and Linking module 810 and Relationship Extraction and Linking module 812. The Entity Extraction and Linking module 810 is configured to extract the entities and relationships to enrich the semantic representation obtained via AMR parsing with explicit links to entities and concepts that appear in the knowledge base (e.g., DBPedia). The Relationship Extraction and Linking module 812 links those entities and relationships to a KB. The linked entities/relationships are then mapped to their corresponding nodes in AMR. The input to Entity Extraction and Linking module 810 is the AMR parse and the question text, and the input to Relationship Extraction and Linking module 812 is the AMR parse with the linked entities. The output of these modules is an Extended AMR (E-AMR) 820 that has both entities and relationships linked to the KB.

With respect to entity extraction and linking module 810, in an embodiment, to achieve high accuracy, the system jointly applies entity extraction and entity disambiguation techniques. First, a list of candidate entities is created based on: 1) entities in the AMR parse; 2) named entities and concepts that be extracted, e.g., using a Watson Natural Language Understanding API; and 3) noun phrases constructed based on syntactic parsing. The actual linking to DBpedia is based on a set of similarity-based matching algorithms or rules 860.

For each candidate entity, the DBpedia lookup API is used to identify a subset of potential matching entities (either ontology classes or resources) for the candidate entities. Then, each matching rule is applied to identify higher-precision matches. The matching rules 860 are based on combinations of features built from: the input question itself (e.g., entity name, co-occurring entities), DBpedia candidate entities (e.g., entity name and aliases, properties), and semantic similarity of the query and the DBpedia subgraph of the candidate matching entity in a common vector space.

With respect to relationship extraction and linking module 812, in an embodiment, tasks are implemented to enrich the AMR representation by linking the frames and edges in the graph to their corresponding (semantically equivalent) relations in the KB. When mapping frames from AMR graphs to RDF/OWL (Web Ontology Language) KBs such as DBpedia, an inherent mismatch existing between n-ary argument PropBank frames used in AMR to binary predicates in the ontology is overcome by combinatorially expanding all arguments and then pruning less probable combinations. For instance, from a frame there can be generated an argument-encoded predicate, which can be linked to the ontology relation. For mapping AMR predicates to KB relations, a parallel corpus is created, e.g., using a subset of Wikipedia sentences. For each sentence, AMR graphs are generated and a KB triple from DBpedia is extracted in a weakly supervised manner. Mappings are then generated using a method inspired by Statistical Machine Translation. Furthermore, the surrounding context of the entity and relation mentions in the question can help in identifying the corresponding knowledge base elements. To utilize these contextual clues, a unigram language models approach is adopted and context models built for each relationship predicate. For each predicate in the knowledge base, all the sentences are extracted from the underlying text corpus that mention instances of the predicate and unigram language models built which are then used to calculate the probability of a predicate being mentioned in the question. The top-N relationships (e.g., N=5) based on these probabilities are then selected as the output of module 812.

As further shown in pipeline system 800 the E-AMR 820 is then transformed to a formal first order logic representation 827 by the AMR to Logic Translator Module 825. This both has greater expressivity and allows the approach to be generalizable rather than specific to a particular query language, e.g., SPARQL RDF query language.

In an embodiment, a logical formalism for this task is used to create a bridge between AMR and SPARQL that can represent both declarative and procedural knowledge. The formalism supports binary predicates, which are ubiquitous in linked open data, and higher-order functional predicates to support aggregation and manipulation of sets of variable bindings. This formalism is not restricted to the SPARQL query language. It follows the same syntactic conventions as the OpenCyc and NextKB projects, enabling support for a broad range of semantics, from standard logical operators to DBpedia predicates and functions that emulate SPARQL constructs.

AMR works remarkably well at identifying verb senses and semantic roles. This provides a significant foundation for a rule-based transformation from AMR to logic. In an implementation,the following issues are addressed: 1) identifying the target (unbound) variable of a query, 2) identifying queries that require sorting sets of variable bindings, and 3) resolving KB entity URIs to AMR variables.

AMR representations for interrogative and imperative statements are used to identify target variables. In AMR, interrogative statements are represented with nodes that belong to an amr-unknown class. Intuitively, if a question were translated into a fill-in-the-blank sentence, the blank would be represented with an instance of the amr-unknown class. In such cases, the AMR to logic translator 825 replaces amr-unknown nodes (or neighboring nodes) with unbound variables. For imperative statements, the AMR to logic translator replaces the direct object role (ARG1) of the top level command with an unbound variable.

Questions that require sorting can be detected by the presence of superlatives (i.e. AMR most and least classes) and quantity Propbank frames (i.e. have-quant-91, have-degree-91). The AMR to logic translator 825 must determine the AMR variable that corresponds to the quantity of interest and sorting direction (ascending for "least" and descending for "most"). Entity and relation linking results are essential inputs to the AMR to logic translator 825 because they provide the required KB-specific vocabulary. However, even with accurate entity and relation linking results, there may be differences in the granularity of entities and relations in the KB and AMR representation. For instance, an acceptable AMR parse for "the composer of the soundtrack for Titanic" might not have an edge that directly connects "composer" to "Titanic," but rather a two-edge path between them that passes through "soundtrack." In contrast, in the KB, there may be a direct link between the composer and the film. To mitigate such issues, the AMR to logic translator 825 generates an initial logical interpretation of the query, and looks for alternative AMR variables to correspond to entity linking results, in order to minimize the number of unbound variables (and maximize the use of entity linking results) in the final logical representation.

The logic representation may then be transformed to SPARQL by the Logic to SPARQL module 830, which queries DBPedia KB 850 for answers. The Logic to SPARQL module 830 is responsible for converting the logical query generated by the AMR to Logic module into an equivalent SPARQL query 835, which can be executed over any RDF store, e.g., triple store 870 RDF database for the storage and retrieval of triples (e.g., a data entity composed of subject-predicate-object) through semantic queries. There exists a one-to-one mapping from constructs in the logical representation to constructs in SPARQL. The Logic to SPARQL module 830 converts the input logic representation into SPARQL constructs using rulebased transformation and then generates an output SPARQL query 835, e.g., using the Jena query builder.

In accordance with methods described herein, the formal first order logic representation output 827 by the AMR to Logic translator module 825 is used to obtain a query generalization representation 839 that can be mapped to a corresponding graph syntax tree LNN 840. The LNN 840 operates to retrieve predicate groundings via its granular SPARQL integration and performs multidirectional reasoning to, e.g., answer ASK questions under the open-world assumption.

For example, using the pipeline system 800 of FIG. 8, the input text question "Was Natalie Portman born in the United States?", Natalie Portman from the AMR parse is mapped to dbr:Natalie_Portman and United States from the AMR parse is mapped to dbr:United_States (both named entities in DBpedia) where the prefix dbo: represents http://dbpedia.org/ontology/and prefix dbr: represents http://dbpedia.org/reference/. The "born in" from the ARM parse is mapped to the relationship dbo:birthplace. For this specific "objection inclusion" query, a query generalization is formed according to:

$$\text{pred}(s, y) = \exists_x(\text{pred}(s, x) \land \text{isPartOf}(x, y))$$

such that for the example input text question, the logical query expression:

$$\varepsilon_x(\text{birthplace}(\text{Natalie\_Portman}, x) \land \text{isPartOf}(x, \text{USA}))$$

is obtained that results in LNN syntax tree of FIG. 4.

A trainable support rule 860 to determine if known object is contained in target assumes most specific ontology assignments.

As described herein, the neural network architecture 840 provide neurons that model a rigorously defined notion of weighted fuzzy or classical first-order logic. Arranged in a one-to-one correspondence with the operations in a system of logical formulae, the LNN 840 is capable of inference in any direction, i.e. via normal evaluation or reverse inferences such as modus pollens, modus tollens, conjunction elimination, and all related inference rules. The LNN explicitly acknowledges the open-world hypothesis by tracking both upper and lower bounds on truth values. This is achieved using specialized neural activation functions and computation patterns, such that proven truth value bounds propagate from each of a formula's inputs to each other input, where they are aggregated and used again in recurrent computation. Constrained with sufficient penalty, the trained LNN model is guaranteed to converge on classical inference behavior. With looser constraints it is able to handle incomplete formulae, minor contradictions, and other sources of uncertainty in the ground truth.

In an embodiment, meronym relations (e.g., isPartOf between entity types can be used for path linking between query triples and expanded entities. Such query extensions allow for more opportunities to arrive at a negative answer to a boolean question. An open-world LNN can continue reasoning after an initial empty result by binding support axioms, for example, to check if the obtained entity is part of a query-provided entity.

With reference to FIG. 8, given the false ASK question "Was Natalie Portman born in the United States?", a knowledgebase lookup (facts request) 832 finds the following predicates (facts) 834: "bornIn(Natalie Portman,Jerusalem)" and "type(USA, Country)" and "type (Israel, Country)". Given Jerusalem as the birthplace, the United_States as a birthplace remains unknown. Forward chaining with predicates like dbo:isPartOf then concludes Jerusalem is part of Israel ("isPartOf(Jerusalem,israel)") via the holonym relation. Israel is a more suitable entity to answer 880 the query because it is of the same specialized ontological type, namely dbo:Country, as the United States. Multidirectional recurrent inference then proves the obtained extended birthplace (Israel) is not part of the asked object (United States) via the inclusion axiom (effectively: distinct countries cannot contain one another).

Figure 9:
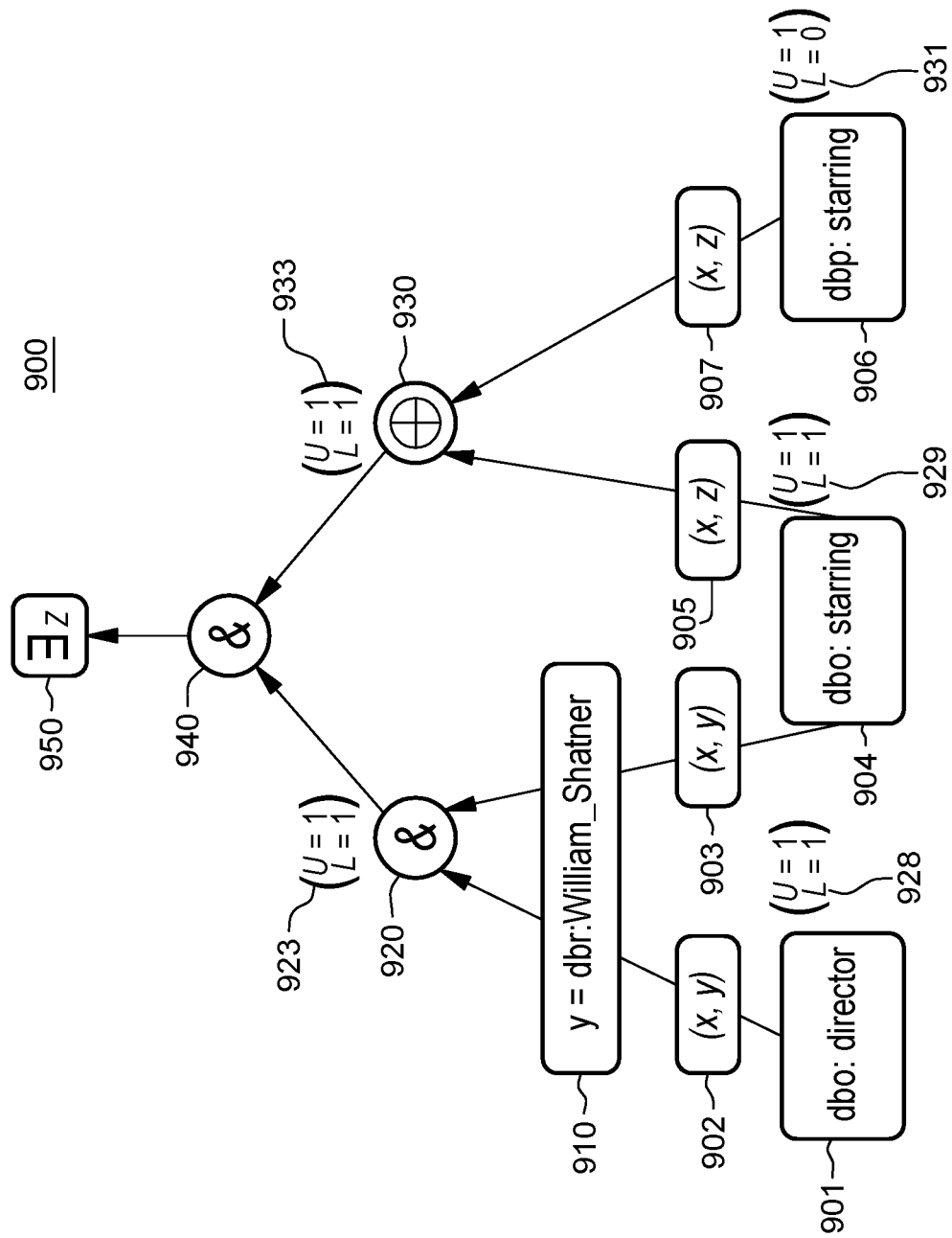
FIG. 9 depicts an LNN graph formed based on a query according to an example DTQA implementation.

FIG. 9 depicts a formed LNN graph 900 according to an implementation of an example DTQA system query.

Given the natural language question "Give me all actors starring in movies directed by and starring William Shatner." Upon AMR parsing and applied entity and relationship extracting and linking logic there is generated the following corresponding Javascript Object Notation (JSON) code:

```
Logic: {'pred_or_fn': 'select',
  'arg0': '?z',
  'arg1': {'pred_or_fn': 'and',
    'arg0': {'pred_or_fn': 'and',
      'arg0': {'subject': '?x',
        'predicate': 'http://dbpedia.org/ontology/director',
        'object': 'http://dbpedia.org/resource/William_Shatner'},
      'arg1': {'subject': '?x',
        'predicate': 'http://dbpedia.org/ontology/starring',
        'object': 'http://dbpedia.org/resource/William_Shatner'}},
    'arg1': {'pred_or_fn': 'or',
      'arg0': {'subject': '?x',
        'predicate': 'http://dbpedia.org/ontology/starring',
        'object': 'z'],
      'arg1': {'subject': '?x',
        'predicate': 'http://dbpedia.org/property/starring',
        'object': '?z'}}}}
```

The following Python code is generated for representing the logic statements for mapping to a LNN:

```
Exists(And(And(('dbo:director', x, (y, 'dbr:William_Shatner')),
       ('dbo:starring', x, (y, 'dbr:William_Shatner')),lnn=lnn),
    Or(('dbo:starring ', x, z) ('dbp:starring ', x, z),lnn=lnn)), dim=z).
```

As shown in FIG. 9, the formed LNN graph 900 is a syntax tree mapping corresponding to these LNN Python inference statements. LNN 900 provides an existential quantification ($\varepsilon_z$) as the answer output 950 that provides those movie actors "z" that appear in a movie or film "x" having "William Shatner" as director "y" and starring "William Shatner" as an actor. LNN 900 includes logic nodes and connective edges where node 920 is the first conjunction node and node 930 is the union (disjunction) node—both nodes operating on predicate facts (groundings) and which nodes 920, 930 having outputs feeding second conjunctive node 940 providing the answer output ($\exists_z$) 950.

To obtain the global groundings, a fact request is generated as a Global SPARQL statement according to the logic:

SELECT DISTINCT*WHERE {VALUES ?y dbr:
William_Shatner} {{{{?dbo:director ?y}{?x
dbo:starring ?y}}. {{?x dbo:starring ?z}
UNION {?x dbp:starring ?z}}}}}

Upon accessing DBPedia, given global grounding 910 "y"=dbr:William_Shatner", an ontological relation provides a responsive entity movie that William_Shatner has directed which is a global grounding "x"=dbr:Groom_Lake_(film)". Then, in a granular sense, the following SPARQL statement obtains predicate grounding for "dbo:director" 901:
SELECT DISTINCT*WHERE {VALUES ?x {dbr:Groom_Lake_(film)} VALUES ?y {dbr:William_Shatner} {?x dbo:director ?y}}

Then, the following SPARQL statement obtains predicate grounding for "dbo:starring" 904:
SELECT DISTINCT*WHERE {VALUES ?x {dbr:Groom_Lake_(film)} VALUES ?z {dbr:William_Shatner dbr:Dan_Gauthier dbr:Tom_Towles . . . } {?x dbo:starring ?z}}

Then, the following SPARQL statement obtains predicate grounding for "dbp:starring" 906:
SELECT DISTINCT*WHERE {VALUES ?x {dbr:Groom_Lake_(film)} VALUES ?z {dbr:William_Shatner dbr:Dan_Gauthier dbr:Tom_Towles . . . } {?x dbp:starring ?z }} and corresponding predcate groundings representing actors "z"=dbr:William_Shatner, dbr:Dan_Gauthier and dbr: Tom_Towles, etc. are obtained.

A forward inference pass is then conducted to evaluate logic at nodes in LNN graph 900 in the following order: 901, 904, 906, 920, 930, 940, 950. From child groundings at dbo:director node 901 and dbo:starring node 904, there is obtained the respective (x,y) values 902 (x=dbr: Groom_Lake_(film), y=dbr: William_Shatner) and (x,y) values 903 (x=dbr: Groom_Lake_(film), y=dbr: William_Shatner) with all operators having upper and lower bounds as $$\begin{pmatrix} U = 1 \\ L = 1 \end{pmatrix}.$$

For the forward inference, at conjunction node 920, the method performs a set operation including an intersection (for the conjunction logic) resulting in upper and lower bounds as $$\begin{pmatrix} U = 1 \\ L = 0 \end{pmatrix}.$$

Given the Conjunction (forward inference) computations:

$L_{A\&B}=L_A \& L_B$ $U_{A\&B}=U_A \& U_B$ there is formulated the logical neural network inference equations at conjunction node 920:

$U_\&=f(t-w_A(1-U_A)-w_A(1-U_B))$ $L_\&=f(t-w_A(1-L_A)-w_B(1-L_B))$

From these, the truth value bounds 923 at the conjunction node 920 of LNN graph 900 is updated as follows:

$$\begin{pmatrix} U = \min(U^{(t-1)}, U^{(t)}) = \min(1, 1) \\ L = \max(L^{(t-1)}, L^{(t)}) = \max(0, 1) \end{pmatrix} = \begin{pmatrix} 1 \\ 1 \end{pmatrix}$$

A proof aggregation indicates: 1) higher lower bound; 2) lower upper bound; and 3) a monotonically tightening.

Continuing to the next disjunction node of the forward inference pass ordering, from child groundings at dbo:starring node 904 and dbp:starring node 906 there is obtained the respective (x,z) values 905 (x=dbr: Groom_Lake_(film), z=dbr:William_Shatner) and (x,z) values 907 (x=dbr: Groom_Lake_(film), z=dbr:Dan_Gauthier dbr:Tom_Towles) with all operators having upper and lower bounds as $$\begin{pmatrix} U = 1 \\ L = 0 \end{pmatrix}.$$

For the forward inference, at disjunction node 930, the method performs a set operation including a union (for the disjunction logic) resulting in upper and lower bounds as $$\begin{pmatrix} U = 1 \\ L = 0 \end{pmatrix}.$$

Given the Disjunction (forward inference) computations:

$$L_{A \oplus B} = L_A \oplus L_B$$

$$U_{A \oplus B} = U_A \oplus U_B$$

there is evaluated the logical neural network inference equations at disjunction node 930:

$$U_\oplus = f(1-t+w_A U_A + w_B U_B)$$

$$L_\oplus = f(1-t+w_A L_A + w_B L_B)$$

From these, the truth value bounds 933 at the conjunction node 930 of LNN graph 900 is updated according to the following:

$$\begin{pmatrix} U = \min(U^{(t-1)}, U^{(t)}) = \min(1, 1) \\ L = \max(L^{(t-1)}, L^{(t)}) = \max(1, 1) \end{pmatrix} = \begin{pmatrix} 1 \\ 1 \end{pmatrix}$$

A proof aggregation indicates: 1) higher lower bound; 2) lower upper bound; and 3) a monotonically tightening.

A backward inference pass is then conducted to evaluate logic at nodes in LNN graph 900 in the following order: 950, 940, 920, 930, 901, 904, 906.

Self groundings at conjunction node 920 include x=dbr: Groom_Lake_(film), y=dbr: William_Shatner) with all operators having upper and lower bounds as $$\begin{pmatrix} U = 1 \\ L = 1 \end{pmatrix}.$$

Given the backward inference computations for a conjunction:

$$A \rightarrow (B \rightarrow (A \& B))$$

$$L_A = U_B \rightarrow L_{A \& B}$$

$$U_A = L_B \rightarrow U_{A \& B}$$

there is evaluated the logical neural network backward inference equations at dbo:director node 901 according to:

$$U_A = f(1-t+w_B(1-L_B)+w_\& U_\&)$$

$$L_A = f(1-t+w_B(1-U_B)+w_\& L_\&)$$

where upper and lower bounds evaluate to $$\begin{pmatrix} U = 1 \\ L = 1 \end{pmatrix}.$$

From these, the logical neural network backward inference at dbo:starring node 904 (i.e., x=dbr: Groom_Lake_(film), y=dbr:William_Shatner) also evaluates to $$\begin{pmatrix} U = 1 \\ L = 1 \end{pmatrix}.$$

For proof aggregation, the truth value bounds 923 at the conjunction node 920, the child grounding node 901 (dbo:director) and the child grounding node 904 (dbo:starring) of LNN graph 900 is updated according to the following:

$$\begin{pmatrix} U = \min(U^{(t-1)}, U^{(t)}) = \min(1, 1) \\ L = \max(L^{(t-1)}, L^{(t)}) = \max(1, 1) \end{pmatrix} = \begin{pmatrix} 1 \\ 1 \end{pmatrix}.$$

as shown in FIG. 9 as values $$\begin{pmatrix} U = 1 \\ L = 1 \end{pmatrix}$$

923, 928 and 929 in FIG. 9.

This proof aggregation indicates: 1) higher lower bound; 2) lower upper bound; and 3) a monotonically tightening.

Self groundings at dbo:starring node 904 include x=dbr: Groom_Lake_(film), y=dbr: William_Shatner) having upper and lower bounds as $$\begin{pmatrix} U = 1 \\ L = 1 \end{pmatrix}.$$

Given the backward inference computations for a conjunction:

$$B \rightarrow (A \rightarrow (A \& B))$$

$$L_B = U_A \rightarrow L_{A \& B}$$

$$U_B = L_A \rightarrow U_{A \& B}$$

there is evaluated the logical neural network backward inference at dbo:starring node 904 according to:

$$U_B = f(1-t+w_A(1-L_A)+w_\& U_\&)$$

$$L_B = f(1-t+w_A(1-U_A)+w_\& L_\&)$$

where upper and lower bounds at dbo:starring node 904 evaluate to $$\begin{pmatrix} U = 1 \\ L = 1 \end{pmatrix}$$

929.

For proof aggregation, the truth value bounds 929 at dbo:starring node 904 evaluate according to:

$$\begin{pmatrix} U = \min(U^{(t-1)}, U^{(t)}) = \min(1, 1) \\ L = \max(L^{(t-1)}, L^{(t)}) = \max(1, 1) \end{pmatrix} = \begin{pmatrix} 1 \\ 1 \end{pmatrix}.$$

which proof aggregation indicates: 1) higher lower bound; 2) lower upper bound; and 3) a monotonically tightening.

Continuing to the next disjunction node 930 of the backward inference pass ordering, the child groundings at disjunction node include the predicates at the dbo:starring node 904 and dbp:starring node 906 which are the respective (x,z) values 905 (x=dbr: Groom_Lake_(film), z=dbr: William_Shatner) and (x,z) values 907 (x=dbr: Groom_Lake_(film), z=dbr:Dan_Gauthier dbr:Tom_Towles . . . ) with all operators having upper and lower bounds as $$\begin{pmatrix} U = 1 \\ L = 0 \end{pmatrix}.$$

Given the backward inference computations for a Disjunction:

$$(\sim B \& (A \oplus B)) \rightarrow A$$

$$L_A = L_{\sim B} \& L_{A \oplus B}$$

$$U_A = U_{\sim B} \& U_{A \oplus B}$$

there is evaluated the logical neural network inference equations at dbo:starring node 904 according to:

$$U_A = f(t - w_B L_B - w_\&(1 - U_\&))$$

$$L_A = f(t - w_B U_B + w_\&(1 - L_\&))$$

where upper and lower bounds at dbo:starring node 904 evaluate to $$\begin{pmatrix} U = 1 \\ L = 0 \end{pmatrix}.$$

Given the prior calculations from the conjunction node 920, the bounds for the dbo:starring node 904 at the disjunction node is computed as:

$$\begin{pmatrix} U = \min(1, 1) \\ L = \max(0, 1) \end{pmatrix}.$$

The grounding at the dbp:starring node 906 is $$\begin{pmatrix} U = 1 \\ L = 0 \end{pmatrix}$$

931.

From these, the truth value bounds at the dbo:starring node 904 of LNN graph 900 are updated according to the following:

$$\begin{pmatrix} U = \min(U^{(t-1)}, U^{(t)}) = \min(1, 1) \\ L = \max(L^{(t-1)}, L^{(t)}) = \max(1, 0) \end{pmatrix} = \begin{pmatrix} 1 \\ 1 \end{pmatrix}.$$

Next, given the backward inference computations for a Disjunction:

$$(\sim A \& (A \oplus B)) \rightarrow A$$

$$L_B = L_{\sim A} \& L_{A \oplus B}$$

$$U_B = U_{\sim A} \& U_{A \oplus B}$$

there is evaluated the logical neural network inference equations at dbp:starring node 906 according to:

$$U_B = f(t - w_A L_A - w_\&(1 - U_\&))$$

$$L_B = f(t - w_A U_A - w_\&(1 - L_\&))$$

where upper and lower bounds at dbp:starring node 906 evaluate to $$\begin{pmatrix} U = \min(1, 1) \\ L = \max(0, 0) \end{pmatrix}.$$

which updates to $$\begin{pmatrix} U = 1 \\ L = 0 \end{pmatrix}.$$

For proof aggregation, the truth value bounds at dbo:starring node 904 evaluate according to:

$$\begin{pmatrix} U = \min(U^{(t-1)}, U^{(t)}) = \min(1, 1) \\ L = \max(L^{(t-1)}, L^{(t)}) = \max(0, 0) \end{pmatrix} = \begin{pmatrix} 1 \\ 0 \end{pmatrix}$$

which proof aggregation indicates: 1) higher lower bound; 2) lower upper bound; and 3) a monotonically tightening.

Figure 10:
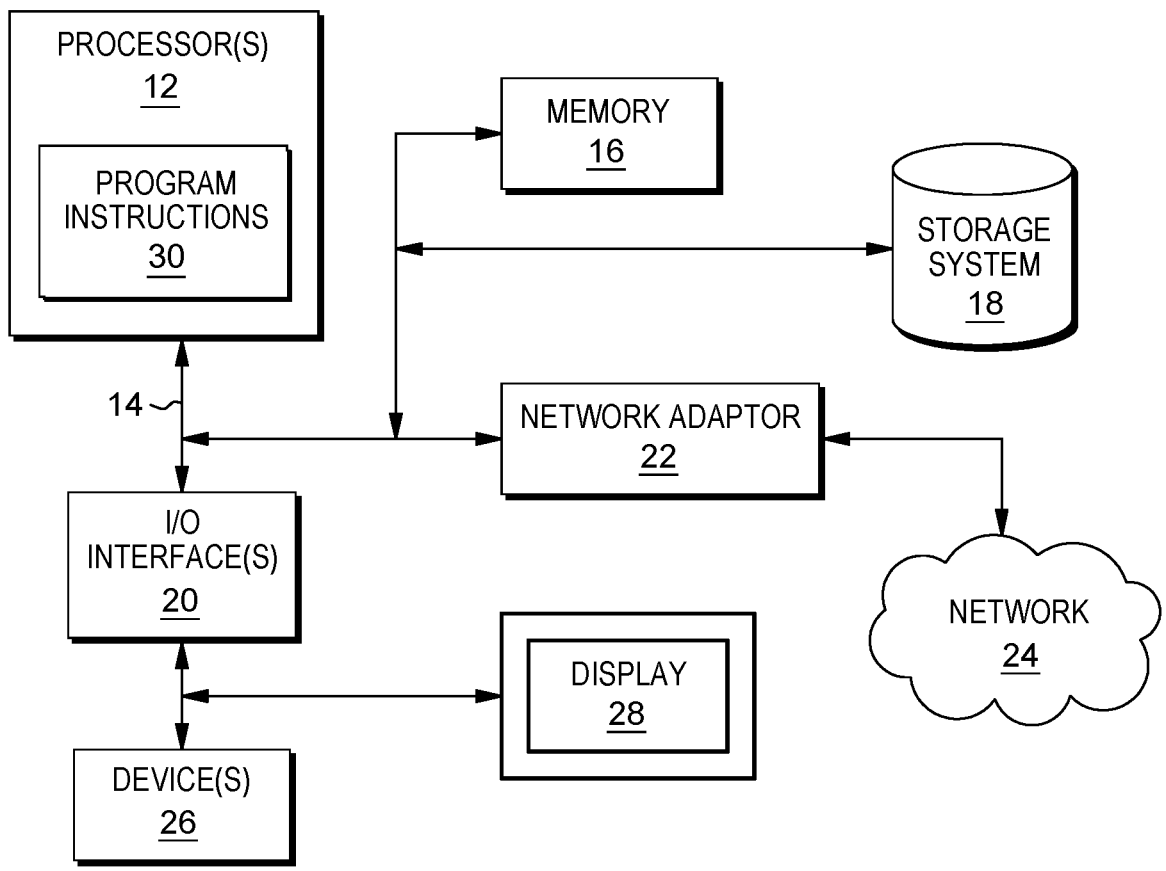
FIG. 10 illustrates a schematic of an example computer or processing system that may configure and implement a logical neural network in accordance with the embodiments herein.

FIG. 10 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of an of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system limy further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers, A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    receiving, at one or more hardware processors, an input query and input propositions used to infer a logical truth based on said input query;
    configuring, using said one or more hardware processors, a logical neural network (LNN) structure comprising one or more propositional neurons representing said input propositions and one or more neurons representing a logical connective according to a system of logical formulae corresponding to inference rules;
    configuring at each logical connective neuron, using said one or more hardware processors, a respective activation function used to compute a truth of a logical connective of said logical formulae;
    evaluating, using said LNN structure, a logical inference based on said input query; and
    responsive to said evaluating, outputting an output truth value either proving or not the logical inference within an aggregated bounds.

2. The computer-implemented method of claim 1, wherein said system of logical formula for said LNN are obtained from an ontology knowledge base, said configuring a LNN comprising:
    choosing neural inputs and parameters for said one or more propositional and logical connective neurons to match a syntax and behavior of connectives making up the system of logical formulae from the knowledge base and choosing initial bounds on formula and proposition truth values chosen to match input facts.

3. The computer-implemented method of claim 1, wherein said evaluating a logical inference comprises:
performing a forward inference pass using said one or more hardware processors to evaluate expressions of said LNN structure using an activation function to compute said truth values at each neuron, said truth values indicating an upper and lower bound on a logical formula or subformula of the system formulae.

4. The computer-implemented method of claim 3, wherein said evaluating a logical inference comprises:
performing a backwards (downward) inference pass using said one or more hardware processors, to evaluate inverse inference rules during said downward inference pass; and
aggregating said truth values at propositional neurons and logical connective neurons during said backward inference pass.

5. The computer-implemented method of claim 4, wherein said evaluating inverse inference rules during said downward inference path comprises:
computing an inverse activation function at a logical connective neuron to update said truth values and aggregating said truth values obtained in the downward inference pass.

6. The computer-implemented method of claim 5, wherein said LNN structure is configured as a syntax tree, said backwards (downward) inference pass is performed using a recursive depth-first traversal of the syntax tree performed from one or more root nodes to each of the roots' leaves.

7. The computer-implemented method of claim 4, wherein said aggregating said truth values at propositional neurons and logical connective neuron comprises: obtaining a tightest upper and lower bounds by taking a maximum lower bound value and a minimum upper bound value of said obtained truth values.

8. The computer-implemented method of claim 4, wherein said one or more propositional neurons represent an input predicate comprising an n-dimensional table or tensor representation, where n is a non-negative number, the method further comprising:
providing for a neuron a table of truth value bounds uniquely keyed by a group of columns pertaining to an unbound logical variable occurring in a corresponding sub-formula or predicate; and
modifying a neural activation function to perform joins over columns pertaining to shared variables while computing truth value bounds at the associated rows.

9. The computer-implemented method of claim 8, wherein said evaluating a logical inference to obtain truth values comprises:
performing joins between table representations of known bounds for a neuron's output and for the neuron's other inputs,
computing truth value bounds at the associated rows of said tensor representation; and
reducing over any columns pertaining to logical variables absent from the target input's corresponding subformula so as to aggregate the tightest such bounds.

10. The computer-implemented method of claim 1, further comprising: initializing parameters of each neuron's respective activation function to effect an importance weighting over the neuron's inputs, output, or both inputs and outputs.

11. The computer-implemented method of claim 1, wherein said logical connectives are configured according to a weighted Lukasiewicz logic scheme.

* * * * *